US011453824B2

(12) United States Patent
Hirschmann et al.

(10) Patent No.: US 11,453,824 B2
(45) Date of Patent: Sep. 27, 2022

(54) LIQUID-CRYSTALLINE MEDIUM

(71) Applicant: Merck Patent GmbH, Darmstadt (DE)

(72) Inventors: Harald Hirschmann, Darmstadt (DE); Martina Windhorst, Muenster (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 15/492,431

(22) Filed: Apr. 20, 2017

(65) Prior Publication Data

US 2017/0306232 A1 Oct. 26, 2017

(30) Foreign Application Priority Data

Apr. 21, 2016 (DE) ........................ 102016004834.4

(51) Int. Cl.

| | |
|---|---|
| ***G02F 1/1333*** | (2006.01) |
| ***C09K 19/34*** | (2006.01) |
| ***C09K 19/06*** | (2006.01) |
| ***C09K 19/30*** | (2006.01) |
| ***C09K 19/54*** | (2006.01) |
| ***G02F 1/1362*** | (2006.01) |
| *C09K 19/04* | (2006.01) |
| *C09K 19/12* | (2006.01) |

(52) U.S. Cl.

CPC ........ *C09K 19/3405* (2013.01); *C09K 19/062* (2013.01); *C09K 19/3003* (2013.01); *C09K 19/54* (2013.01); *C09K 19/542* (2013.01); *G02F 1/1362* (2013.01); *G02F 1/133365* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3027* (2013.01); *C09K 2019/3408* (2013.01); *C09K 2019/548* (2013.01)

(58) Field of Classification Search

CPC .............. C09K 19/3405; C09K 19/062; C09K 19/3003; C09K 19/54; C09K 19/542; C09K 2019/0448; C09K 2019/122; C09K 2019/123; C09K 2019/3004; C09K 2019/3009; C09K 2019/301; C09K 2019/3016; C09K 2019/3027; C09K 2019/3408; C09K 2019/548; G02F 1/1333; G02F 1/1362; G02F 1/133365

USPC .................................................... 252/299.63

See application file for complete search history.

(56) References Cited

U.S. PATENT DOCUMENTS

| | | | |
|---|---|---|---|
| 3,814,700 A | 6/1974 | Aviram et al. | |
| 3,953,491 A | 4/1976 | Steinstrasser et al. | |
| 4,012,434 A | 3/1977 | Steinstrasser | |
| 4,077,900 A | 3/1978 | Pohl et al. | |
| 4,136,053 A | 1/1979 | Steinstrasser et al. | |
| 4,237,026 A | 12/1980 | Eidenschink et al. | |
| 4,813,770 A | 3/1989 | Clerc et al. | |
| 6,861,107 B2 | 3/2005 | Klasen-Memmer et al. | |
| 7,767,280 B2 | 8/2010 | Klasen-Memmer et al. | |
| 7,981,487 B2 | 7/2011 | Klasen-Memmer et al. | |
| 8,361,568 B2 | 1/2013 | Klasen-Memmer et al. | |
| 8,475,889 B2 | 7/2013 | Klasen-Memmer et al. | |
| 9,737,854 B2 | 8/2017 | Kaetzel | |
| 9,777,216 B2 * | 10/2017 | Klasen-Memmer et al. ............... | C09K 19/06 |
| 9,809,747 B2 | 11/2017 | Iwashita et al. | |
| 9,982,194 B2 | 5/2018 | Klasen-Memmer et al. | |
| 10,131,841 B2 | 11/2018 | Archetti et al. | |
| 10,214,692 B2 | 2/2019 | Hirschmann et al. | |
| 2008/0191167 A1 | 8/2008 | Klasen-Memmer et al. | |
| 2010/0102275 A1 | 4/2010 | Klasen-Memmer et al. | |
| 2010/0243958 A1 | 9/2010 | Klasen-Memmer et al. | |
| 2012/0228549 A1 | 9/2012 | Klasen-Memmer et al. | |
| 2015/0267119 A1 | 9/2015 | Baron et al. | |
| 2015/0299574 A1 * | 10/2015 | Hirschmann .......... | C09K 19/54 252/299.61 |
| 2016/0054602 A1 | 2/2016 | Tong et al. | |
| 2016/0075945 A1 | 3/2016 | Iwashita et al. | |
| 2016/0075947 A1 | 3/2016 | Sudo et al. | |
| 2016/0090533 A1 | 3/2016 | Hirschmann et al. | |
| 2017/0044436 A1 | 2/2017 | Kojima et al. | |
| 2018/0119010 A1 | 5/2018 | Klasen-Memmer et al. | |
| 2019/0345389 A1 | 11/2019 | Hirschmann et al. | |

FOREIGN PATENT DOCUMENTS

| | | |
|---|---|---|
| CN | 103874743 A | 6/2014 |
| DE | 2209127 A1 | 9/1973 |
| DE | 2240864 A1 | 2/1974 |
| DE | 2338281 A1 | 2/1974 |
| DE | 2321632 A1 | 11/1974 |
| DE | 2450088 A1 | 4/1976 |
| DE | 2637430 A1 | 2/1978 |
| DE | 2853728 A1 | 7/1980 |
| DE | 102006010641 A1 | 9/2006 |

(Continued)

OTHER PUBLICATIONS

European Search Report dated Oct. 4, 2017 issued in corresponding EP 17166742 application (9 pages).

English Abstract of DE 102006010641 A1 published Sep. 28, 2006.

Office Action in corresponding EP 17166742.1 dated Mar. 25, 2019 (pp. 1-7).

Office Action in corresponding Taiwan Patent Application No. 106113337 dated Nov. 25, 2020 (pp. 1-6) and english translation thereof (pp. 1-5).

(Continued)

*Primary Examiner* — Geraldina Visconti

(74) *Attorney, Agent, or Firm* — Millen White Zelano & Branigan, PC; Brion P. Heaney

(57) ABSTRACT

The invention relates to a liquid-crystalline medium and to the use thereof for an active-matrix display, in particular based on the VA, PSA, PS-VA, PM-VA, SS-VA, PALC, IPS, PS-IPS, FFS or PS-FFS effect.

30 Claims, No Drawings

(56) References Cited

FOREIGN PATENT DOCUMENTS

| | | | |
|---|---|---|---|
| DE | 102012004871 | A1 | 10/2012 |
| DE | 102012024126 | A1 | 6/2013 |
| DE | 102015003411 | A1 | 9/2015 |
| DE | 102015006621 | A1 | 12/2015 |
| EP | 0240379 | A1 | 10/1987 |
| EP | 1958999 | A1 | 8/2008 |
| EP | 2824161 | A1 | 1/2015 |
| EP | 2966150 | A1 | 1/2016 |
| EP | 3130650 | B1 | 7/2018 |
| EP | 2921545 | B1 | 8/2019 |
| EP | 2883934 | B1 | 11/2019 |
| GB | 1376115 | A | 12/1974 |
| TW | 201136885 | A | 11/2011 |
| TW | 201502250 | A | 1/2015 |
| WO | 15090565 | A1 | 6/2015 |

OTHER PUBLICATIONS

Office Action in corresponding JP application 2017-083437 dated Apr. 19, 2021 (pp. 1-4) and english translation thereof (pp. 1-4).

Office Action in corresponding ROC (Taiwan) Patent Application No. 106113337 dated Jul. 30, 2021 (pp. 1-6) and english translation thereof (pp. 1-6).

Office Action in corresponding CN Patent Application No. 201710263422.1 dated Dec. 3, 2021 (pp. 3-14).

Office Action in corresponding KR Patent Application No. 2017-0049584 dated Dec. 7, 2021 (pp. 1-17).

* cited by examiner

LIQUID-CRYSTALLINE MEDIUM

The present invention relates to a liquid-crystalline medium (LC medium), to the use thereof for electro-optical purposes, in particular for electro-optical displays having active-matrix addressing based on the ECB (electrically controlled birefringence) effect and for IPS (in-plane switching) displays or FFS (fringe field switching) displays, and to displays containing this medium.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants K3/K1, high values for the optical anisotropy Δn and values for the dielectric anisotropy of $\Delta\varepsilon \leq -0.5$ in order to be suitable for use in high-information display elements based on the ECB effect. Electro-optical display elements based on the ECB effect have a homeotropic edge alignment (VA technology=vertically aligned). Dielectrically negative liquid-crystal media can also be used in displays which use the so-called IPS or FFS effect.

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Industrial application of this effect in electro-optical display elements requires LC phases, which have to satisfy a multiplicity of requirements. Particularly important here are chemical resistance to moisture, air and physical influences, such as heat, infrared, visible and ultraviolet radiation and direct and alternating electric fields.

Furthermore, industrially usable LC phases are required to have a liquid-crystalline mesophase in a suitable temperature range and low viscosity.

None of the hitherto-disclosed series of compounds having a liquid-crystalline mesophase includes a single compound which meets all these requirements. Mixtures of two to 25, preferably three to 18, compounds are therefore generally prepared in order to obtain substances which can be used as LC phases. However, it has not been possible to prepare optimum phases easily in this way since no liquid-crystal materials having significantly negative dielectric anisotropy and adequate long-term stability were hitherto available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:

1. MOS (metal oxide semiconductor) transistors on a silicon wafer as substrate
2. thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully color-capable displays, in which a mosaic of red, green and blue filters is arranged in such a way that a filter element is opposite each switchable pixel.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984:

Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

There is thus still a great demand for MLC displays having fast response times at the same time as a large working-temperature range and a low threshold voltage, with the aid of which various grey shades can be generated.

The disadvantages of the MLC-TN displays frequently used is, due to their comparatively low contrast, the relatively high viewing-angle dependence and the difficulty of generating grey shades in these displays.

VA displays have significantly better viewing-angle dependences and are therefore principally used for televisions and monitors. However, there continues to be a need to improve the response times here, in particular in view of use for televisions having frame rates (image change frequency/refresh rate) of greater than 60 Hz. However, the properties, such as, for example, the low-temperature stability, must not be impaired at the same time.

An object of the invention is to provide liquid-crystal mixtures, in particular for monitor and TV applications, based on the ECB effect or on the IPS or FFS effect, which do not have the disadvantages indicated above, or only do so to a reduced extent. In particular, it must be ensured for monitors and televisions that the liquid-crystal mixtures also work at extremely high and extremely low temperatures and at the same time have very short response times and at the same time have improved reliability behavior, in particular exhibit no or significantly reduced image sticking after long operating times.

Surprisingly, it is possible to reduce the ratio of rotational viscosity γ1 and the elastic constant K33 (γ1/K33) and thus to improve the response times, and at the same time to achieve high reliability and low-temperature stability (LTS), if a compound of the formulae I1 and I2 below and one or more compounds of the formula EY below are in each case used in liquid-crystal mixtures, in particular in LC mixtures having negative dielectric anisotropy, preferably for VA, IPS and FFS displays, furthermore for PM (passive matrix)-VA displays.

Surprisingly, the combination of the compounds of the formulae I1 and I2 with the compounds of the formula EY results in liquid-crystalline media which simultaneously have a very low rotational viscosity and a high absolute value of the dielectric anisotropy as well as high reliability and high LTS. It is therefore possible to prepare liquid-crystal mixtures, preferably VA, IPS and FFS mixtures, which have very short response times, at the same time good phase properties and good low-temperature behavior.

The invention thus relates to a liquid-crystalline medium, preferably having negative dielectric anisotropy (Δε), which comprises a compound of the formula I1 and/or a compound of the formula I2, and one or more compounds of the formula EY,

I1

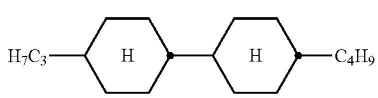

-continued

I2

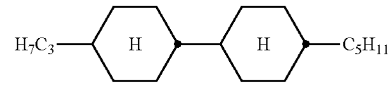

EY

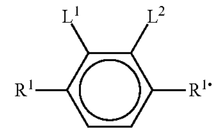

in which the individual radicals each, independently of one another, and identically or differently on each occurrence, have one of the following meanings:

$R^1$ and $R^{1*}$ denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may each be replaced by —O—, —S—,

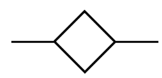

,

—C≡C—, —$CF_2$O—, —O$CF_2$—, —OC—O— or —O—CO— in such a way that O atoms are not linked directly to one another, or a cycloalkyl ring having 3 to 6 C atoms, $L^1$ and $L^2$ denote F, Cl, $CF_3$ or $CHF_2$, preferably F, with the proviso that the LC medium does not comprise a compound of the formula I3,

I3

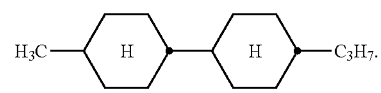

The invention furthermore relates to an electro-optical display having active-matrix addressing, in particular based on the ECB, VA, PS-VA, PVA, PM-VA, SS-VA, PALC (plasma addressed liquid crystal), IPS, PS-IPS (polymer stabilized in-plane switching), FFS or PS-FFS effect, in particular on the UB-FFS (ultra brightness fringe field switching) or PS-FFS (polymer stabilized fringe field switching) effect, characterized in that it comprises, as dielectric, a liquid-crystalline medium as described above and below.

The liquid-crystalline media according to the invention preferably exhibit very broad nematic phase ranges with clearing points≥68° C., preferably ≥70° C., very favorable values of the capacitive threshold, relatively high values of the holding ratio and at the same time very good low-temperature stabilities at −20° C. and −30° C., as well as low rotational viscosities and short response times. The liquid-crystalline media according to the invention are furthermore distinguished by the fact that, in addition to the improvement in the rotational viscosity γ1, relatively high values of the elastic constants K33 for improving the response times can be observed.

In the formulae above and below, an alkyl radical or alkoxy radical may be straight-chain or branched. It is preferably straight-chain, and preferably has 2, 3, 4, 5, 6 or 7 C atoms. Accordingly, preferred alkyl and alkoxy groups are ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradedoxy.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6-, or 7-oxaoctyl, 2-, 3-, 4-, 5-, 6-, 7- or 8-oxanonyl or 2-, 3-, 4-, 5-, 6-, 7-, 8- or 9-oxadexyl.

An alkenyl radical may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl or dec-1-, -2-, -3-, -4-, -5-, -6-, -7-, -8- or -9-enyl.

If an alkyl or alkenyl radical is at least monosubstituted by halogen, this radical is preferably straight-chain and halogen is preferably F or Cl. In the case of polysubstitution, halogen is preferably F. The resultant radicals also include perfluorinated radicals. In the case of monosubstitution, the fluorine or chlorine substituent can be in any desired position, but is preferably in the ω position.

Particular preference is given to compounds in which "alkenyl" denotes vinyl, prop-1-enyl, prop-2-enyl or but-3-enyl.

Some preferred embodiments of the mixtures according to the invention are given below.

The liquid-crystalline medium preferably comprises a compound of the formula I1 and a compound of the formula I2 as well as one or more compounds of the formula EY.

The compounds of the formulae I1 and I2 are preferably employed in the liquid-crystalline medium in amounts of ≥3% by weight, preferably ≥5% by weight, based on the mixture as a whole. Particular preference is given to liquid-crystalline media which comprise 5-30% by weight, very particularly preferably 10-20% by weight, of compounds of the formulae I1 and I2.

The compounds of the formula EY are preferably employed in the liquid-crystalline medium in amounts of ≥2% by weight, preferably ≥5% by weight, based on the mixture as a whole. Particular preference is given to liquid-crystalline media which comprise 3-20% by weight, very particularly preferably 5-15% by weight, of the compounds of the formula EY.

The total concentration of the compounds of the formulae I1, I2 and EY in the liquid-crystalline media according to the invention is preferably 10-35% by weight.

In the compounds of the formula EY, $R^1$ and $R^{1*}$ preferably denote alkoxy having ≥2, particularly preferably 2 to 6, C atoms and $L^1=L^2=F$.

Particular preference is given to compounds of the formula EY selected from the group consisting of the following sub-formulae:

EY-1

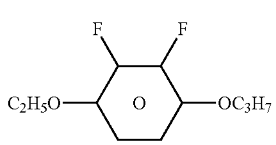

-continued

EY-2

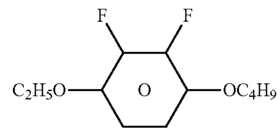

EY-3

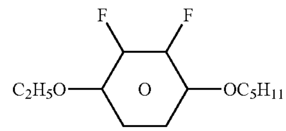

EY-4

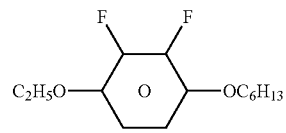

EY-5

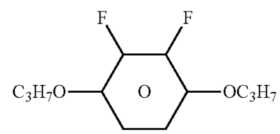

EY-6

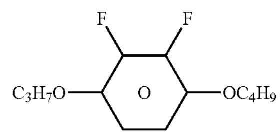

EY-7

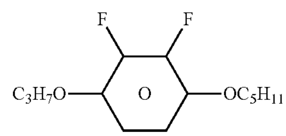

EY-8

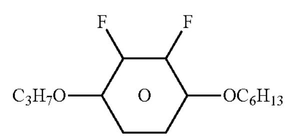

EY-9

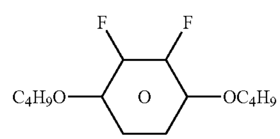

EY-10

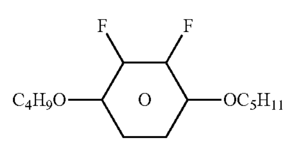

EY-11

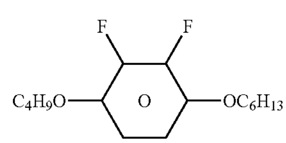

EY-12

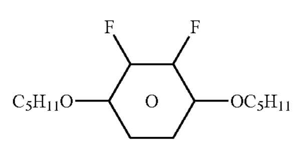

-continued

EY-13

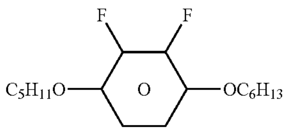

EY-14

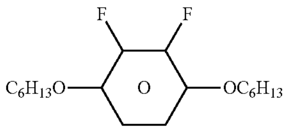

EY-15

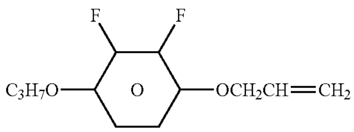

EY-16

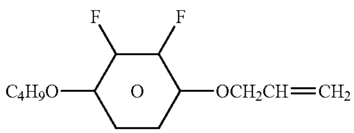

EY-17

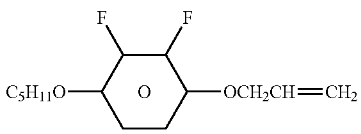

EY-18

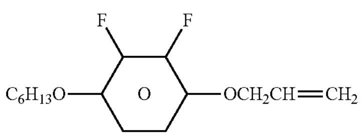

EY-19

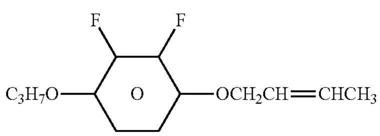

EY-20

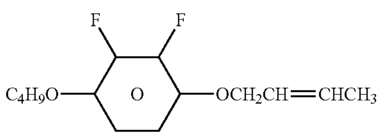

EY-21

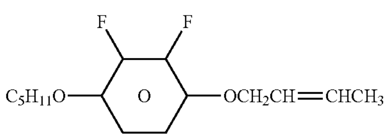

EY-22

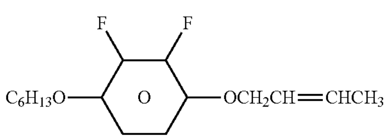

EY-23

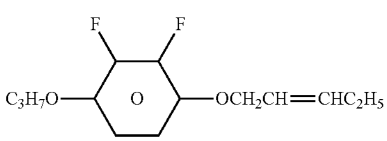

-continued

EY-24

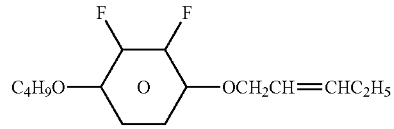

EY-25

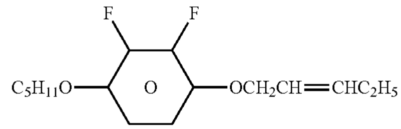

EY-26

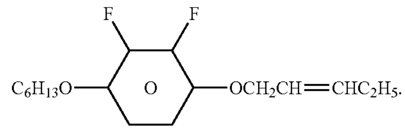

Particular preference is given to compounds of the formulae EY1-EY14. Very particular preference is given to compounds of the formula EY9.

Further preferred embodiments of the liquid-crystalline medium according to the invention are indicated below:

a) Liquid-crystalline medium which additionally comprises one or more compounds selected from the group of the compounds of the formulae IIA, IIB and IIC,

IIA

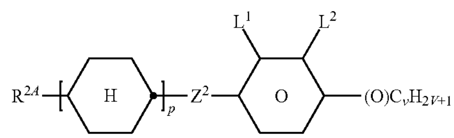

IIB

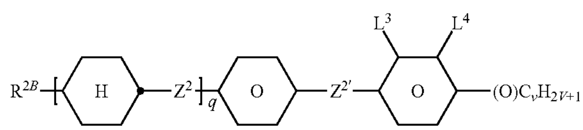

IIC

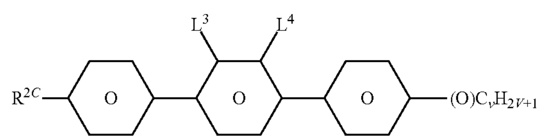

in which $R^{2A}$, $R^{2B}$ and $R^{2C}$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may each be replaced by —O—, —S—,

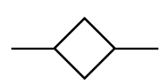,

—C≡C—, —$CF_2$O—, —O$CF_2$—, —OC—O— or —O—CO— in such a way that O atoms are not linked directly to one another, or a cycloalkyl ring having 3 to 6 C atoms, $L^{1-4}$ each, independently of one another, denote F, Cl, $CF_3$ or $CHF_2$, $Z^2$ and $Z^{2'}$ each, independently of one another, denote a single bond, —$CH_2CH_2$—, —CH═CH—, —$CF_2O$—, —$OCF_2$—, —$CH_2O$—, —$OCH_2$—, —COO—, —OCO—, —$C_2F_4$—, —CF═CF—, or —CH═$CHCH_2O$—, p denotes 1 or 2, q denotes 0 or 1, v denotes an integer from 1 to 6, and (O) denotes an oxygen atom or a single bond.

In the compounds of the formulae IIA and IIB, the radicals $Z^2$ may have identical or different meanings on each occurrence. In the compounds of the formula IIB, the radicals $Z^2$ and $Z^{2'}$ may each have identical or different meanings independently of one another and on each occurrence.

In the compounds of the formulae IIA, IIB and IIC, $R^{2A}$, $R^{2B}$ and $R^{2C}$ each preferably denote alkyl having 1-6 C atoms, in particular $CH_3$, $C_2H_5$, n-$C_3H_7$, n-$C_4H_9$, or n-$C_5H_{11}$.

In the compounds of the formulae IIA and IIB, $L^1$, $L^2$, $L^3$ and $L^4$ preferably denote $L^1$=$L^2$=F and $L^3$=$L^4$=F, furthermore $L^1$=F and $L^2$=Cl, $L^1$=Cl and $L^2$=F, $L^3$=F and $L^4$=Cl, $L^3$=Cl and $L^4$=F. $Z^2$ and $Z^{2'}$ in the formulae IIA and IIB preferably each, independently of one another, denote a single bond, furthermore a —$C_2H_4$— or —$CH_2O$— bridge.

If in the formula IIB $Z^2$═—$C_2H_4$— or —$CH_2O$—, $Z^{2'}$ is preferably a single bond or, if $Z^{2'}$═—$C_2H_4$— or —$CH_2O$—, $Z_2$ is preferably a single bond. In the compounds of the formulae IIA and IIB, $(O)C_vH_{2v+1}$ preferably denotes $OC_vH_{2v+1}$, furthermore $C_vH_{2v+1}$. In the compounds of the formula IIC, $(O)C_vH_{2v+1}$ preferably denotes $C_vH_{2v+1}$. In the compounds of the formula IIC, $L^3$ and $L^4$ preferably each denote F.

Preferred compounds of the formulae IIA, IIB and IIC are indicated below:

IIA-1

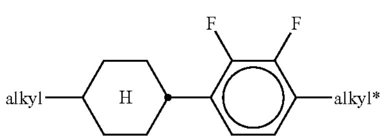

IIA-2

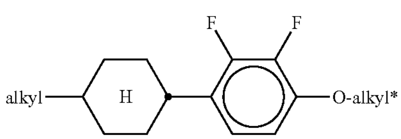

IIA-3

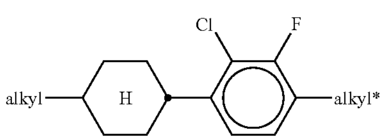

IIA-4

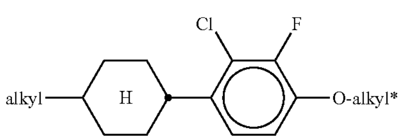

IIA-5

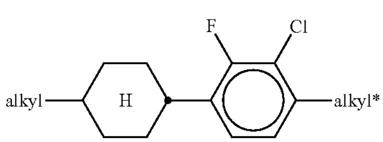

-continued

IIA-6

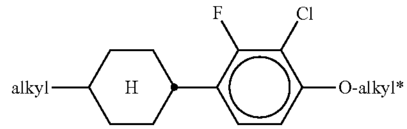

IIA-7

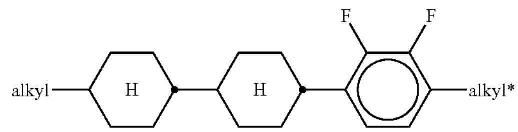

IIA-8

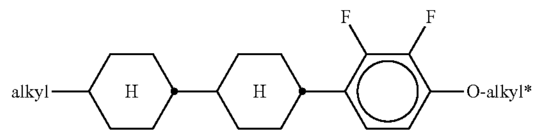

IIA-9

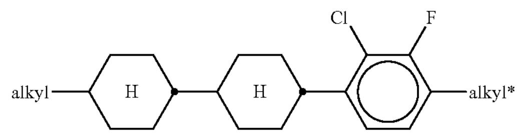

IIA-10

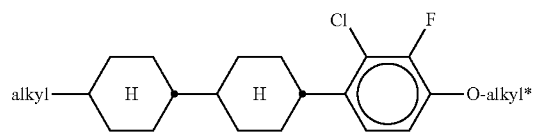

IIA-11

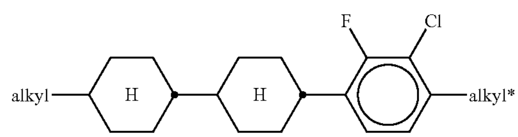

IIA-12

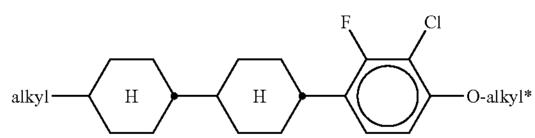

IIA-13

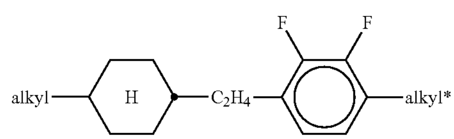

IIA-14

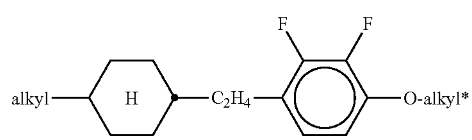

IIA-15

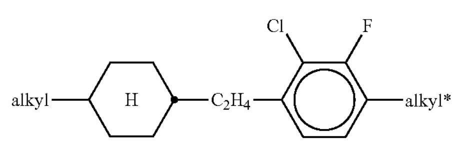

-continued
IIA-16
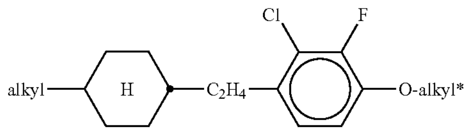
IIA-17
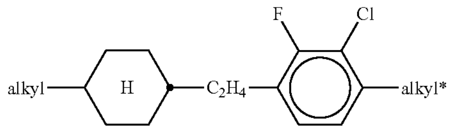
IIA-18
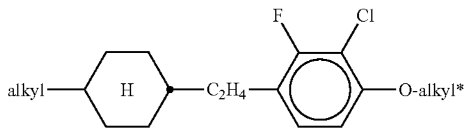
IIA-19
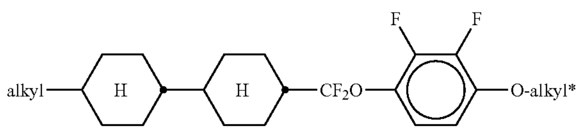
IIA-20
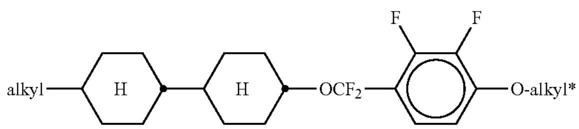
IIA-21
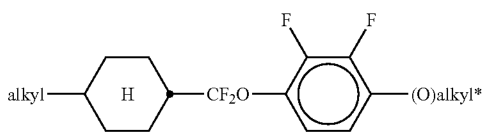
IIA-22
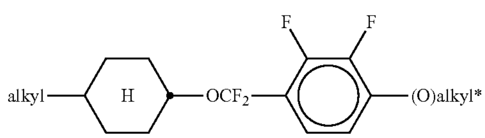
IIA-23
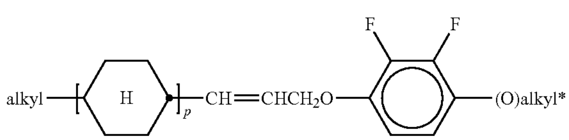
IIA-24
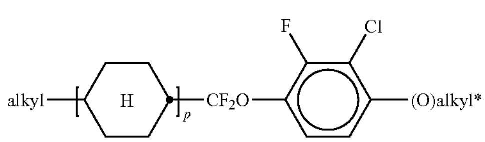
IIA-25
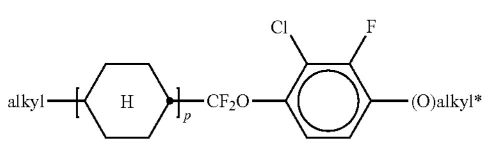
-continued
IIA-26
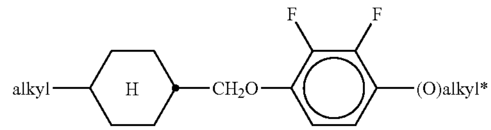
IIA-27
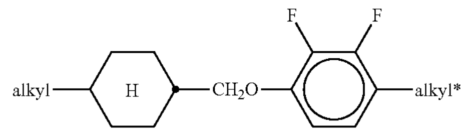
IIA-28
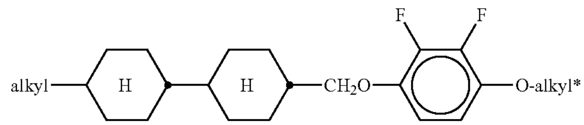
IIA-29
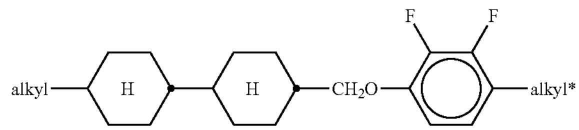
IIA-30
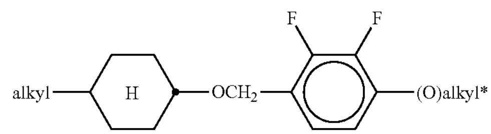
IIA-31
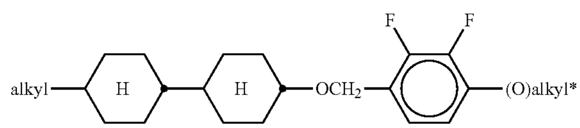
IIA-32
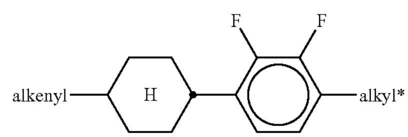
IIA-33
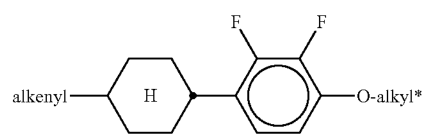
IIA-34
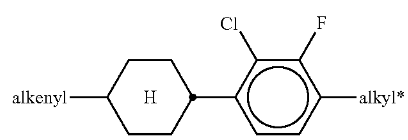
IIA-35
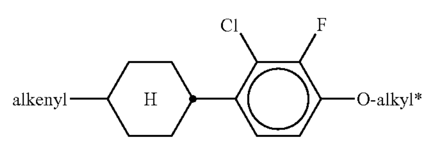
IIA-36
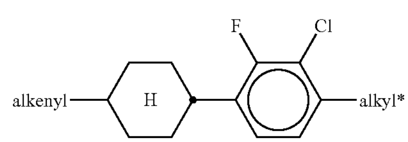

-continued
IIA-37
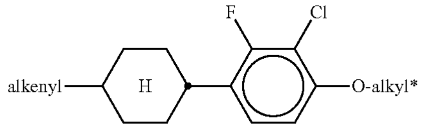
IIA-38
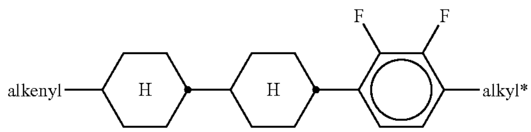
IIA-39
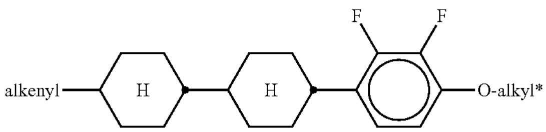
IIA-40
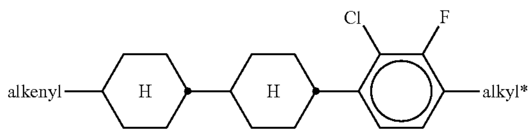
IIA-41
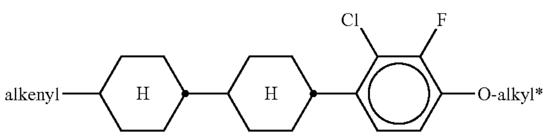
IIA-42
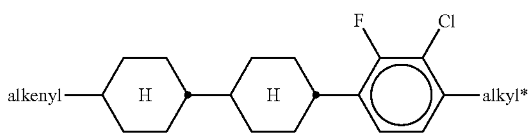
IIA-43
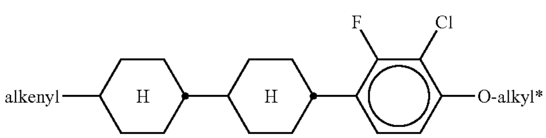
IIA-44
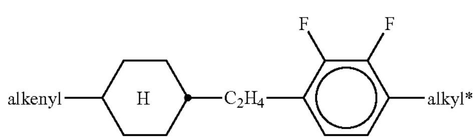
IIA-45
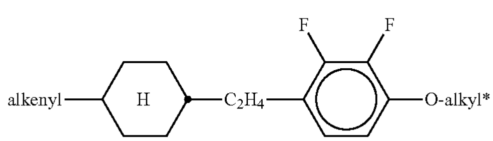
IIA-46
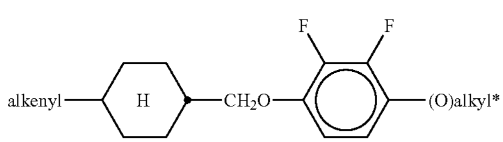
-continued
IIA-47
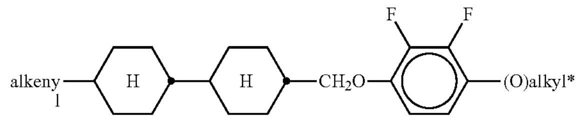
IIA-48
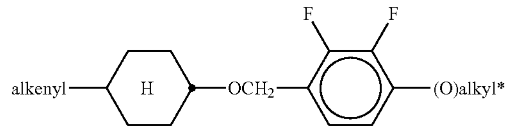
IIA-49
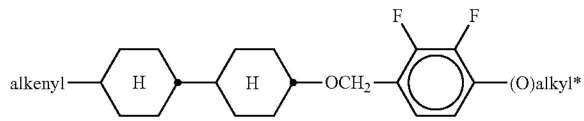
IIA-50
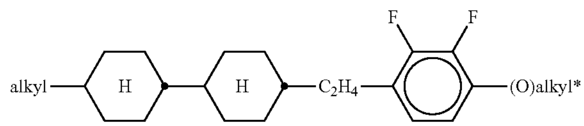
IIB-1
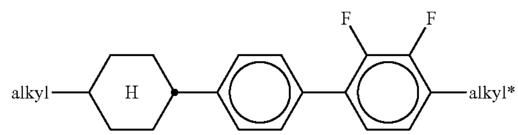
IIB-2
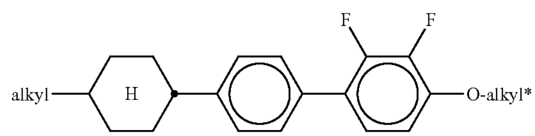
IIB-3
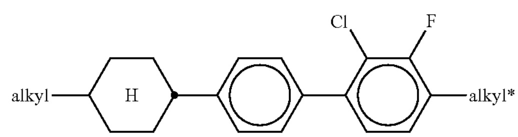
IIB-4
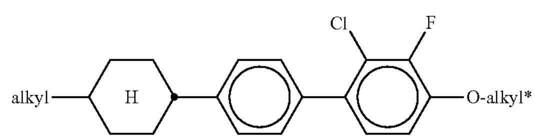
IIB-5
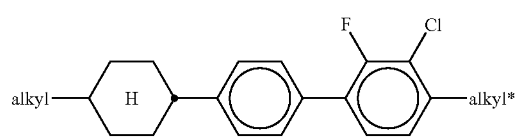
IIB-6
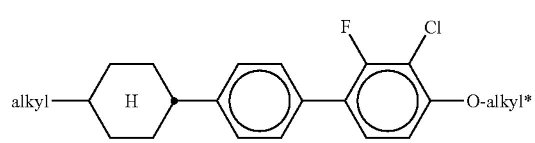

-continued

IIB-7

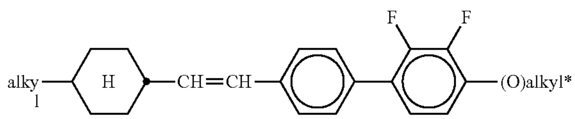

IIB-8

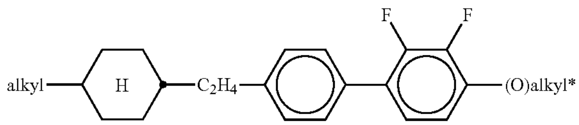

IIB-9

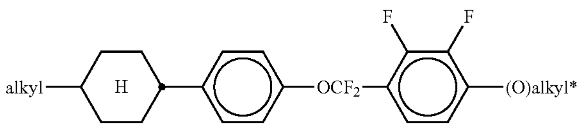

IIB-10

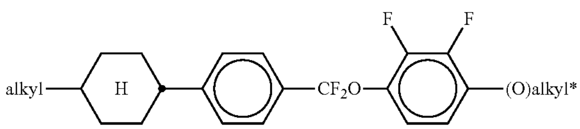

IIB-11

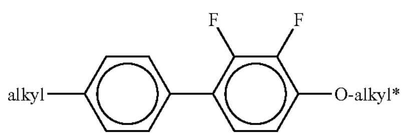

IIB-12

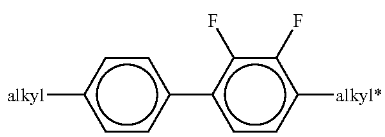

IIB-13

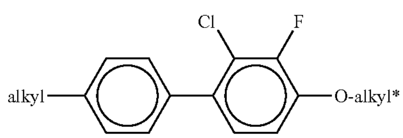

IIB-14

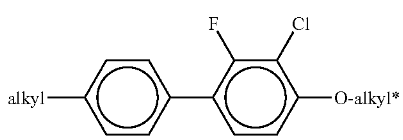

IIB-15

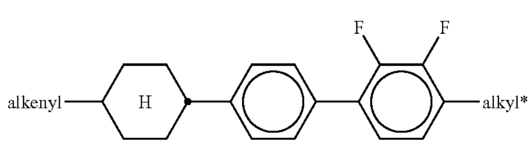

IIB-16

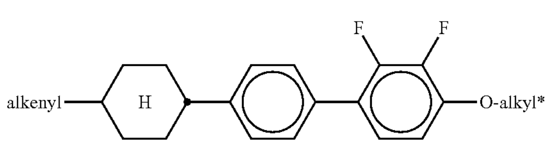

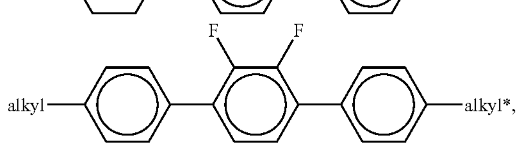

in which alkyl and alkyl* each, independently of one another, denote a straight-chain alkyl radical having 1-6 C atoms, alkenyl denotes a straight-chain alkenyl radical having 2-6 C atoms, and (O) denotes an oxygen atom or a single bond.

Particularly preferred mixtures according to the invention comprise one or more compounds selected from the formulae IIA-2, IIA-8, IIA-14, IIA-26, IIA-28, IIA-33, IIA-39, IIA-45, IIA-46, IIA-47, IIB-2, IIB-11, IIB-16 and IIC-1.

The proportion of compounds of the formulae IIA and/or IIB in the mixture as a whole is preferably at least 20% by weight.

Particularly preferred media according to the invention comprise at least one compound of the formula IIC-1,

IIC-1

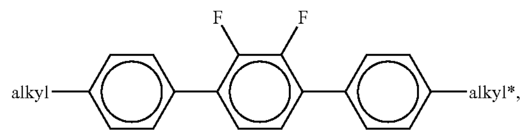

in which alkyl and alkyl* have the meanings indicated above, preferably in amounts of >3% by weight, in particular >5% by weight and particularly preferably 5-25% by weight.

b) Liquid-crystalline medium which additionally comprises one or more compounds of the formula III,

III

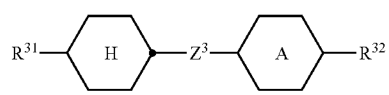

in which $R^{31}$ and $R^{32}$ each, independently of one another, denote a straight-chain alkyl, alkoxyalkyl or alkoxy radical having up to 12 C atoms,

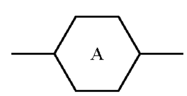

denotes

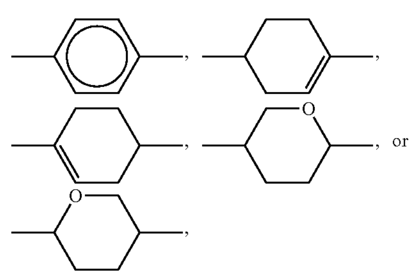

and $Z^3$ denotes a single bond, —$CH_2CH_2$—, —CH═CH—, —$CF_2O$—, —$OCF_2$—, —$CH_2O$—, —$OCH_2$—, —COO—, —OCO—, —$C_2F_4$—, —$C_4H_8$—, or —CF═CF—.

Preferred compounds of the formula III are indicated below:

IIIa
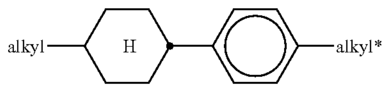

IIIb
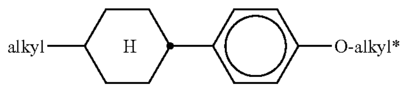

IIIc
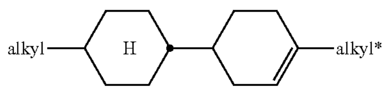

IIId
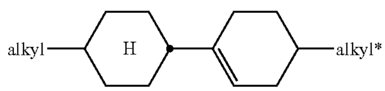

in which alkyl and alkyl* each, independently of one another, denote a straight-chain alkyl radical having 1-6 C atoms.

The medium according to the invention preferably comprises at least one compound of the formula IIIa and/or formula IIIb.

The proportion of compounds of the formula III in the mixture as a whole is preferably at least 5% by weight.

c) Liquid-crystalline medium which additionally comprises one or more tetracyclic compounds of the formulae V-1
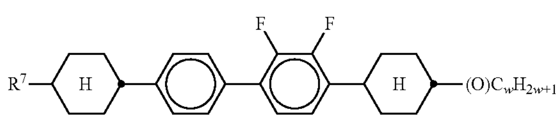

V-2
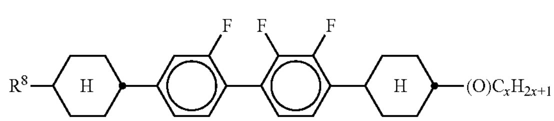

V-3
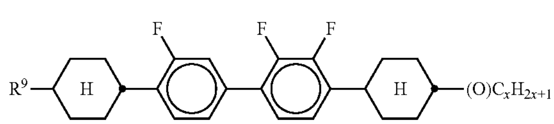

V-4
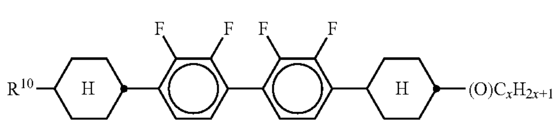

V-5
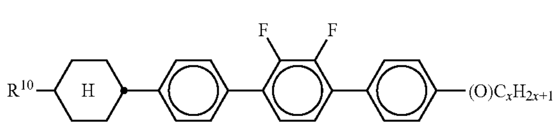

-continued

V-6
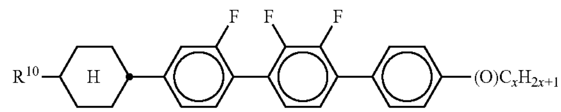

V-7
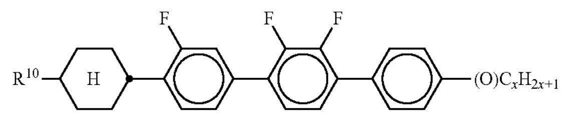

V-8
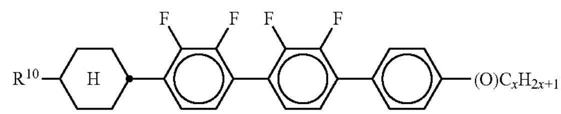

V-9
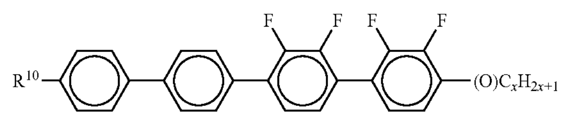

in which $R^{7-10}$ each, independently of one another, have one of the meanings indicated for $R^{2A}$ in formula IIA, w and x each, independently of one another, denote an integer from 1 to 6, and (O) denotes an oxygen atom or a single bond.

Particular preference is given to mixtures comprising at least one compound of the formula V-9.

d) Liquid-crystalline medium which additionally comprises one or more compounds of the formulae Y-1 to Y-6, Y-1
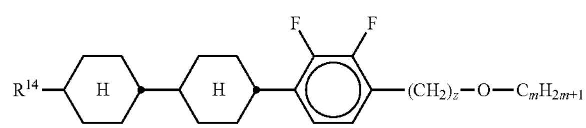

Y-2
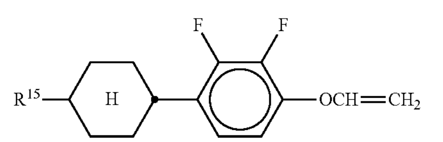

Y-3
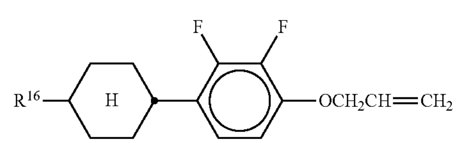

Y-4
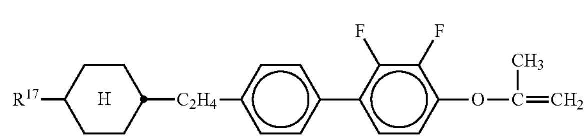

Y-5
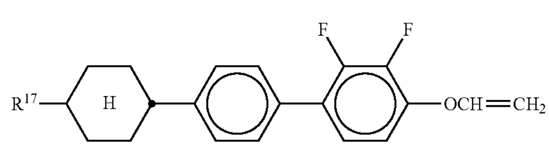

-continued

Y-6

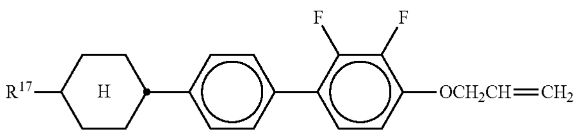

in which $R^{14}$-$R^{19}$ each, independently of one another, denotes an alkyl or alkoxy radical having 1-6 C atoms, and z and m each, independently of one another, denote an integer from 1 to 6.

The medium according to the invention particularly preferably comprises one or more compounds of the formulae Y-1 to Y-6, preferably in amounts of ≥5% by weight.

e) Liquid-crystalline medium additionally comprising one or more fluorinated terphenyls of the formulae T-1 to T-21,

T-1

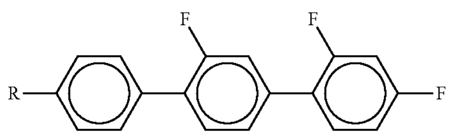

T-2

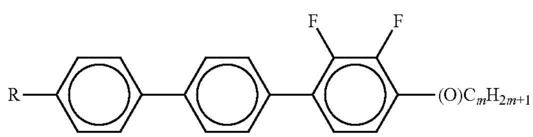

T-3

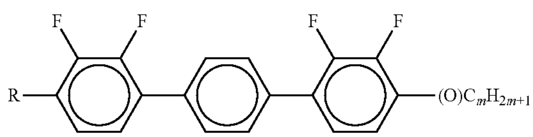

T-4

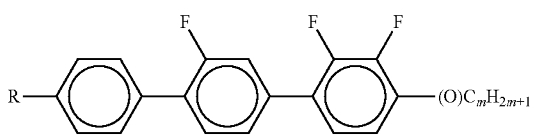

T-5

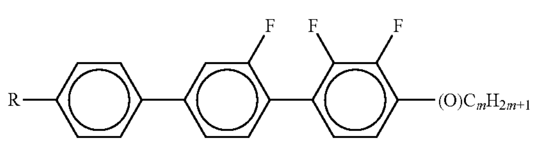

T-6

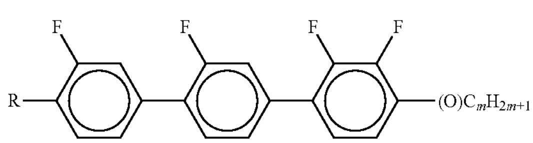

T-7

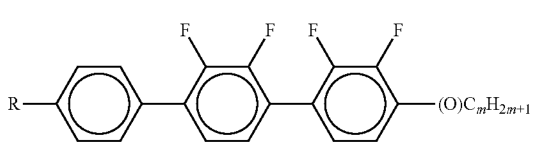

-continued

T-8

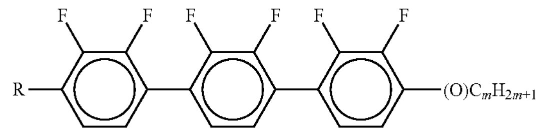

T-9

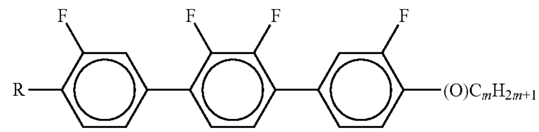

T-10

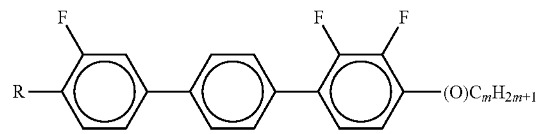

T-11

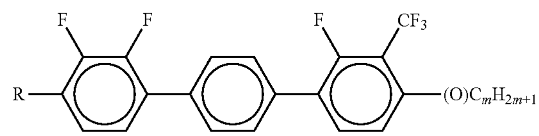

T-12

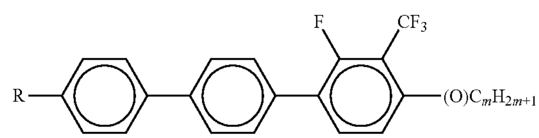

T-13

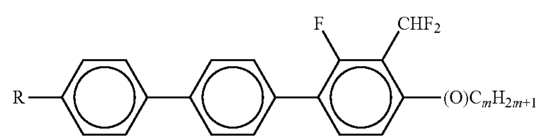

T-14

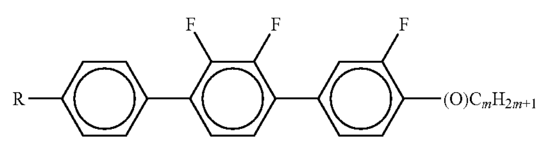

T-15

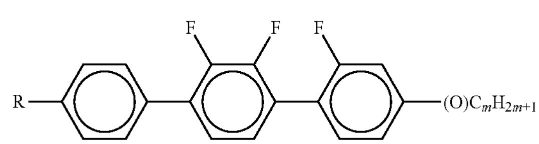

T-16

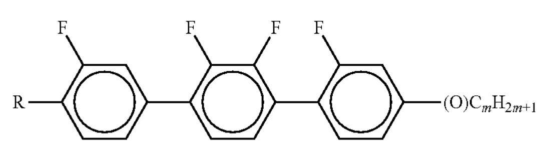

T-17

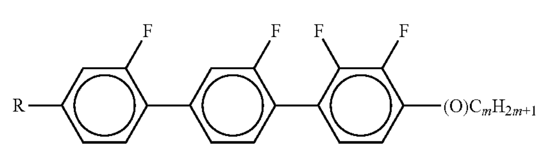

-continued

T-18

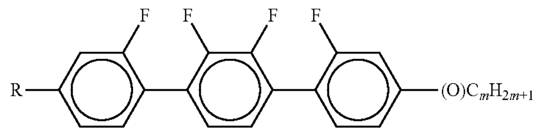

T-19

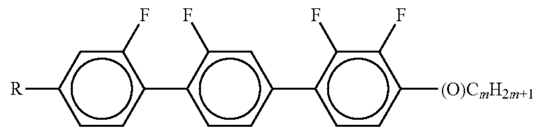

T-20

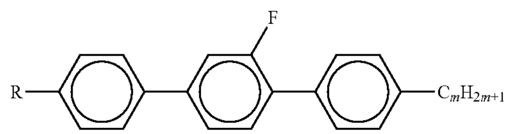

T-21

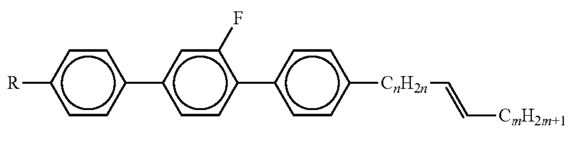

in which

R denotes a straight-chain alkyl or alkoxy radical having 1-7 C atoms or alkenyl having 2-7 C atoms, (O) denotes an oxygen atom or a single bond, and m=0, 1, 2, 3, 4, 5 or 6 and n denotes 0, 1, 2, 3 or 4.

R preferably denotes methyl, ethyl, propyl, butyl, pentyl, hexyl, methoxy, ethoxy, propoxy, butoxy, pentoxy.

The medium according to the invention preferably comprises the terphenyls of the formulae T-1 to T-21 in amounts of 2-30% by weight, in particular 5-20% by weight.

Particular preference is given to compounds of the formulae T-1, T-2, T-20 and T-21. In these compounds, R preferably denotes alkyl, furthermore alkoxy, each having 1-5 C atoms. In the compounds of the formula T-20, R preferably denotes alkyl or alkenyl, in particular alkyl. In the compound of the formula T-21, R preferably denotes alkyl.

The terphenyls are preferably employed in the mixtures according to the invention if the Δn value of the mixture is to be ≥0.1. Preferred mixtures comprise 2-20% by weight of one or more terphenyl compounds selected from the group of the compounds T-1 to T-21. Particular preference is given to compounds of the formula T-4.

f) Liquid-crystalline medium additionally comprising one or more biphenyls of the formulae B-1 to B-4,

B-1

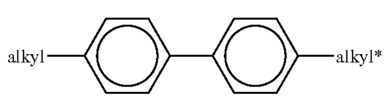

B-2

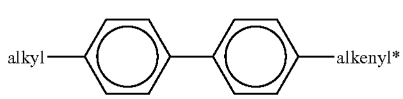

B-3

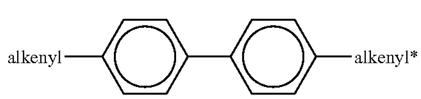

-continued

B-4

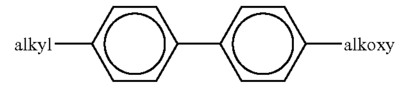

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, and alkoxy denotes a straight-chain alkoxy radical having 1-6 C atoms.

The proportion of the biphenyls of the formulae B-1 to B-4 in the mixture as a whole is preferably at least 3% by weight, in particular ≥5% by weight.

Of the compounds of the formulae B-1 to B-4, the compounds of the formula B-2 are particularly preferred.

Particularly preferred biphenyls are

B-1a

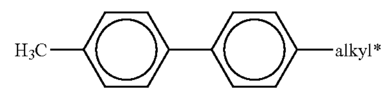

B-2a

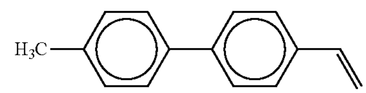

B-2b

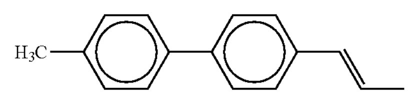

B-2c

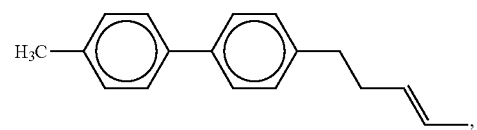

in which alkyl* denotes an alkyl radical having 1-6 C atoms. The medium according to the invention particularly preferably comprises one or more compounds of the formulae B-1a and/or B-2c.

g) Liquid-crystalline medium comprising at least one compound of the formulae Z-1 to Z-7,

Z-1

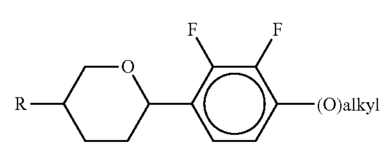

Z-2

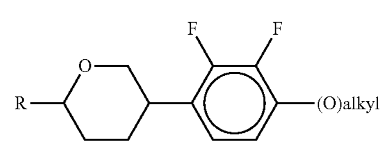

Z-3

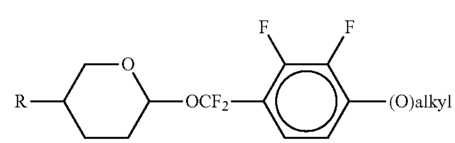

-continued

Z-4

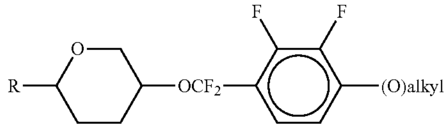

Z-5

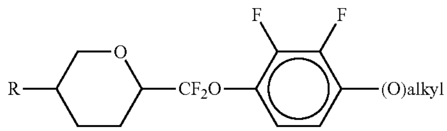

Z-6

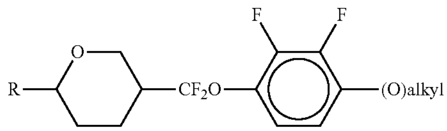

Z-7

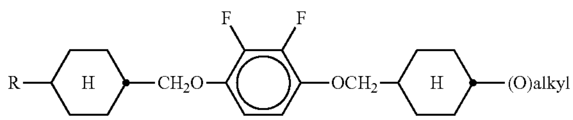

in which

R denotes a straight-chain alkyl or alkoxy radical having 1-7 C atoms or an alkenyl radical having 2-7 C atoms, alkyl denotes an alkyl radical having 1-6 C atoms, and (O)alkyl denotes alkyl or Oalkyl.

h) Liquid-crystalline medium comprising at least one compound of the formulae O-1 to O-17,

O-1

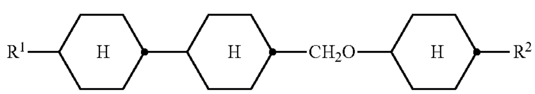

O-2

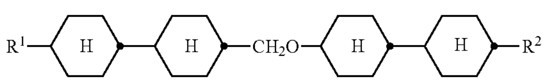

O-3

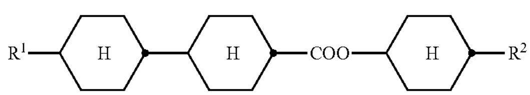

O-4

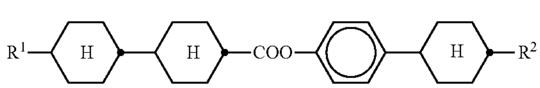

O-5

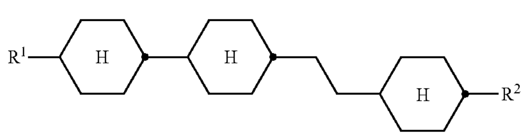

O-6

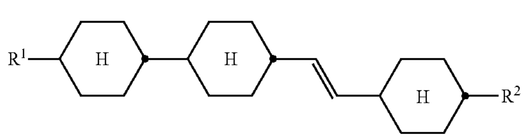

-continued

O-7

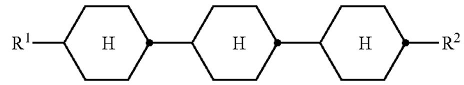

O-8

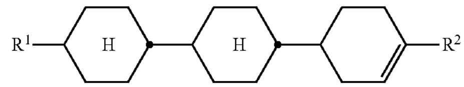

O-9

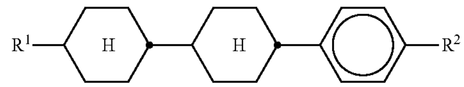

O-10

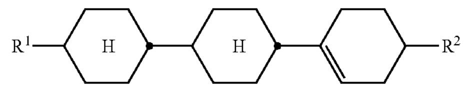

O-11

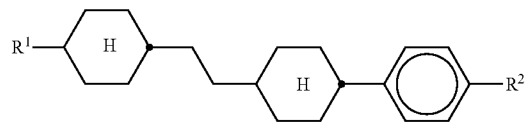

O-12

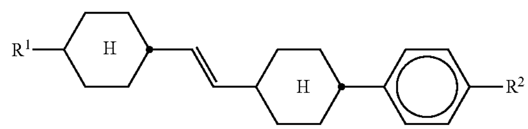

O-13

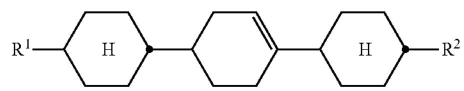

O-14

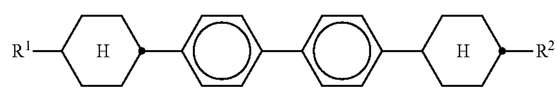

O-15

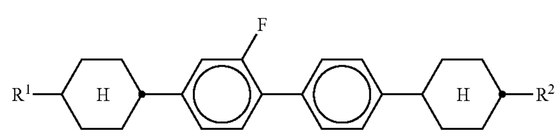

O-16

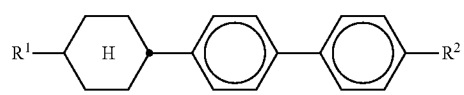

O-17

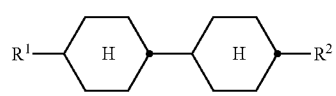

in which $R^1$ and $R^2$ have the meanings indicated for $R^{2A}$ in formula IIA and the compounds of the formula O-17 are not identical with the compounds of the formulae I1 and I2. $R^1$ and $R^2$ preferably each, independently of one another, denote straight-chain alkyl having 1-6 C atoms or $R^1$ denotes straight-chain alkyl having 1-6 C atoms and $R^2$ denotes alkenyl having 2-6 C atoms.

Preferred media comprise one or more compounds of the formulae O-1, O-3, O-4, O-5, O-9, O-12, O-14, O-15, O-16 and/or O-17.

Mixtures according to the invention very particularly preferably comprise the compounds of the formulae O-9, O-12, O-16 and/or O-17, in particular in amounts of 5-30%.

Preferred compounds of the formulae O-9 and O-17 are indicated below:

O-9a

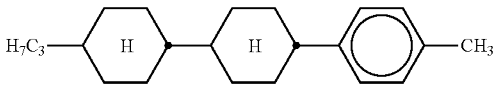

O-9b

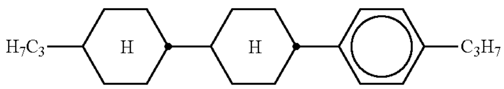

O-17a

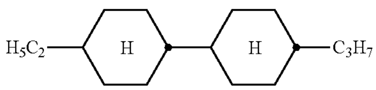

O-17b

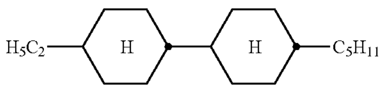

The medium according to the invention particularly preferably comprises the tricyclic compounds of the formula O-9a and/or of the formula O-9b in combination with one or more bicyclic compounds of the formulae O-17a and O-17b. The total proportion of the compounds of the formulae O-9a and/or O-9b in combination with one or more compounds selected from the bicyclic compounds of the formulae O-17a and O-17b is preferably 5-40%, very particularly preferably 15-35%.

Very particularly preferred mixtures comprise the compounds O-9a and O-17a:

O-9a

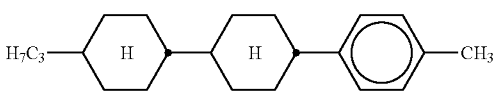

O-17a

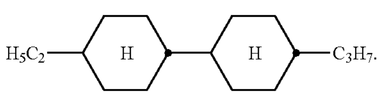

The compounds O-9a and O-17a are preferably present in the mixture in a concentration of 15-35%, particularly preferably 15-25% and especially preferably 18-22%, based on the mixture as a whole.

Very particularly preferred mixtures comprise the compounds O-9b and O-17a:

O-9b

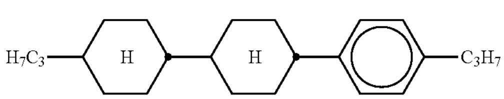

O-17a

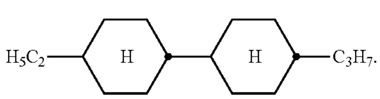

The compounds O-9b and O-17a are preferably present in the mixture in a concentration of 15-35%, particularly preferably 15-25% and especially preferably 18-22%, based on the mixture as a whole.

Very particularly preferred mixtures comprise the following three compounds:

O-9a

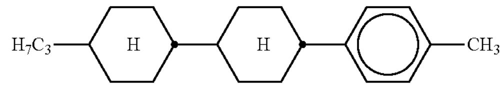

O-9b

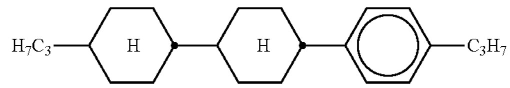

O-17a

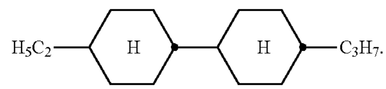

The compounds O-9a, O-9b and O-17a are preferably present in the mixture in a concentration of 15-35%, particularly preferably 15-25% and especially preferably 18-22%, based on the mixture as a whole.

Preferred compounds of the formula O-17 are furthermore the compounds selected from the group of the compounds of the formulae O-17e

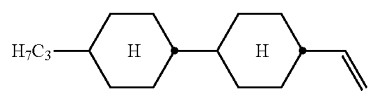

O-17f

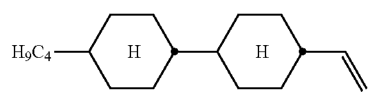

O-17g

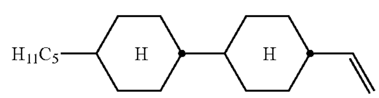

O-17h

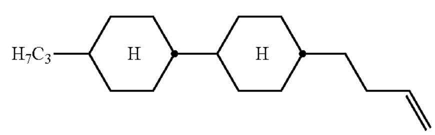

O-17i

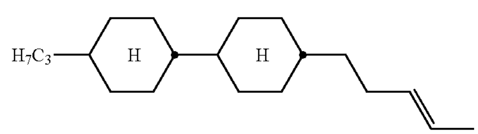

O-17j

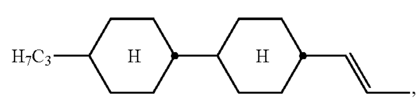

preferably in each case in amounts of ≥3% by weight, in particular ≥10% by weight.

Preferred mixtures comprise 5-60% by weight, preferably 10-55% by weight, in particular 20-50% by weight, of the compound of the formula O-17e O-17e

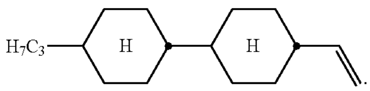

Preference is furthermore given to liquid-crystalline mixtures which comprise the compound O-17e

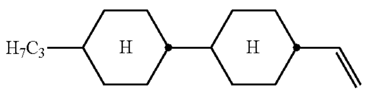

and the compound O-17j

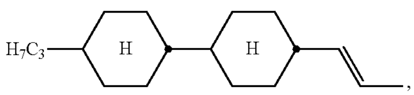

preferably in total amounts of 3-60% by weight.

i) Liquid-crystalline medium comprising one or more compounds of the formula BA

BA

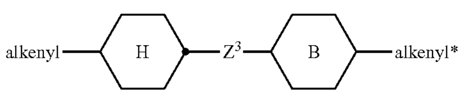

in which alkenyl and alkenyl* each, independently of one another, denote a straight-chain alkenyl radical having 2-12 C atoms,

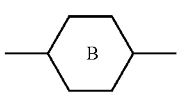

denotes

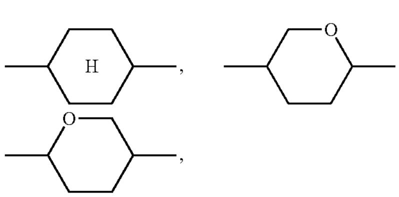

and $Z^3$ denotes a single bond, —$CH_2CH_2$—, —CH═CH—, —$CF_2O$—, —$OCF_2$—, —$CH_2O$—, —$OCH_2$—, —COO—, —OCO—, —$C_2F_4$—, —$C_4H_8$—, or —CF═CF—.

Preferred compounds of the formula BA are indicated below:

BA-1

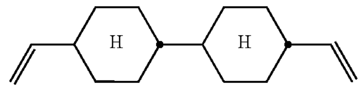

BA-2

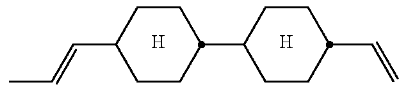

BA-3

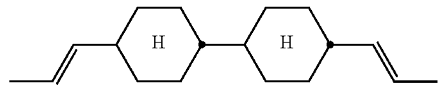

BA-4

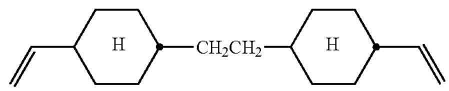

BA-5

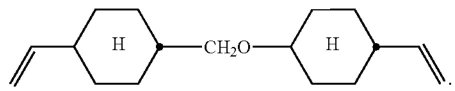

Preferred mixtures comprise one or more compounds selected from the group of compounds of formulae O-17e to O-17ij and BA-1 to BA-3.

j) Preferred liquid-crystalline media according to the invention comprise one or more substances which contain a tetrahydronaphthyl or naphthyl unit, such as, for example, the compounds of the formulae N-1 to N-5,

N-1

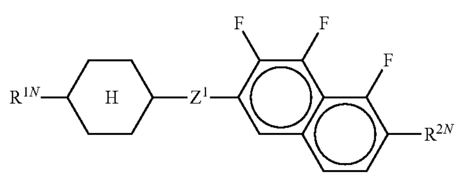

N-2

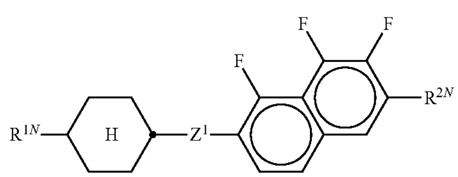

N-3

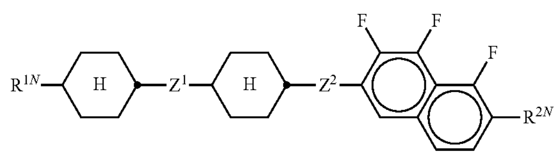

N-4

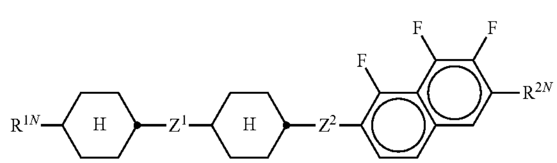

-continued

N-5

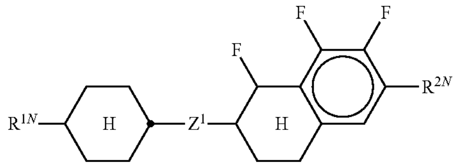

in which $R^{1N}$ and $R^{2N}$ each, independently of one another, have the meanings indicated for $R^{2A}$ in formula IIA, preferably denote straight-chain alkyl, straight-chain alkoxy or straight-chain alkenyl, and $Z^1$ and $Z^2$ each, independently of one another, denote —$C_2H_4$—, —CH═CH—, —$(CH_2)_4$—, —$(CH_2)_3O$—, —$O(CH_2)_3$—, —$CH{=}CHCH_2CH_2$—, —$CH_2CH_2CH{=}CH$—, —$CH_2O$—, —$OCH_2$—, —COO—, —OCO—, —$C_2F_4$—, —CF═CF—, —CF═CH—, —CH═CF—, —$CF_2O$—, —$OCF_2$—, —$CH_2$— or a single bond.

k) Preferred mixtures comprise one or more compounds selected from the group of the difluorodibenzochroman compounds of the formula BC, chromans of the formula CR, fluorinated phenanthrenes of the formulae PH-1 and PH-2, fluorinated dibenzofurans of the formulae BF-1 and BF-2, and fluorinated dibenzothiophenes of the formulae BS-1 and BS-2,

BC

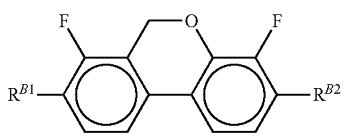

CR

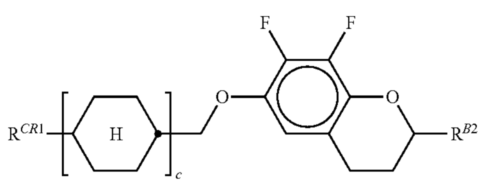

PH-1

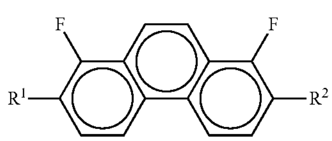

PH-2

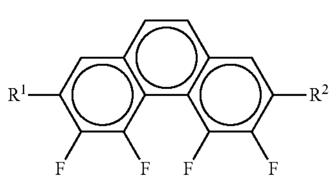

BF-1

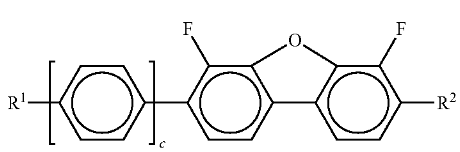

BF-2

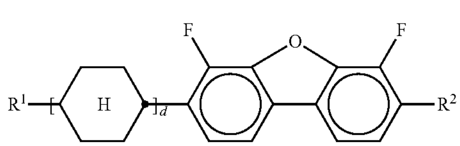

-continued

BS-1

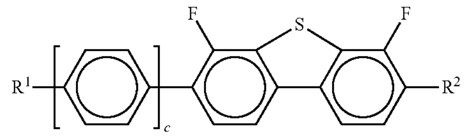

BS-2

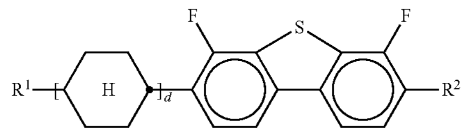

in which $R^{B1}$, $R^{B2}$, $R^{CR1}$, $R^{CR2}$, $R^1$, $R^2$ each, independently of one another, have the meaning of $R^{2A}$ in formula IIA. c is 0, 1 or 2. d is 1 or 2. $R^1$ and $R^2$ preferably, independently of one another, denote alkyl, alkoxy, alkenyl or alkenyloxy having 1 to 6 or 2 to 6 C atoms respectively.

The mixtures according to the invention preferably comprise the compounds of the formulae BC, CR, PH-1, PH-2, BF-1, BF-2, BS-1 and/or BS-2 in amounts of 3 to 20% by weight, in particular in amounts of 3 to 15% by weight.

Particularly preferred compounds of the formulae BC, CR, BF and BS are the compounds BC-1 to BC-7, CR-1 to CR-5, BF-1a to BF-1d, and BS-1a to BS-1d,

BC-1

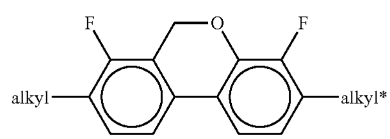

BC-2

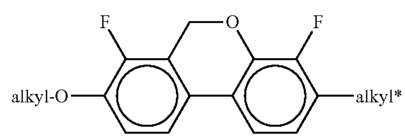

BC-3

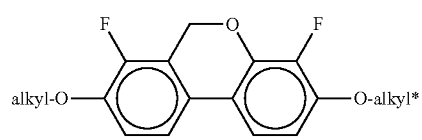

BC-4

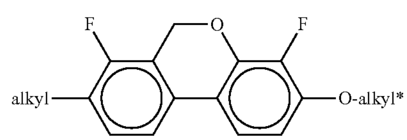

BC-5

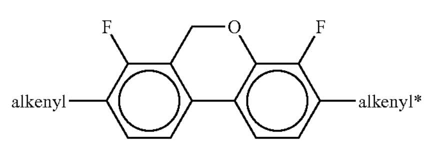

BC-6

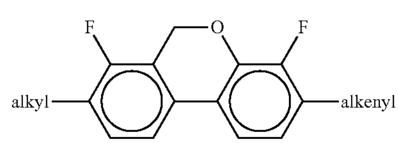

-continued

BC-7

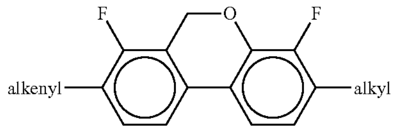

CR-1

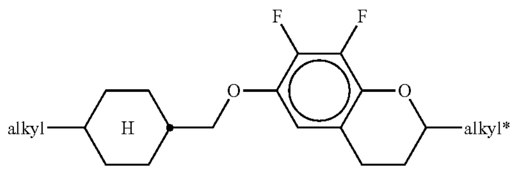

CR-2

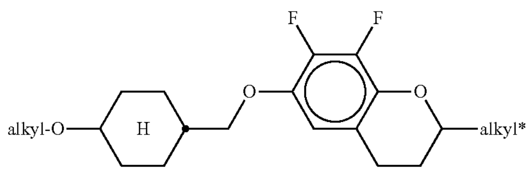

CR-3

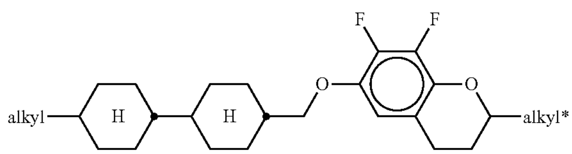

CR-4

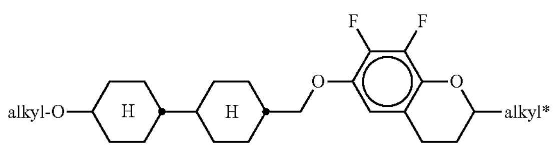

CR-5

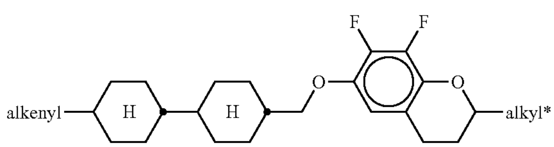

BF-1a

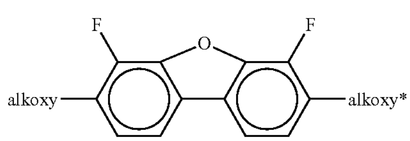

BF-1b

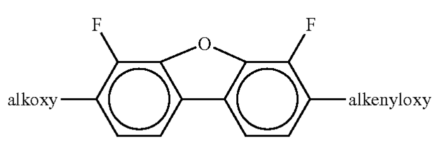

BF-1c

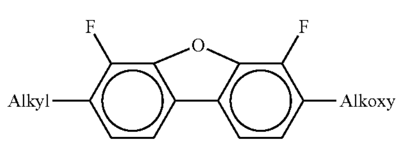

BF-1d

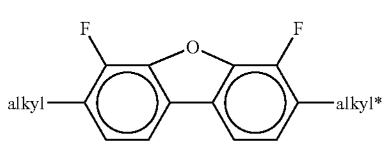

-continued

BS-1a

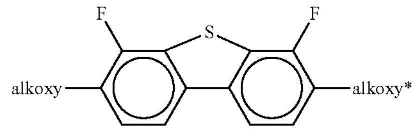

BS-1b

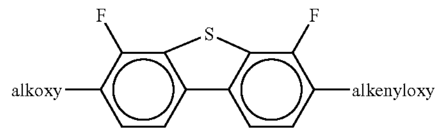

BS-1c

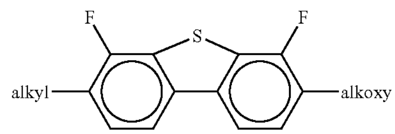

BS-1d

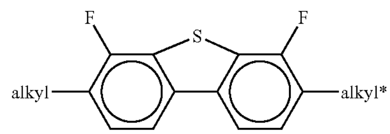

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms, and alkenyloxy denotes a straight-chain alkenyloxy radical having 2-6 C atoms.

Very particular preference is given to mixtures comprising one, two or three compounds of the formulae BC-2 and/or BF-1a.

l) Preferred mixtures comprise one or more indane compounds of the formula In,

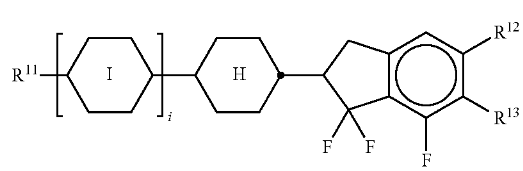

in which $R^{11}$, $R^{12}$, $R^{13}$ each, independently of one another, denote a straight-chain alkyl, alkoxy, alkoxyalkyl or alkenyl radical having 1-6 C atoms or 2-6 C atoms respectively, $R^{12}$ and $R^{13}$ additionally denote halogen, preferably F,

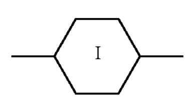

denotes

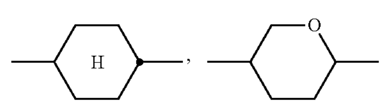

-continued
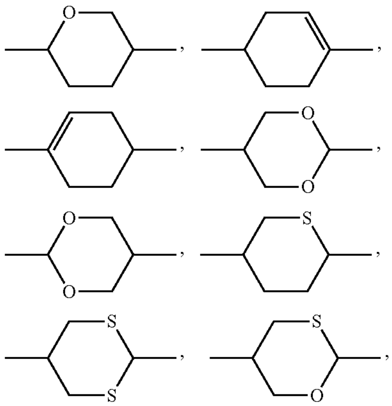
i denotes 0, 1 or 2.
Preferred compounds of the formula In are the compounds of the formulae In-1 to In-16 indicated below:
In-1
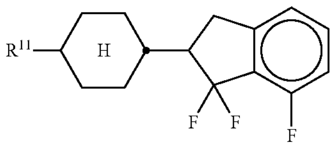
In-2
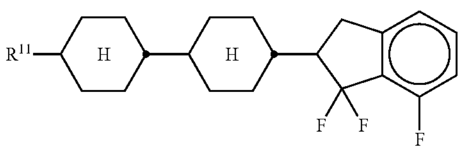
In-3
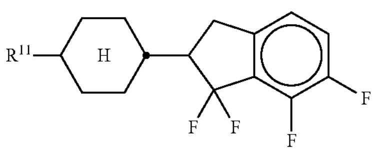
In-4
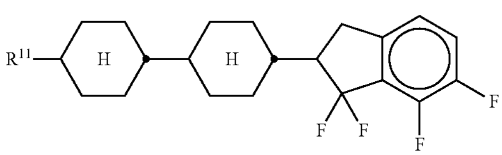
In-5
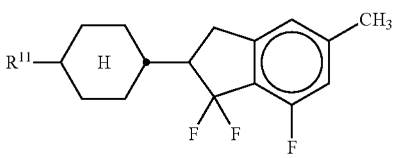
In-6
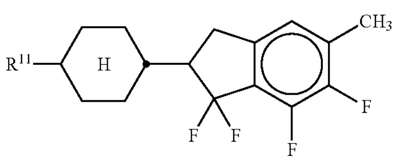
-continued
In-7
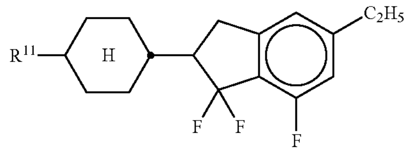
In-8
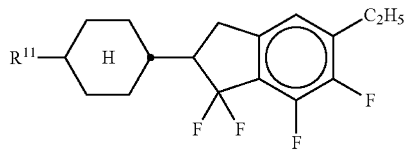
In-9
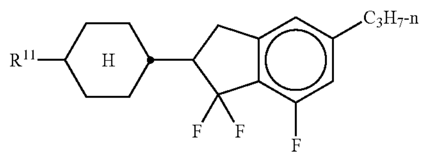
In-10
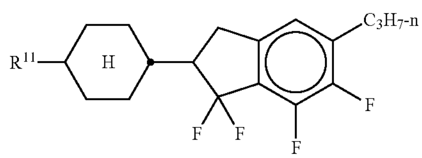
In-11
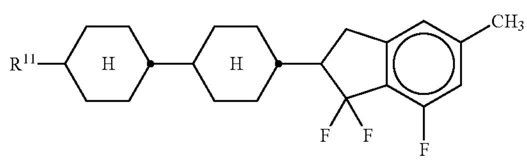
In-12
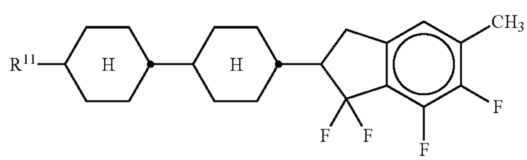
In-13
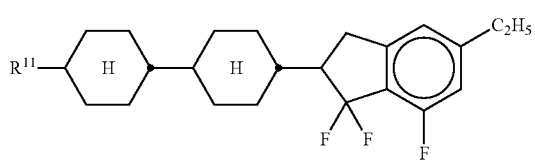
In-14
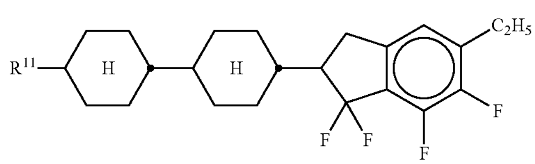
In-15
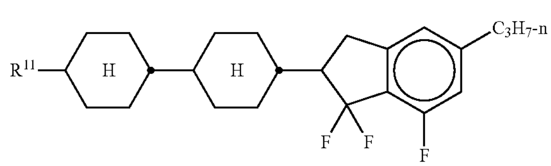

-continued

In-16

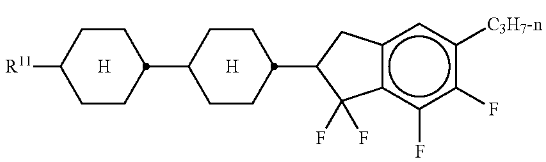

Particular preference is given to the compounds of the formulae In-1, In-2, In-3 and In-4.

The compounds of the formula In and the sub-formulae In-1 to In-16 are preferably employed in the mixtures according to the invention in concentrations 5% by weight, in particular 5-30% by weight and very particularly preferably 5-25% by weight.

m) Preferred mixtures additionally comprise one or more compounds of the formulae L-1 to L-11,

L-1

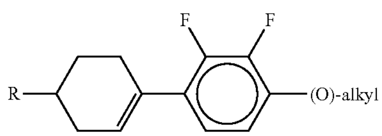

L-2

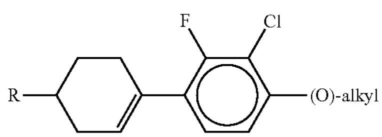

L-3

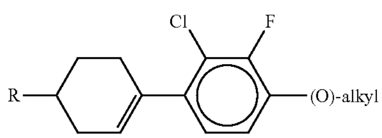

L-4

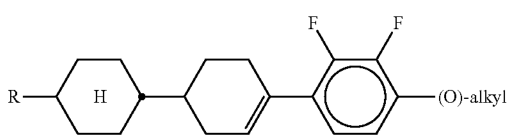

L-5

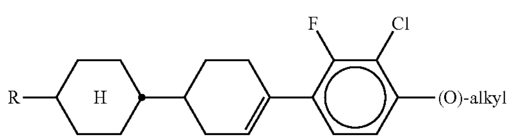

L-6

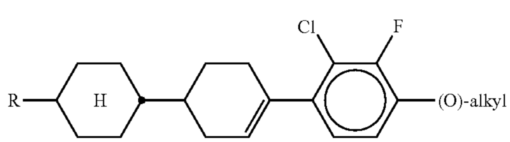

L-7

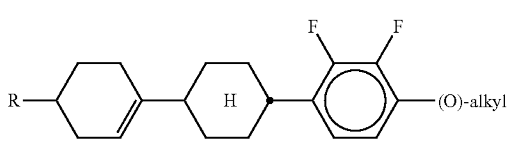

-continued

L-8

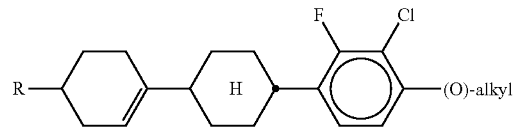

L-9

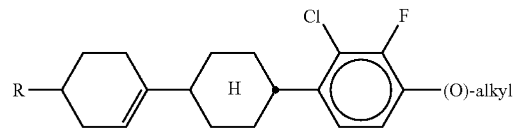

L-10

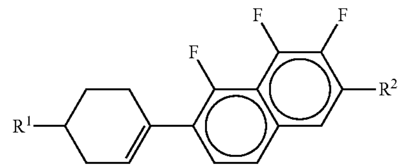

L-11

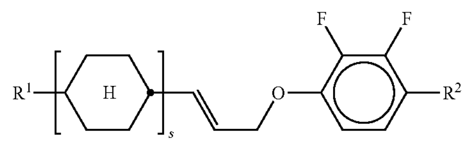

in which

R, $R^1$ and $R^2$ each, independently of one another, have the meanings indicated for $R^{2A}$ in Claim 3, (O) denotes an oxygen atom or a single bond, and alkyl denotes an alkyl radical having 1-6 C atoms. s denotes 1 or 2.

Particular preference is given to the compounds of the formulae L-1 and L-4, in particular L-4.

The compounds of the formulae L-1 to L-11 are preferably employed in concentrations of 5-50% by weight, in particular 5-40% by weight and very particularly preferably 10-40% by weight.

n) The medium comprises, with the exception of the polymerizable compounds, no compounds containing an alkenyl group.

o) The medium additionally comprises one or more compounds selected from the following formulae:

Q-1

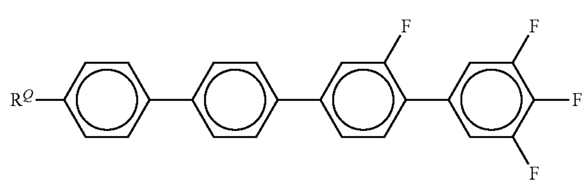

Q-2

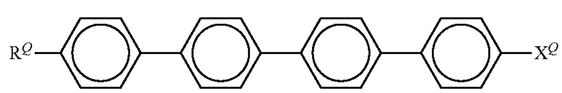

Q-3

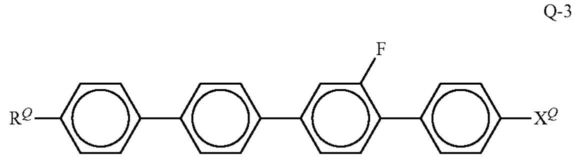

-continued

Q-4

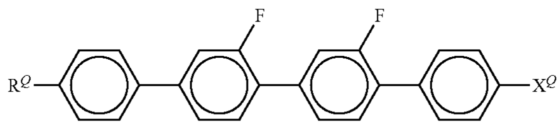

Q-5

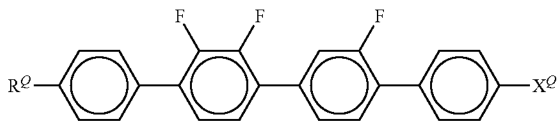

Q-6

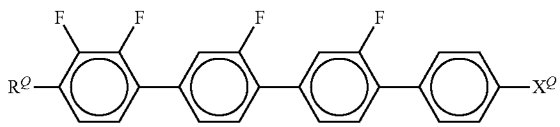

Q-7

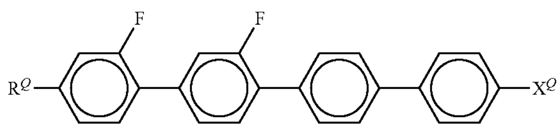

Q-8

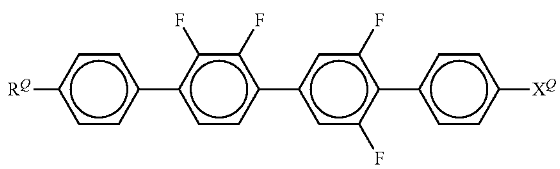

Q-9

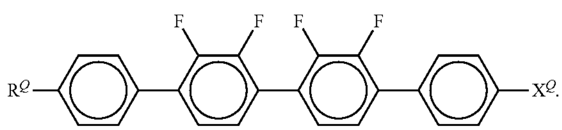

In the compounds of the formulae Q-1 to Q-9, $R^Q$ and $X^Q$ each, independently of one another, have the meanings of $R^{2A}$ in formula IIA. $R^Q$ and $X^Q$ preferably denote a straight-chain alkyl radical having 1-6 C atoms, in particular having 2-5 C atoms.

Particularly preferred mixture concepts are indicated below: (the acronyms used are explained in Tables 1-3 and in Table A. n and m here each, independently of one another, denote 1-6).

The mixtures according to the invention preferably comprise

PYP-n-m, in particular PYP-2-3 and/or PYP-2-4, preferably in concentrations >5%, in particular 8-30%, based on the mixture as a whole, and/or CPY-n-Om, in particular CPY-2-O2, CPY-3-O2 and/or CPY-5-O2, preferably in concentrations >5%, in particular 10-30%, based on the mixture as a whole, and/or B-nO-Om, preferably in concentrations of 1-15, and/or CY-n-Om, preferably CY-3-O2, CY-3-O4, CY-5-O2 and/or CY-5-O4, preferably in concentrations >5%, in particular 15-50%, based on the mixture as a whole, and/or CCY-n-Om, preferably CCY-4-O2, CCY-3-O2, CCY-3-O3, CCY-3-O1 and/or CCY-5-O2, preferably in concentrations >5%, in particular 10-30%, based on the mixture as a whole, and/or CLY-n-Om, preferably CLY-2-O4, CLY-3-O2 and/or CLY-3-O3, preferably in concentrations >5%, in particular 10-30%, based on the mixture as a whole, and/or CK-n-F, preferably CK-3-F, CK-4-F and/or CK-5-F, preferably >5%, in particular 5-25%, based on the mixture as a whole.

Preference is furthermore given to mixtures according to the invention which comprise the following mixture concepts: (n and m each, independently of one another, denote 1-6.)

CPY-n-Om and CY-n-Om, preferably in concentrations of 10-80%, based on the mixture as a whole, and/or CPY-n-Om and CK-n-F, preferably in concentrations of 10-70%, based on the mixture as a whole, and/or CPY-n-Om and PY-n-Om, preferably CPY-2-O2 and/or CPY-3-O2 and PY-3-O2, preferably in concentrations of 10-40%, based on the mixture as a whole, and/or CPY-n-Om and CLY-n-Om, preferably in concentrations of 10-80%, based on the mixture as a whole, and/or CC-3-V1, preferably in amounts of 3-15% and/or

CC-V-V, preferably in amounts of 5-60% and/or

CC-3-V, preferably in amounts of 5-60% and/or

PGIY-n-Om, preferably in amounts of 3-15%, and/or

CC-n-2V1, preferably in amounts of 3-20%.

The liquid-crystalline medium according to the invention preferably has a nematic phase from ≤−20° C. to ≥70° C., particularly preferably from ≤−30° C. to ≥80° C., very particularly preferably from ≤−40° C. to ≥90° C.

The expression "have a nematic phase" here means on the one hand that no smectic phase and no crystallization are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 $mm^2 \cdot s^{-1}$ at 20° C.

The values of the birefringence Δn in the liquid-crystal mixture are generally between 0.07 and 0.16, preferably between 0.08 and 0.13.

The liquid-crystal mixture according to the invention has a Δε of −0.5 to −8.0, in particular −2.5 to −6.0, where Δε denotes the dielectric anisotropy. The rotational viscosity γ1 at 20° C. is preferably ≤150 mPa·s, in particular ≤130 mPa·s.

The liquid-crystal media according to the invention have relatively small values for the threshold voltage ($V_0$). They are preferably in the range from 1.7 V to 3.0 V, particularly preferably ≤2.5 V and very particularly preferably ≤2.3 V.

For the present invention, the term "threshold voltage" relates to the capacitive threshold ($V_0$), also known as the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a $\Delta\varepsilon>1.5$, the term "dielectrically neutral compounds" denotes those where $-1.5\leq\Delta\varepsilon\leq1.5$ and the term "dielectrically negative compounds" denotes those having $\Delta\varepsilon<-1.5$. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The mixtures according to the invention are suitable for all VA-TFT applications, such as, for example, VAN, MVA, (S)-PVA ((super)-patterned vertical alignment), ASV, PSA (polymer sustained VA), SS (surface-stabilized)-VA and PS-VA (polymer stabilized VA). They are furthermore suitable for IPS (in-plane switching) and FFS (fringe field switching), in particular UB-FFS, having negative $\Delta\varepsilon$.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of ≤−0.5. Besides one or more compounds of the formulae I1, I2 and EY, it preferably comprises one or more compounds of the formulae IIA, IIB and/or IIC, furthermore one or more compounds of the formula III.

The proportion of component A is preferably between 45 and 100%, in particular between 60 and 100%.

For component A, one (or more) individual compound(s) which has (have) a value of $\Delta\varepsilon\leq-0.8$ is (are) preferably selected. This value must be more negative, the smaller the proportion A in the mixture as a whole.

Component B has pronounced nematogeneity and a flow viscosity of not greater than 30 $mm^2\cdot s^{-1}$, preferably not greater than 25 $mm^2\cdot s^{-1}$, at 20° C.

A multiplicity of suitable materials is known to the person skilled in the art from the literature. Particular preference is given to compounds of the formula III.

Particularly preferred individual compounds in component B are extremely low-viscosity nematic liquid crystals having a flow viscosity of not greater than 18 $mm^2\cdot s^{-1}$, preferably not greater than 12 $mm^2\cdot s^{-1}$, at 20° C.

Component B is monotropically or enantiotropically nematic, has no smectic phases and is able to prevent the occurrence of smectic phases down to very low temperatures in liquid-crystal mixtures. For example, if various materials of high nematogeneity are in each case added to a smectic liquid-crystal mixture, the nematogeneity of these materials can be compared through the degree of suppression of smectic phases that is achieved.

The mixture may optionally also comprise a component C, comprising compounds having a dielectric anisotropy of $\Delta\varepsilon\leq1.5$. These so-called positive compounds are generally present in a mixture of negative dielectric anisotropy in amounts of ≤20% by weight, based on the mixture as a whole.

If the mixture according to the invention comprises one or more compounds having a dielectric anisotropy of $\Delta\varepsilon\geq1.5$, these are preferably one or more compounds of the formulae P-1 and/or P-2,

P-1

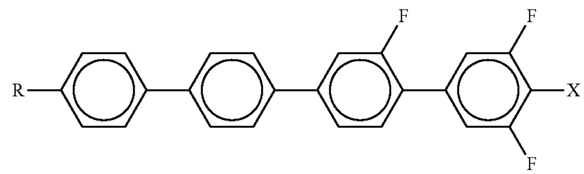

P-2

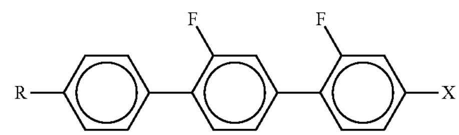

in which

R denotes straight-chain alkyl, alkoxy or alkenyl, each having 1 or 2 to 6 C atoms respectively, and X denotes F, Cl, $CF_3$, $OCF_3$, $OCHFCF_3$ or $CCF_2CHFCF_3$, preferably F or $OCF_3$.

The compounds of the formulae P-1 and/or P-2 are preferably employed in the mixtures according to the invention in concentrations of 0.5-10% by weight, in particular 0.5-8% by weight.

Particular preference is given to the compound of the formula

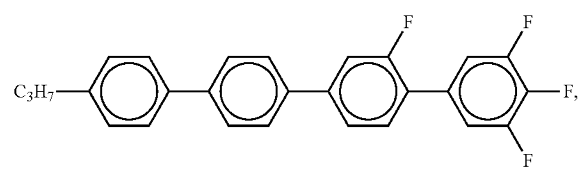

which is preferably employed in amounts of 0.5-3% by weight.

In addition, these liquid-crystal phases may also comprise more than 18 components, preferably 18 to 25 components.

Besides one or more compounds of the formula I, the phases preferably comprise 4 to 15, in particular 5 to 12, and particularly preferably <10, compounds of the formulae IIA, IIB and/or IIC and optionally III.

Besides compounds of the formulae I1, I2 and EY and the compounds of the formulae IIA, IIB and/or IIC and optionally III, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterized by the formula IV, $$R^{20}\text{-L-G-E-}R^{21} \qquad \text{IV}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline, G denotes —CH═CH— —N(O)═N—
—CH═CQ- —CH═N(O)—
—C≡C— —$CH_2$—$CH_2$—
—CO—O— —$CH_2$—O—
—CO—S— —$CH_2$—S—
—CH═N— —COO-Phe-COO—
—$CF_2$O— —CF═CF—
—$OCF_2$— —$OCH_2$—
—$(CH_2)_4$— —$(CH_2)_3$O— or a C—C single bond, Phe denotes phenylene, Q denotes halogen, preferably chlorine, or —CN, and $R^{20}$ and $R^{21}$ each denote alkyl, alkenyl, alkoxy, alkoxyalkyl or alkoxycarbonyloxy having up to 18, preferably up to 8, carbon atoms, or one of these radicals alternatively denotes CN, NC, $NO_2$, NCS, $CF_3$, $SF_5$, $OCF_3$, F, Cl or Br.

In most of these compounds, $R^{20}$ and $R^{21}$ are different from one another, for example, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS or FFS mixture according to the invention may also comprise compounds in which, for example, H, N, O, Cl and F have been replaced by the corresponding isotopes.

Polymerizable compounds, so-called reactive mesogens (RMs), for example as disclosed in U.S. Pat. No. 6,861,107, may furthermore be added to the mixtures according to the invention in concentrations of preferably 0.01-5% by weight, particularly preferably 0.2-2% by weight, based on the mixture. These mixtures may optionally also comprise an initiator, as described, for example, in U.S. Pat. No. 6,781,665. The initiator, for example Irganox-1076 from BASF, is preferably added to the mixture comprising polymerizable compounds in amounts of 0-1%. Mixtures of this type can be used for so-called polymer-stabilized VA (PS-VA) modes or PSA (polymer sustained alignment) modes, in which polymerization of the reactive mesogens is intended to take place in the liquid-crystalline mixture. The prerequisite for this is that the liquid-crystal mixture itself comprises no polymerizable components which likewise polymerize under the conditions where the compounds of the formula M polymerize.

The polymerization is preferably carried out under the following conditions: the polymerizable components are polymerized in a cell using a UV-A lamp of defined intensity for a defined period and applied voltage (typically 10 to 30 V alternating voltage, frequencies in the range from 60 Hz to 1 kHz). The UV-A light source employed is typically a metal-halide vapor lamp or high-pressure mercury lamp having an intensity of 50 mW/$cm^2$. These are conditions where, for example, liquid-crystalline compounds containing an alkenyl or alkenyloxy side chain, such as, for example, the compounds of the formula

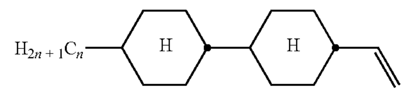

where n=2, 3, 4, 5 or 6,
do not polymerize.

In a preferred embodiment of the invention, the polymerizable compounds are selected from the compounds of the formula M $$R^{Ma}\text{-}A^{M1}\text{-}(Z^{M1}\text{-}A^{M2})_{m1}\text{-}R^{Mb} \qquad \text{M}$$

in which the individual radicals have the following meaning:

$R^{Ma}$ and $R^{Mb}$ each, independently of one another, denote P, P—Sp-, H, F, Cl, Br, I, —CN, —$NO_2$, —NCO, —NCS, —OCN, —SCN, $SF_5$ or straight-chain or branched alkyl having 1 to 25 C atoms, in which, in addition, one or more non-adjacent $CH_2$ groups may each be replaced, independently of one another, by —C($R^0$)═C($R^{00}$)—, —C≡C—, —N($R^{00}$)—, —O—, —S—, —CO—, —CO—O—, —O—CO—, or —O—CO—O— in such a way that O and/or S atoms are not linked directly to one another, and in which, in addition, one or more H atoms may each be replaced by F, Cl, Br, I, CN, P or P—Sp-, where at least one of the radicals $R^{Ma}$ and $R^{Mb}$ preferably denotes or contains a group P or P—Sp-, for example, $R^{Ma}$ and $R^{Mb}$ each, independently of one another, denote P, P—Sp-, H, halogen, $SF_5$, $NO_2$, an alkyl, alkenyl or alkynyl group, where at least one of the radicals $R^{Ma}$ and $R^{Mb}$ preferably denotes or contains a group P or P—Sp-, P denotes a polymerizable group, Sp denotes a spacer group or a single bond, $A^{M1}$ and $A^{M2}$ each, independently of one another, denote an aromatic, heteroaromatic, alicyclic or heterocyclic group, preferably having 4 to 25 ring atoms, preferably C atoms, which also includes or may contain annellated rings, and which may optionally be mono- or polysubstituted by L, L denotes P, P—Sp-, OH, $CH_2OH$, F, Cl, Br, I, —CN, —$NO_2$, —NCO, —NCS, —OCN, —SCN, —C(═O)N$(R^x)_2$, —C(═O)$Y^1$, —C(═O)$R^x$, —N$(R^x)_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may each be replaced by F, Cl, P or P—Sp-, preferably P, P—Sp-, H, OH, $CH_2OH$, halogen, $SF_5$, $NO_2$, an alkyl, alkenyl or alkynyl group, $Y^1$ denotes halogen, $Z^{M1}$ denotes —O—, —S—, —CO—, —CO—O—, —OCO—, —O—CO—O—, —$OCH_2$—, —$CH_2$O—, —$SCH_2$—, —$CH_2$S—, —$CF_2$O—, —$OCF_2$—, —$CF_2$S—, —$SCF_2$—, —$(CH_2)_{n1}$—, —$CF_2CH_2$—, —$CH_2CF_2$—, —$(CF_2)_{n1}$—, —CH═CH—, —CF═CF—, —C≡C—, —CH═CH—, —COO—, —OCO—CH═CH—, $CR^0R^{00}$ or a single bond, $R^0$ and $R^{00}$ each, independently of one another, denote H or alkyl having 1 to 12 C atoms, $R^x$ denotes P, P—Sp-, H, halogen, straight-chain, branched or cyclic alkyl having 1 to 25 C atoms, in which, in addition, one or more non-adjacent $CH_2$ groups may each be replaced by —O—, —S—, —CO—, —CO—O—, —O—CO—, or —O—CO—O— in such a way that O and/or S atoms are not linked directly to one another, and in which, in addition, one or more H atoms may each be replaced by F, Cl, P or P—Sp-, an optionally substituted aryl or aryloxy group having 6 to 40 C atoms, or an optionally substituted heteroaryl or heteroaryloxy group having 2 to 40 C atoms, m1 denotes 0, 1, 2, 3 or 4, and n1 denotes 1, 2, 3 or 4, where at least one, preferably one, two or three, particularly preferably one or two, from the group $R^{Ma}$, $R^{Mb}$ and the substituents L present denotes a group P or P—Sp- or contains at least one group P or P—Sp-.

Particularly preferred compounds of the formula M are those in which $R^{Ma}$ and $R^{Mb}$ each, independently of one another, denote P, P—Sp-, H, F, Cl, Br, I, —CN, —$NO_2$, —NCO, —NCS, —OCN, —SCN, $SF_5$ or straight-chain or branched alkyl having 1 to 25 C atoms, in which, in addition, one or more non-adjacent $CH_2$ groups may each be replaced, independently of one another, by —C($R^0$)═C($R^{00}$)—, —C≡C—, —N($R^{00}$)—, —O—, —S—, —CO—, —CO—O—, —O—CO—, or —O—CO—O— in such a way that O and/or S atoms are not linked directly to one another, and in which, in addition, one or more H atoms may each be replaced by F, Cl, Br, I, CN, P or P—Sp-, where at least one of the radicals $R^{Ma}$ and $R^{Mb}$ preferably denotes or contains a group P or P—Sp-, $A^{M1}$ and $A^{M2}$ each, independently of one another, denote 1,4-phenylene, naphthalene-1,4-diyl, naphthalene-2,6-diyl, phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent $CH_2$ groups may be replaced by O and/or S, 1,4-cyclohexenylene, bicyclo[1.1.1]-pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L, L denotes P, P—Sp-, OH, $CH_2OH$, F, Cl, Br, I, —CN, —$NO_2$, —NCO, —NCS, —OCN, —SCN, —C(═O)N($R^x$)$_2$, —C(═O)$Y^1$, —C(═O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P—Sp-, P denotes a polymerizable group, $Y^1$ denotes halogen, $R^x$ denotes P, P—Sp-, H, halogen, straight-chain, branched or cyclic alkyl having 1 to 25 C atoms, in which, in addition, one or more non-adjacent $CH_2$ groups may each be replaced by —O—, —S—, —CO—, —CO—O—, —O—CO—, or —O—CO—O— in such a way that O and/or S atoms are not linked directly to one another, and in which, in addition, one or more H atoms may each be replaced by F, Cl, P or P—Sp-, an optionally substituted aryl or aryloxy group having 6 to 40 C atoms, or an optionally substituted heteroaryl or heteroaryloxy group having 2 to 40 C atoms.

Very particular preference is given to compounds of the formula M in which one of $R^{Ma}$ and $R^{Mb}$ or both denote P or P—Sp-.

Suitable and preferred RMs for use in liquid-crystalline media and PS-VA displays or PSA displays according to the invention are selected, for example, from the following formulae:

M1

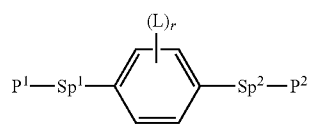

M2

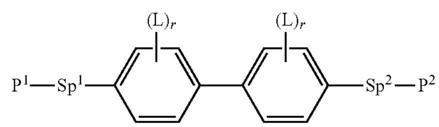

M3

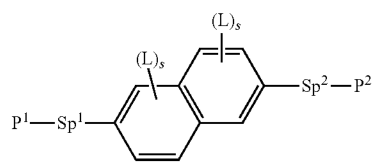

M4

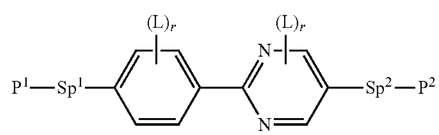

M5

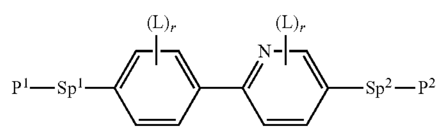

M6

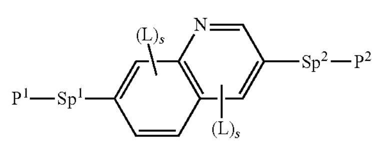

M7

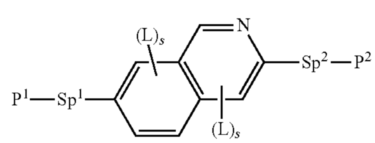

M8

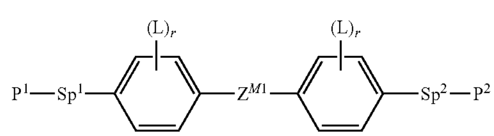

M9

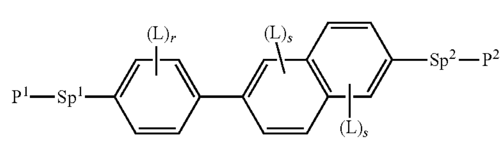

-continued
M10
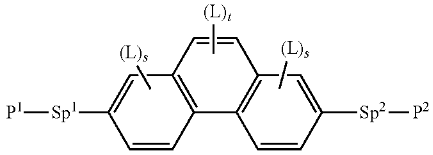
M11
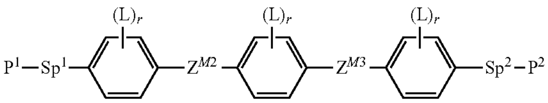
M12
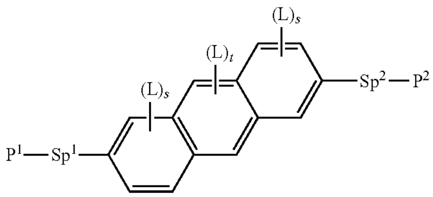
M13
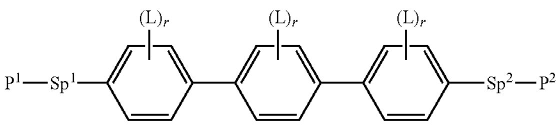
M14
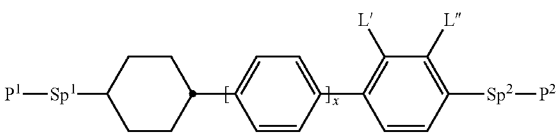
M15
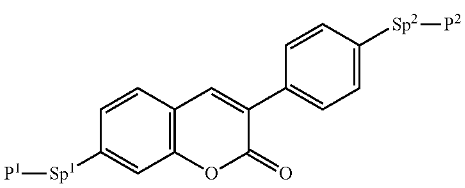
M16
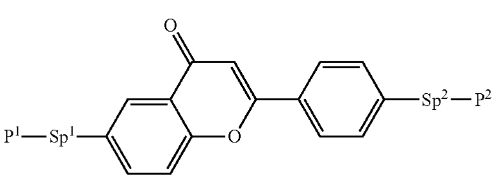
M17
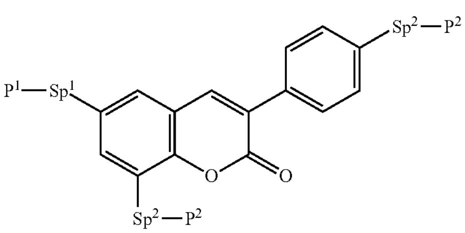
-continued
M18
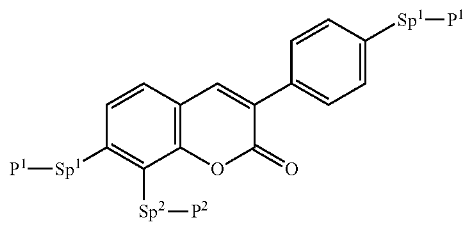
M19
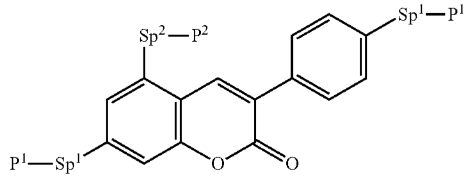
M20
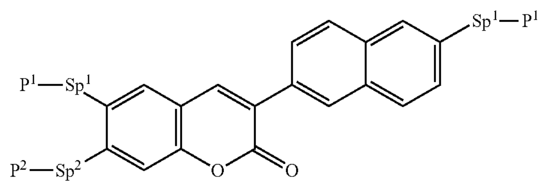
M21
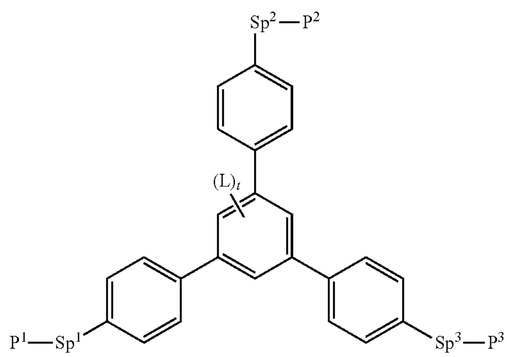
M22
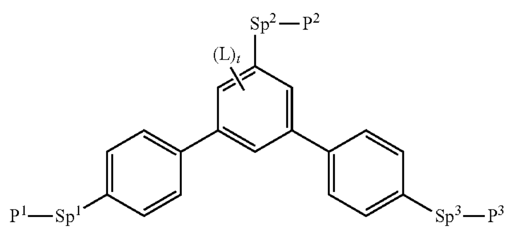
M23
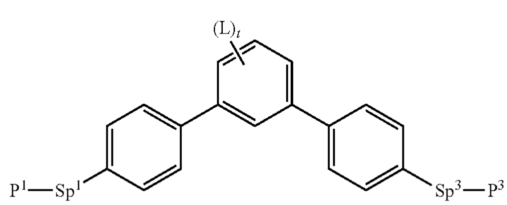

-continued

M24

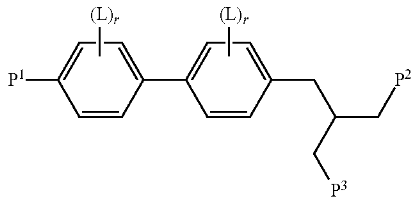

M25

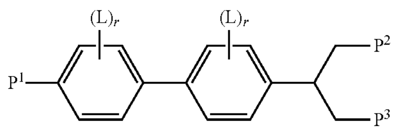

M26

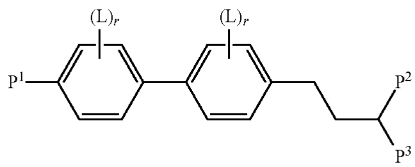

M27

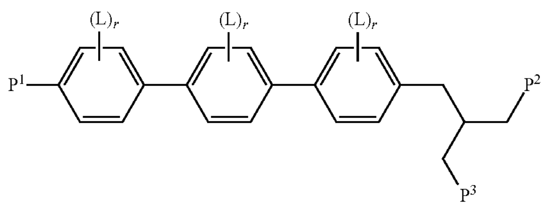

M28

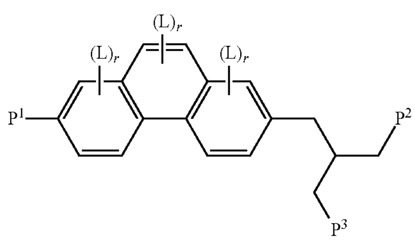

M29

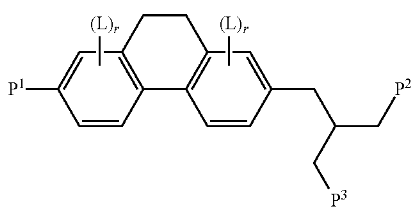

M30

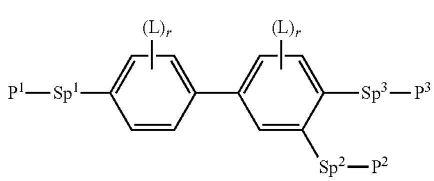

M31

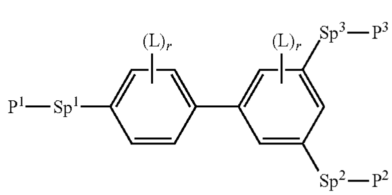

in which the individual radicals have the following meaning:

$P^1$, $P^2$ and $P^3$ each, independently of one another, denote a polymerizable group, preferably having one of the meanings indicated above and below for P, particularly preferably an acrylate, methacrylate, fluoroacrylate, oxetane, vinyloxy or epoxy group, $Sp^1$, $Sp^2$ and $Sp^3$ each, independently of one another, denote a single bond or a spacer group, preferably having one of the meanings indicated above and below for Sp, and particularly preferably —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and where in the last-mentioned groups the linking to the adjacent ring takes place via the O atom, where one of the radicals $P^1$—$Sp^1$-, $P^2$—$Sp^2$- and $P^3$—$Sp^3$- may also denote $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by —C($R^0$)═C($R^{00}$)—, —C≡C—, —N($R^0$)—, —O—, —S—, —CO—, —CO—O—, —O—CO—, or —O—CO—O— in such a way that O and/or S atoms are not linked directly to one another, and in which, in addition, one or more H atoms may each be replaced by F, Cl, CN or $P^1$—$Sp^1$-, particularly preferably straight-chain or branched, optionally mono- or polyfluorinated, alkyl, alkoxy, alkenyl, alkynyl, alkylcarbonyl, alkoxycarbonyl or alkylcarbonyloxy having 1 to 12 C atoms (where the alkenyl and alkynyl radicals have at least two and the branched radicals at least three C atoms), $R^0$, $R^{00}$ each, independently of one another and on each occurrence identically or differently, denote H or alkyl having 1 to 12 C atoms, $Z^{M1}$ denotes —O—, —CO—, —C($R^yR^z$)— or —$CF_2CF_2$—, $Z^{M2}$ and $Z^{M3}$ each, independently of one another, denote —CO—O—, —O—CO—, —$CH_2O$—, —$OCH_2$—, —$CF_2O$—, —$OCF_2$— or —$(CH_2)_n$—, where n is 2, 3 or 4, $R^y$ and $R^z$ each, independently of one another, denote H, F, $CH_3$ or $CF_3$, L on each occurrence, identically or differently, denotes F, Cl, CN, or straight-chain or branched, optionally mono- or polyfluorinated, alkyl, alkoxy, alkenyl, alkynyl, alkylcarbonyl, alkoxycarbonyl or alkylcarbonyloxy having up to 12 C atoms, preferably F, L' and L" each, independently of one another, denote H, F or Cl, r denotes 0, 1, 2, 3 or 4, s denotes 0, 1, 2 or 3, t denotes 0, 1 or 2, and x denotes 0 or 1.

Suitable polymerizable compounds are listed, for example, in Table D.

The liquid-crystalline media in accordance with the present application preferably comprise in total 0.1 to 10%, preferably 0.2 to 4.0%, particularly preferably 0.2 to 2.0%, of polymerizable compounds.

Particular preference is given to the polymerizable compounds of the formula M and of the formulae RM-1 to RM-121.

The mixtures according to the invention may furthermore comprise conventional additives, such as, for example, stabilizers, antioxidants, UV absorbers, nanoparticles, microparticles, etc.

The structure of the liquid-crystal displays according to the invention corresponds to the usual geometry, as described, for example, in EP-A 0 240 379, hereby incorporated by reference.

EXAMPLES

The following examples are intended to explain the invention without limiting it. Above and below, percent data denote percent by weight; all temperatures are indicated in degrees Celsius.

Throughout the patent application, 1,4-cyclohexylene rings and 1,4-phenylene rings are depicted as follows:

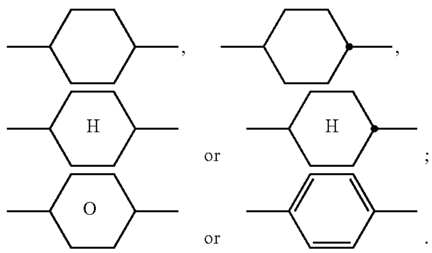

The cyclohexylene rings are trans-1,4-cyclohexylene rings.

Throughout the patent application and in the working examples, the structures of the liquid-crystal compounds are indicated by means of acronyms. Unless indicated otherwise, the transformation into chemical formulae is carried out in accordance with Tables 1-3. All radicals $C_nH_{2n+1}$, $C_mH_{2m+1}$ and $C_mH_{2m'+1}$ or $C_nH_{2n}$ and $C_mH_{2m}$ are straight-chain alkyl radicals or alkylene radicals, in each case having n, m, m' or z C atoms respectively. n, m, m' and z each, independently of one another, denote 1, 2, 3, 4, 5, 6, 7, 8, 9, 10, 11 or 12, preferably 1, 2, 3, 4, 5 or 6, and (O) denotes an oxygen atom or a single bond. In Table 1 the ring elements of the respective compound are coded, in Table 2 the bridging members are listed, and in Table 3 the meanings of the symbols for the left-hand or right-hand side chains of the compounds are indicated.

TABLE 1

| Ring elements | |
|---|---|
| 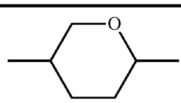 A | 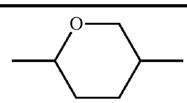 AI |
| 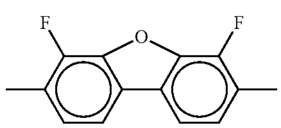 B | 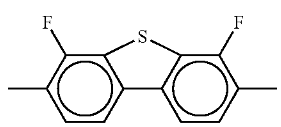 B(S) |
| 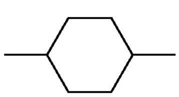 C | |
| 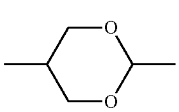 D | 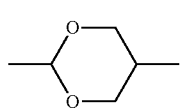 DI |

TABLE 1-continued

| Ring elements | |
|---|---|
| 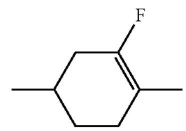 F | 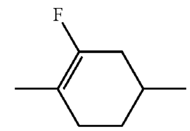 FI |
| 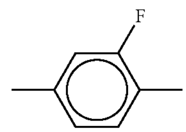 G | 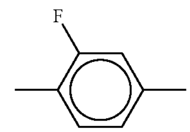 GI |
| 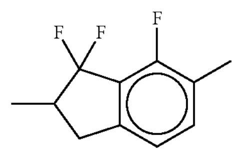 K | |
| 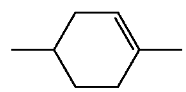 L | 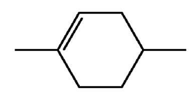 LI |
| 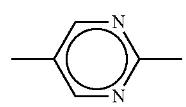 M | 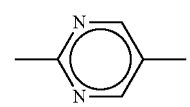 MI |
| 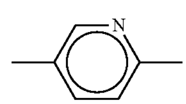 N | 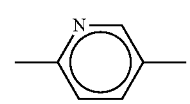 NI |
| 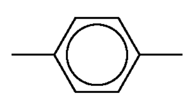 P | |
| 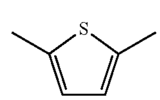 S | |

TABLE 1-continued

| Ring elements | |
|---|---|
| 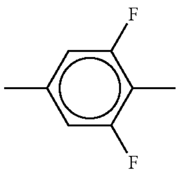 U | 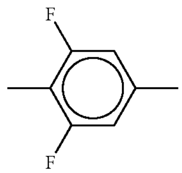 UI |
| 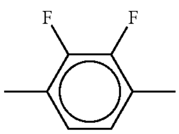 Y | |

TABLE 1-continued

| Ring elements | |
|---|---|
| 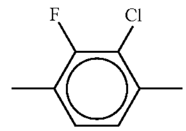 Y(F,Cl) | 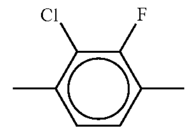 Y(Cl,F) |

TABLE 2

| Bridging members | | | |
|---|---|---|---|
| E | —$CH_2CH_2$— | | |
| V | —CH═CH— | | |
| T | —CC— | | |
| W | —$CF_2CF_2$— | | |
| Z | —COO— | ZI | —OCO— |
| O | —$CH_2O$— | OI | —$OCH_2$— |
| Q | —$CF_2O$— | QI | —$OCF_2$— |

TABLE 3

| Side chains | | | |
|---|---|---|---|
| Left-hand side chain | | Right-hand side chain | |
| n- | $C_nH_{2n+1}$— | -n | —$C_nH_{2n+1}$ |
| nO- | $C_nH_{2n+1}$—O— | -On | —O—$C_nH_{2n+1}$ |
| V- | $CH_2$═CH— | -V | —CH═$CH_2$ |
| nV- | $C_nH_{2n+1}$—CH═CH— | -nV | —$C_nH_{2n}$—CH═$CH_2$ |
| Vn- | $CH_2$═CH—$C_nH_{2n}$— | -Vn | —CH═CH—$C_nH_{2n+1}$ |
| nVm- | $C_nH_{2n+1}$—CH═CH—$C_mH_{2m}$— | -nVm | —$C_nH_{2n}$—CH═CH—$C_mH_{2m+1}$ |
| N- | NC— | -N | —CN |
| F- | F— | -F | —F |
| Cl- | Cl— | -Cl | —Cl |
| M- | $CFH_2$— | -M | —$CFH_2$ |
| D- | $CF_2H$— | -D | —$CF_2H$ |
| T- | $CF_3$— | -T | —$CF_3$ |
| MO- | $CFH_2O$— | -OM | —$OCFH_2$ |
| DO- | $CF_2HO$— | -OD | —$OCF_2H$ |
| TO- | $CF_3O$— | -OT | —$OCF_3$ |
| T- | $CF_3$— | -T | —$CF_3$ |
| A- | H—CC— | -A | —CC—H |

Besides the compounds of the formulae IIA and/or IIB and/or IIC and the compounds of the formulae I1, I2 and EY, the mixtures according to the invention preferably comprise one or more of the compounds from Table A indicated below.

TABLE A

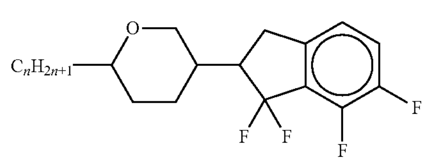

AIK-n-F

TABLE A-continued
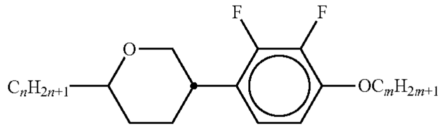
AIY-n-Om
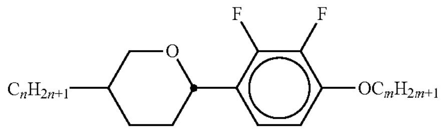
AY-n-Om
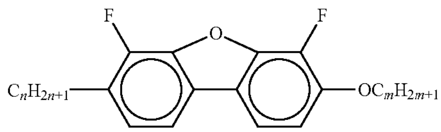
B-nO-Om
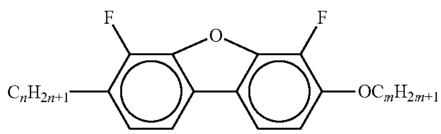
B-n-Om
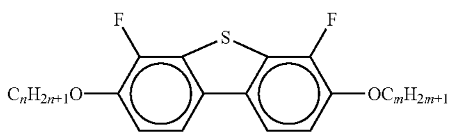
B(S)-nO-Om
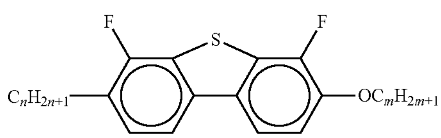
B(S)-n-Om
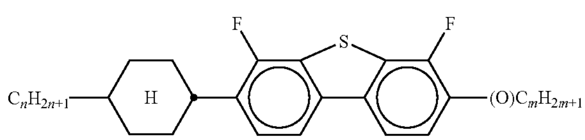
CB(S)-n-(O)m
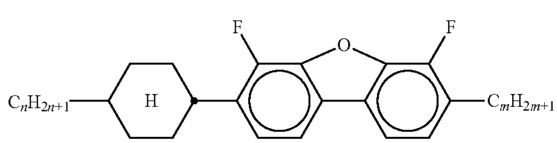
CB-n-m TABLE A-continued
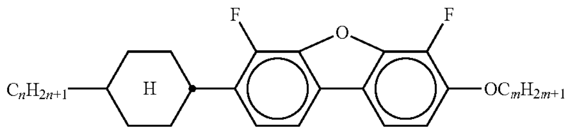
CB-n-Om
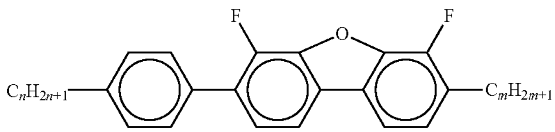
PB-n-m
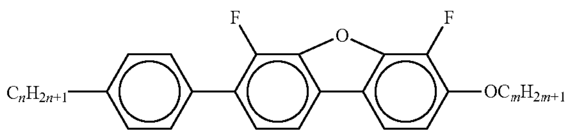
PB-n-Om
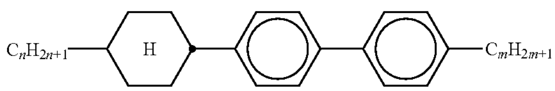
BCH-nm
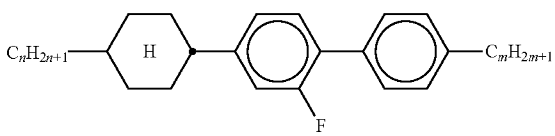
BCH-nmF
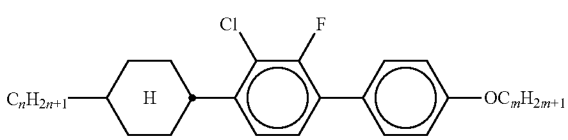
CY(Cl,F)-n-Om
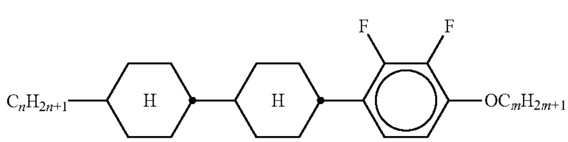
CCY-n-Om
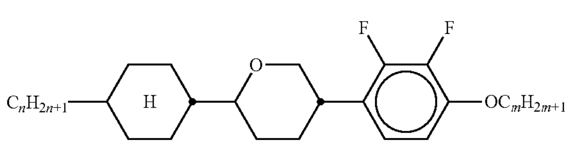
CAIY-n-Om TABLE A-continued
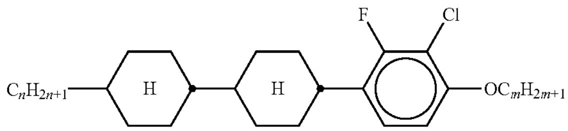
CCY(F,Cl)-n-Om
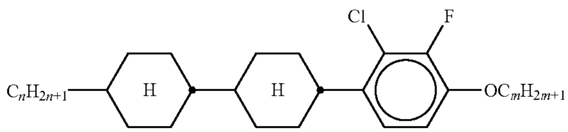
CCY(Cl,F)-n-Om
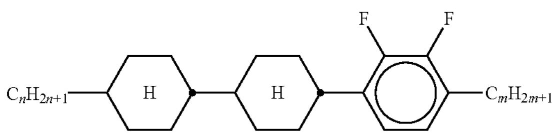
CCY-n-m
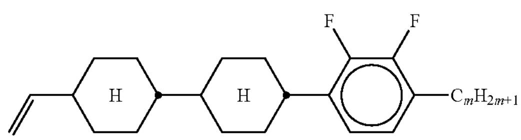
CCY-V-m
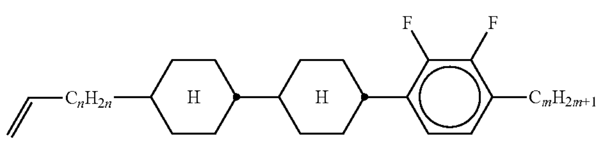
CCY-Vn-m
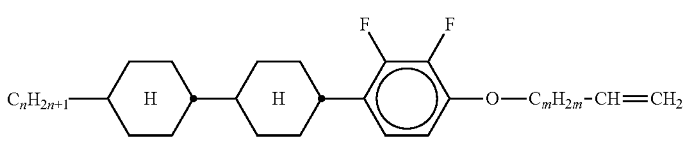
CCY-n-OmV
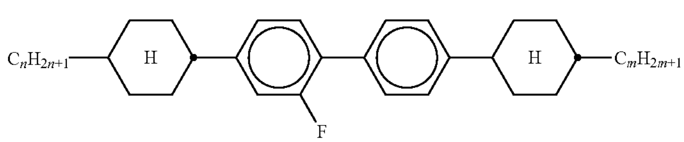
CBC-nmF
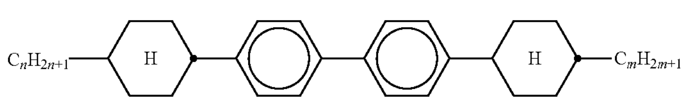
CBC-nm TABLE A-continued
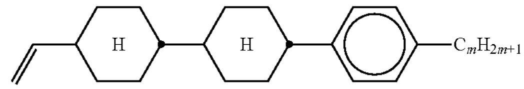
CCP-V-m
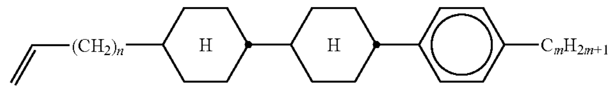
CCP-Vn-m
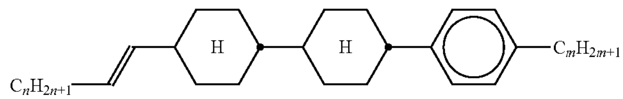
CCP-nV-m
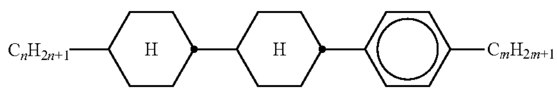
CCP-n-m
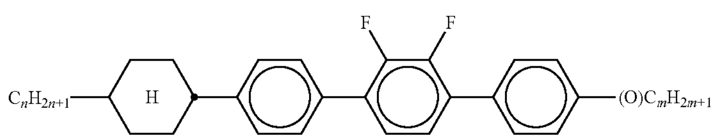
CPYP-n-(O)m
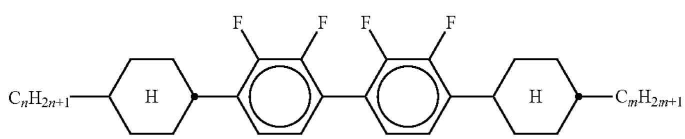
CYYC-n-m
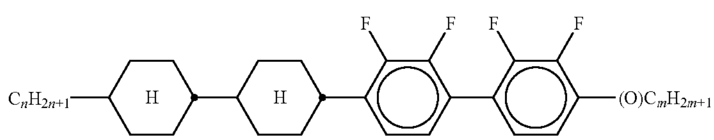
CCYY-n-(O)m
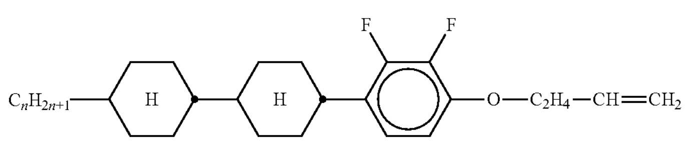
CCY-n-O2V
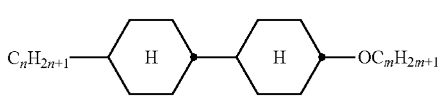
CCH-nOm TABLE A-continued
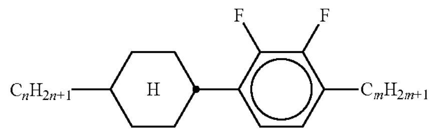
CY-n-m
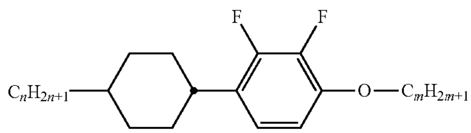
CY-n-Om
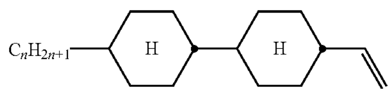
CC-n-V
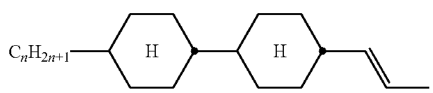
CC-n-V1
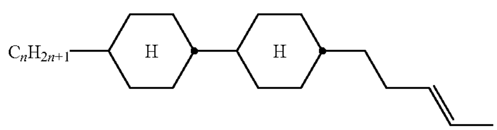
CC-n-2V1
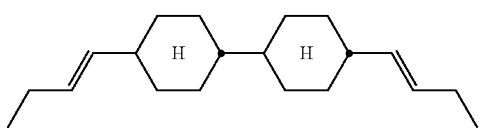
CC-2V-V2
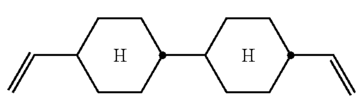
CC-V-V
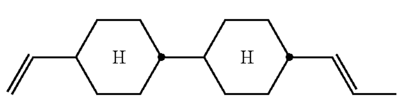
CC-V-V1
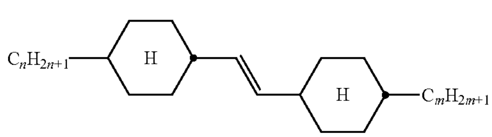
CVC-n-m TABLE A-continued
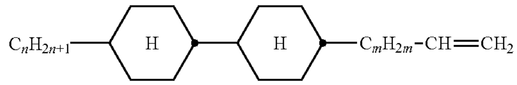
CC-n-mV
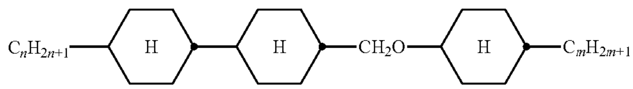
CCOC-n-m
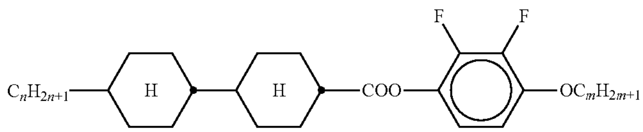
CP-nOmFF
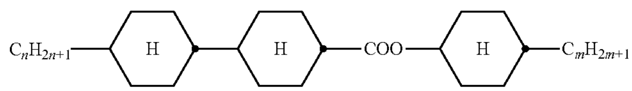
CH-nm
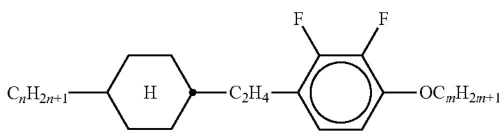
CEY-n-Om
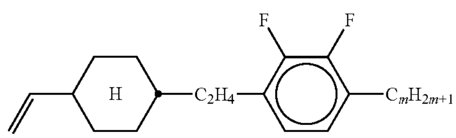
CEY-V-n
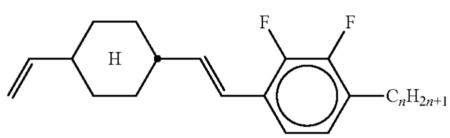
CVY-V-n
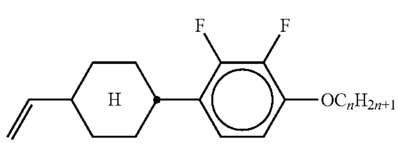
CY-V-On
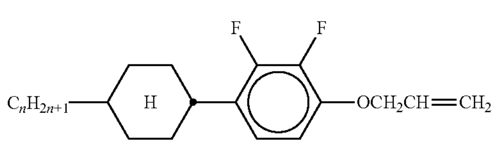
CY-n-O1V TABLE A-continued
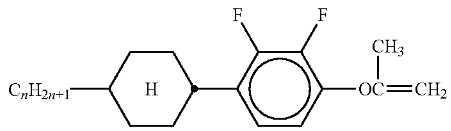
CY-n-OC(CH3)=CH2
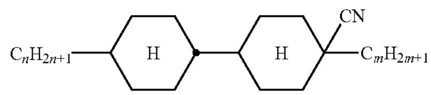
CCN-nm
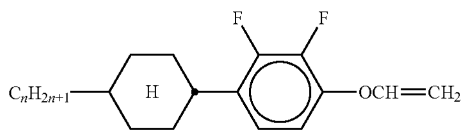
CY-n-OV
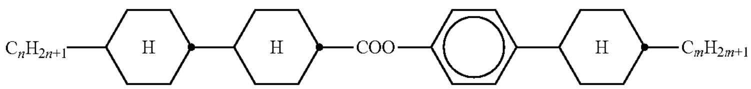
CCPC-nm
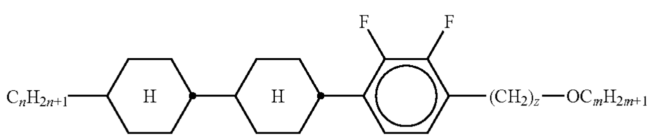
CCY-n-zOm
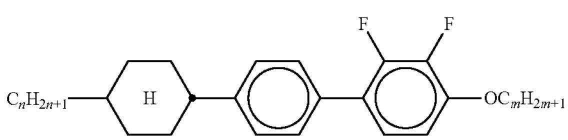
CPY-n-Om
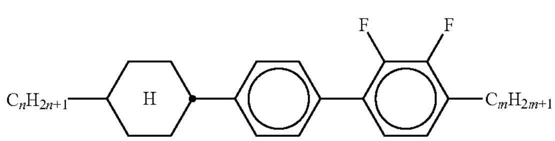
CPY-n-m
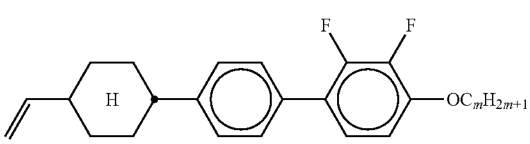
CPY-V-Om TABLE A-continued
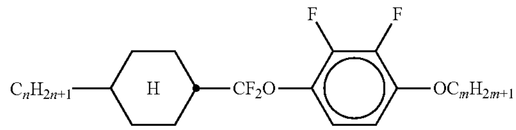
CQY-n-(O)m
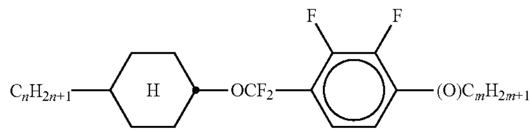
CQIY-n-(O)m
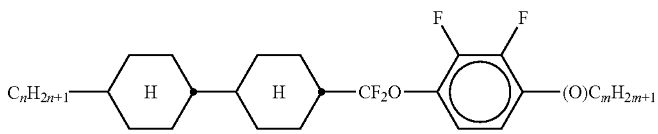
CCQY-n-(O)m
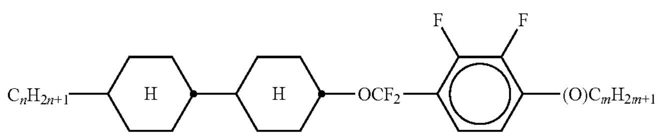
CCQIY-n-(O)m
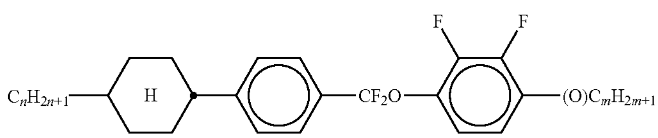
CPQY-n-(O)m
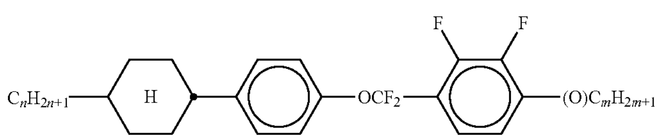
CPQIY-n-(O)m
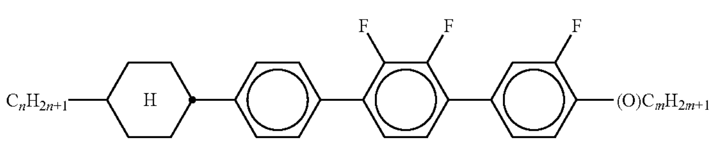
CPYG-n-(O)m
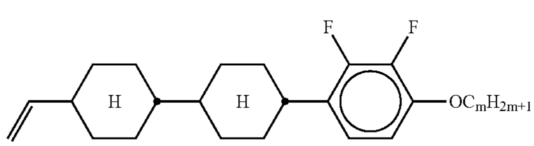
CCY-V-Om TABLE A-continued
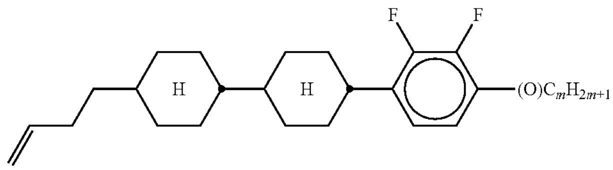
CCY-V2-(O)m
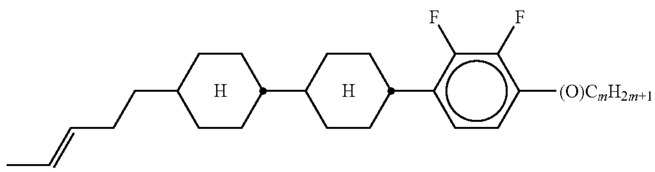
CCY-1V2-(O)m
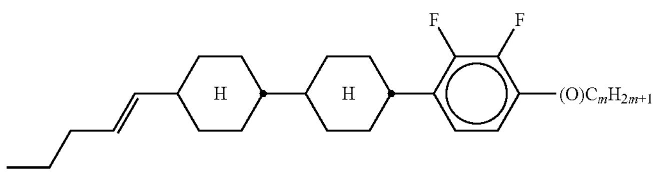
CCY-3V-(O)m
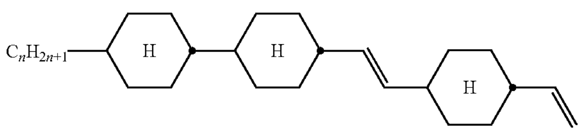
CCVC-n-V
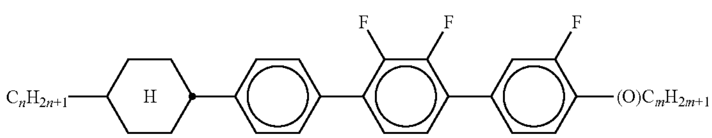
CPYG-n-(O)m
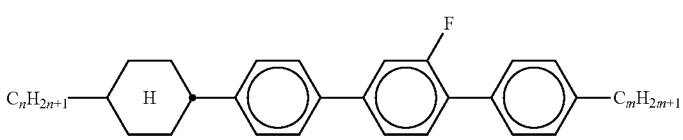
CPGP-n-m
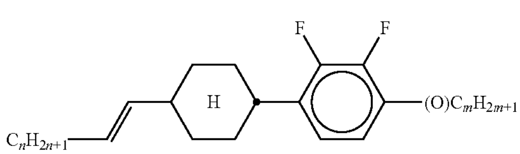
CY-nV-(O)m TABLE A-continued
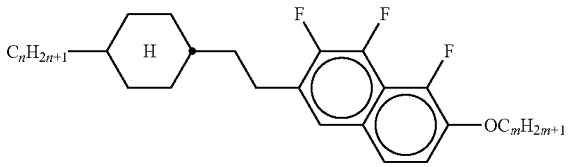
CENaph-n-Om
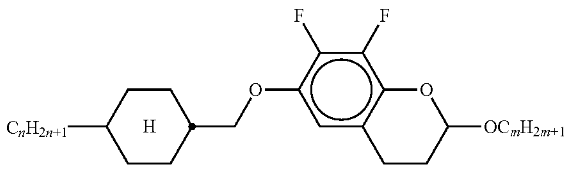
COChrom-n-Om
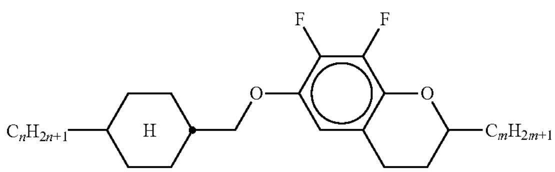
COChrom-n-m
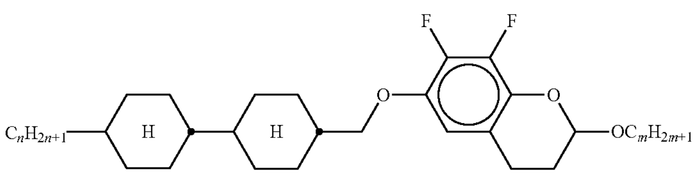
CCOChrom-n-Om
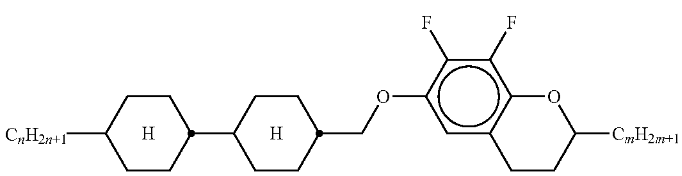
CCOChrom-n-m
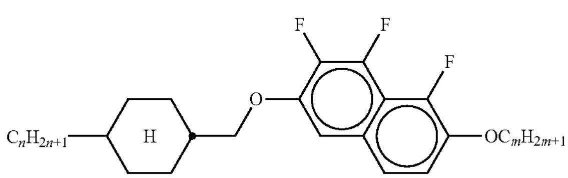
CONaph-n-Om
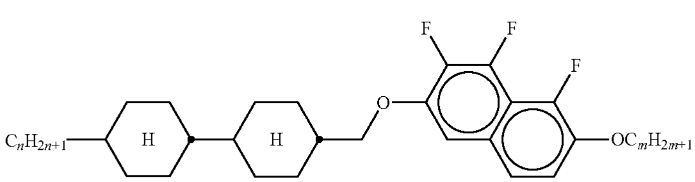
CCONaph-n-Om TABLE A-continued
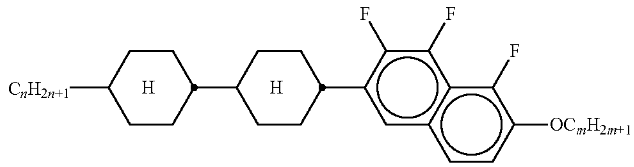
CCNaph-n-Om
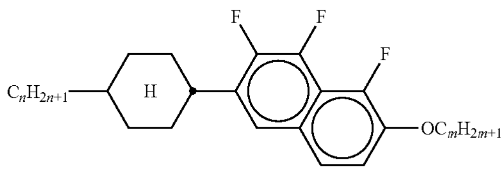
CNaph-n-Om
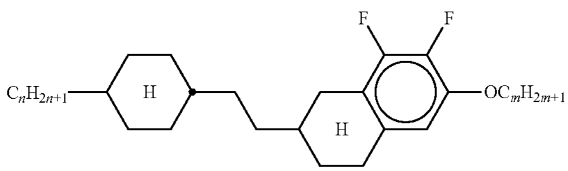
CETNaph-n-Om
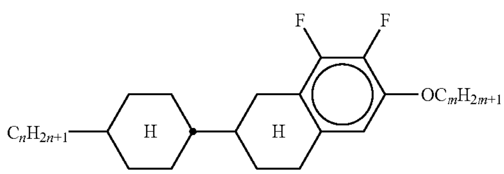
CTNaph-n-Om
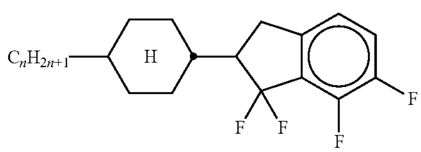
CK-n-F
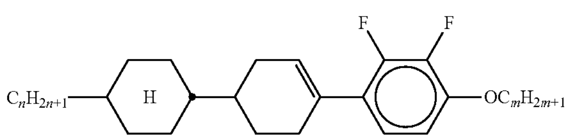
CLY-n-Om
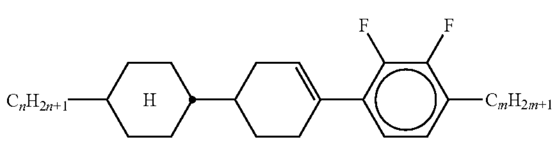
CLY-n-m TABLE A-continued
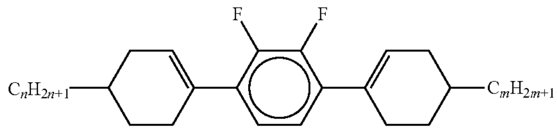
LYLI-n-m
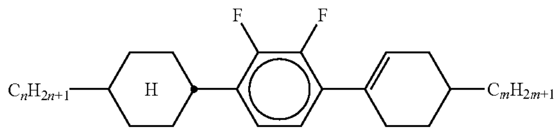
CYLI-n-m
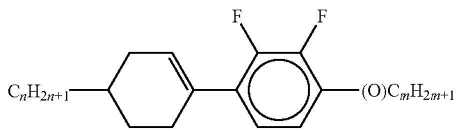
LY-n-(O)m
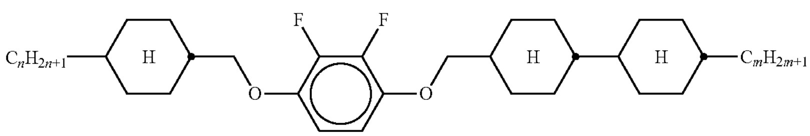
COYOICC-n-m
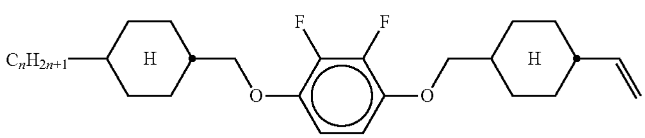
COYOIC-n-V
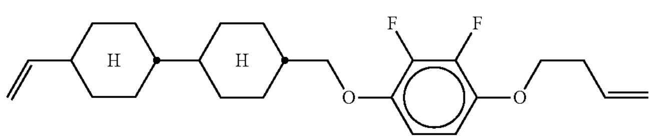
CCOY-V-O2V
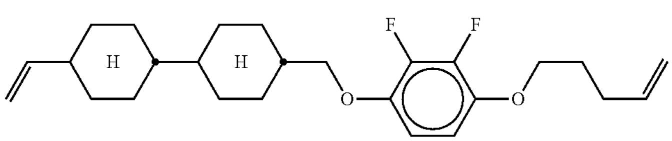
CCOY-V-O3V
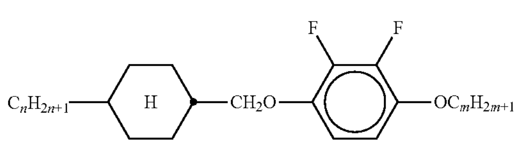
COY-n-Om TABLE A-continued
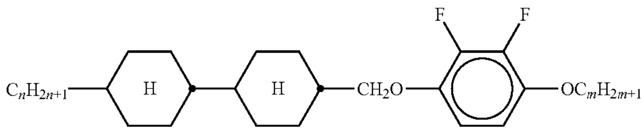
CCOY-n-Om
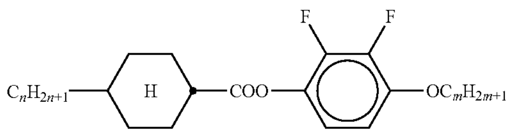
D-nOmFF
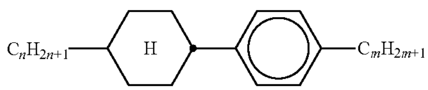
PCH-nm
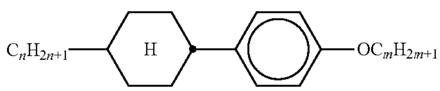
PCH-nOm
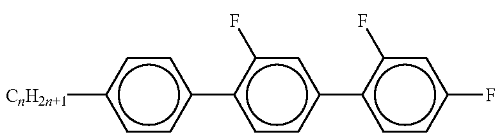
PGIGI-n-F
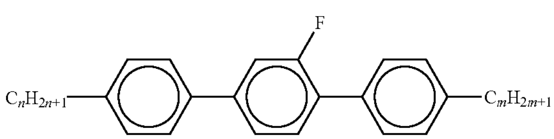
PGP-n-m
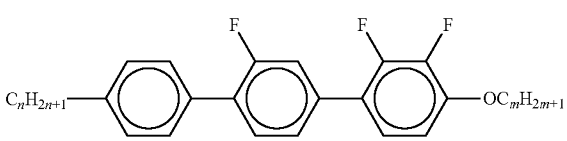
PGIY-n-Om
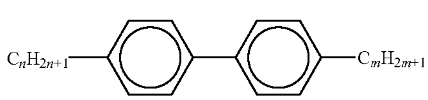
PP-n-m
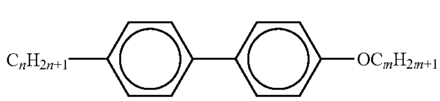
PP-n-Om TABLE A-continued
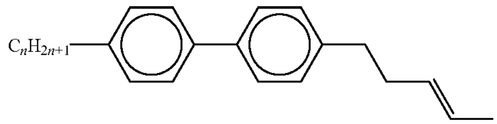
PP-n-2V1
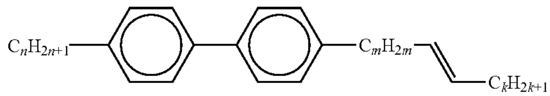
PP-n-mVk
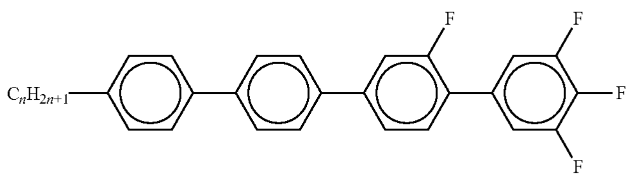
PPGU-n-F
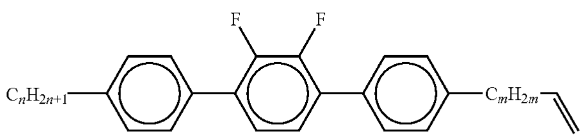
PYP-n-mV
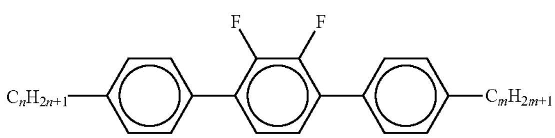
PYP-n-m
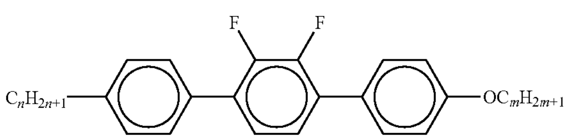
PYP-n-Om
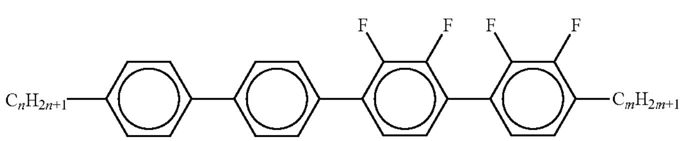
PPYY-n-m
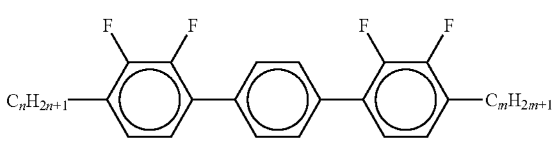
YPY-n-m TABLE A-continued
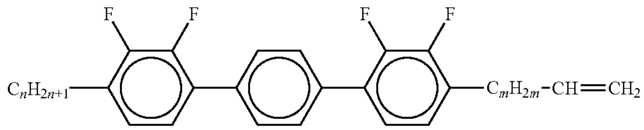
YPY-n-mV
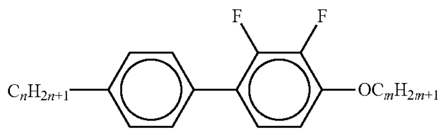
PY-n-Om
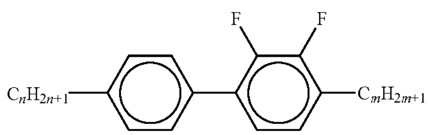
PY-n-m
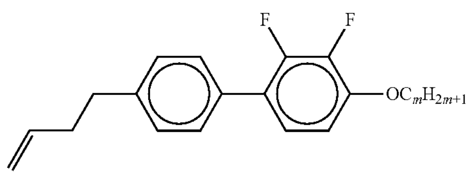
PY-V2-Om
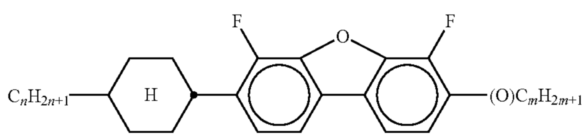
C-DFDBF-n-(O)m
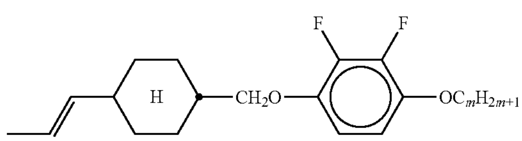
COY-1V-Om
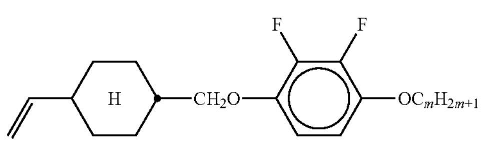
COY-V-Om
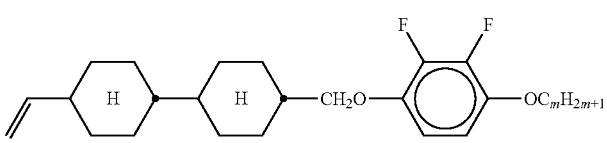
CCOY-V-Om TABLE A-continued
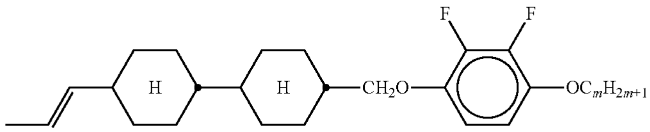
CCOY-1V-Om
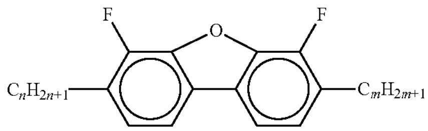
B-n-m
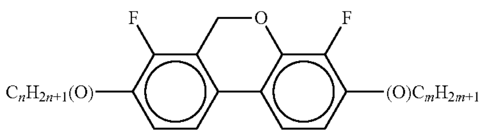
DFDBC-n(O)-(O)m
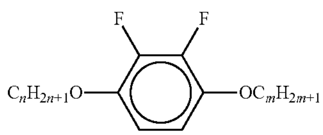
Y-nO-Om
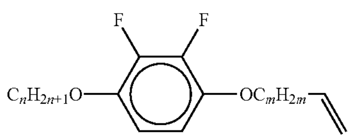
Y-nO-OmV
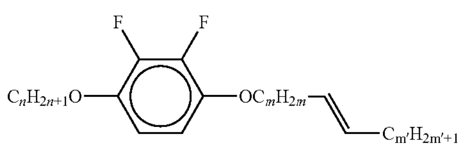
Y-nO-OmVm'
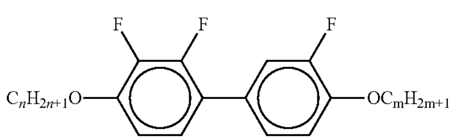
YG-n-Om
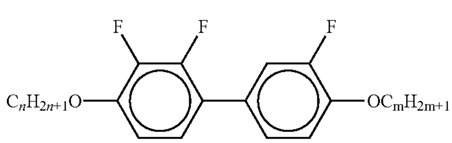
YG-nO-Om TABLE A-continued

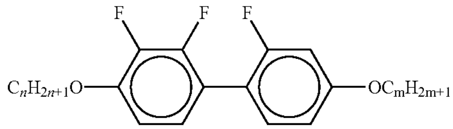

YGI-n-Om

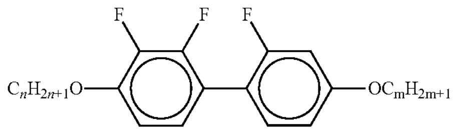

YGI-nO-Om

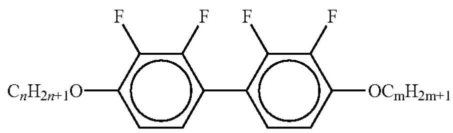

YY-n-Om

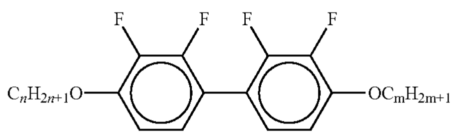

YY-nO-Om

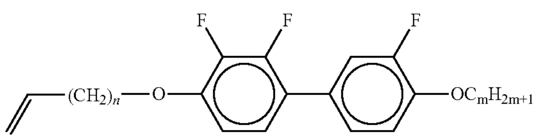

YG-VnO-Om

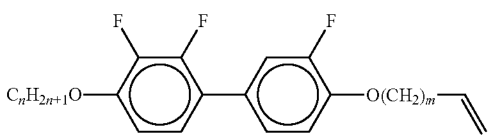

YG-nO-OmV

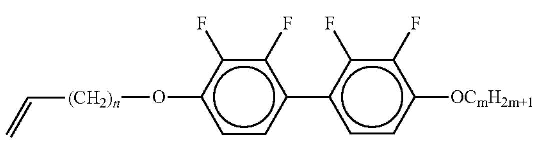

YY-VnO-Om

The following abbreviations are used:
(n, m, m', z: each, independently of one another, 1, 2, 3, 4, 5 or 6; $(O)C_mH_{2m+1}$ means $OC_mH_{2m+1}$ or $C_mH_{2m+1}$)

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

By means of suitable additives, the liquid-crystal phases according to the invention can be modified in such a way that they can be employed in any type of, for example, ECB, VAN, IPS, GH (guest-host) or ASM-VA (axially symmetric microdomain-vertically aligned) LCD display that has been disclosed to date.

The dielectrics may also comprise further additives known to the person skilled in the art and described in the literature, such as, for example, UV absorbers, antioxidants, nanoparticles and free-radical scavengers. For example, 0-15% of pleochroic dyes, stabilizers or chiral dopants may be added. Suitable stabilizers for the mixtures according to the invention are, in particular, those listed in Table B.

For example, 0-15% of pleochroic dyes, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst., Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

TABLE B

| |
|---|
| Table B shows possible dopants which are generally added to the mixtures according to the invention. The mixtures preferably comprise 0-10% by weight, in particular 0.01-5% by weight and particularly preferably 0.01-3% by weight of dopants. If the mixtures comprise only one dopant, it is empoloyed in amounts of 0.01-4% by weight, preferably 0.1-1.0% by weight. |

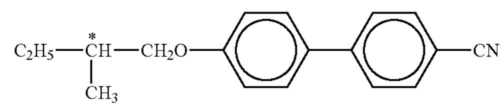

C 15

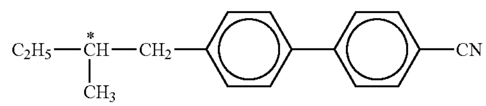

CB 15

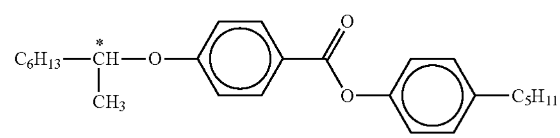

CM 21

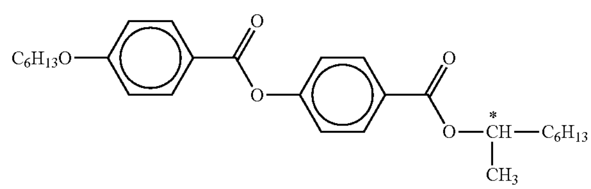

R/S-811

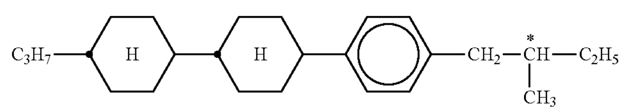

CM 44

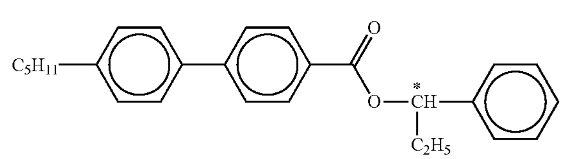

CM 45

TABLE B-continued

| Table B shows possible dopants which are generally added to the mixtures according to the invention. The mixtures preferably comprise 0-10% by weight, in particular 0.01-5% by weight and particularly preferably 0.01-3% by weight of dopants. If the mixtures comprise only one dopant, it is empoloyed in amounts of 0.01-4% by weight, preferably 0.1-1.0% by weight. |
|---|

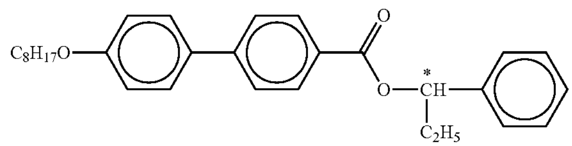

CM 47

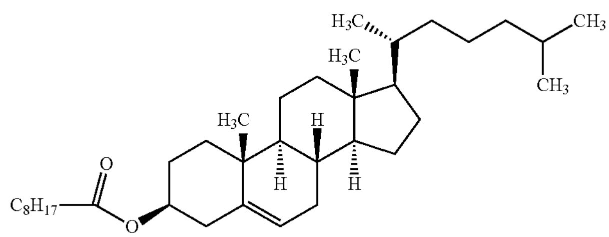

CN

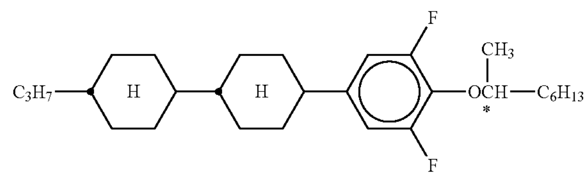

R/S-2011

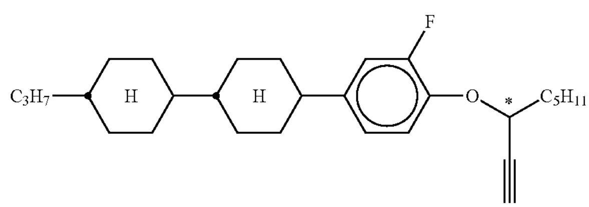

R/S-3011

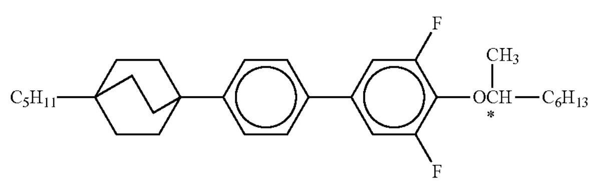

R/S-4011

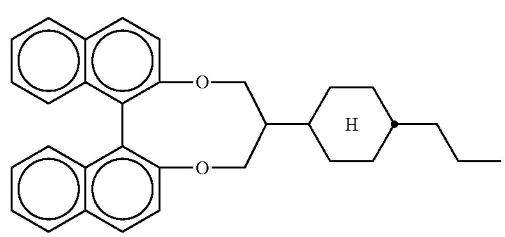

R/S-5011

TABLE B-continued

| |
|---|
| Table B shows possible dopants which are generally added to the mixtures according to the invention. The mixtures preferably comprise 0-10% by weight, in particular 0.01-5% by weight and particularly preferably 0.01-3% by weight of dopants. If the mixtures comprise only one dopant, it is empoloyed in amounts of 0.01-4% by weight, preferably 0.1-1.0% by weight. |

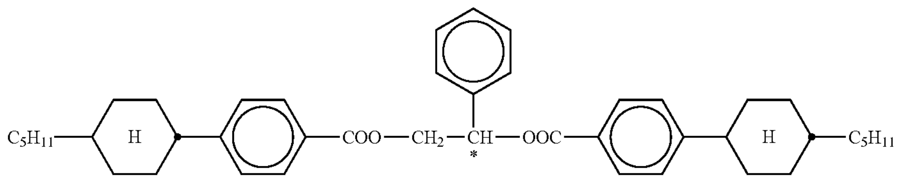

R/S-1011

TABLE C

| |
|---|
| Stabilizers which can be added, for example, to the mixtures according to the invention in amounts of 0-10% by weight are shown below. |

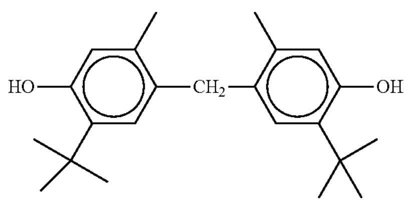

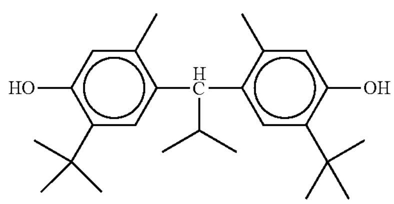

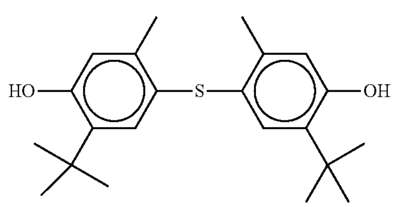

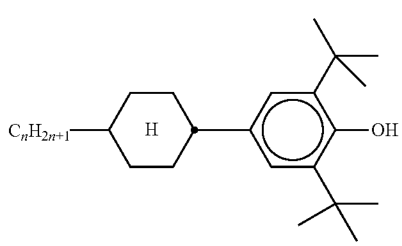

n = 1, 2, 3, 4, 5, 6 or 7

TABLE C-continued
| Stabilizers which can be added, for example, to the mixtures according to the invention in amounts of 0-10% by weight are shown below. |
|---|
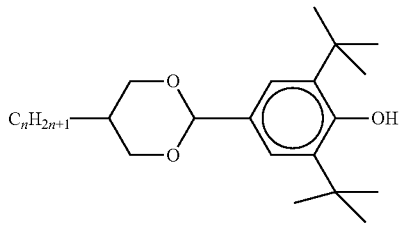
n = 1, 2, 3, 4, 5, 6 or 7
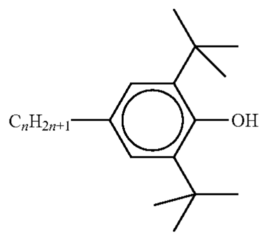
n = 1, 2, 3, 4, 5, 6 or 7
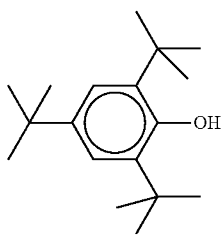
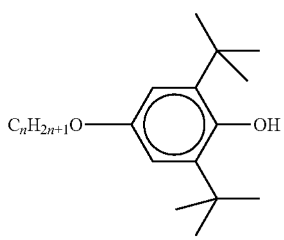
n = 1, 2, 3, 4, 5, 6 or 7
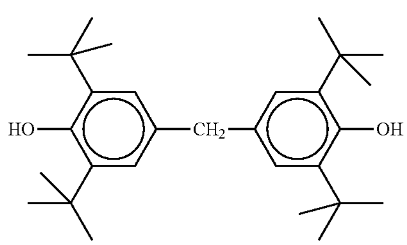
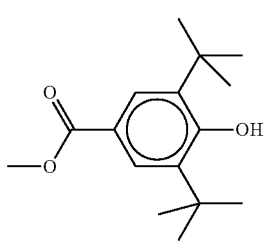

TABLE C-continued
| Stabilizers which can be added, for example, to the mixtures according to the invention in amounts of 0-10% by weight are shown below. |
| --- |
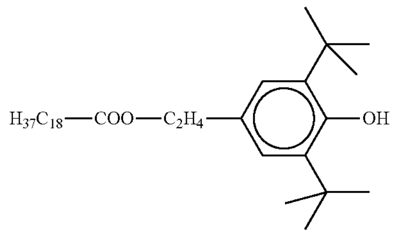
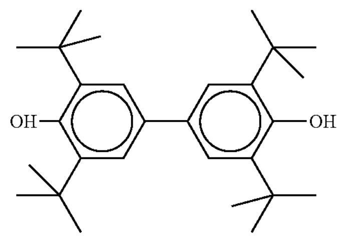
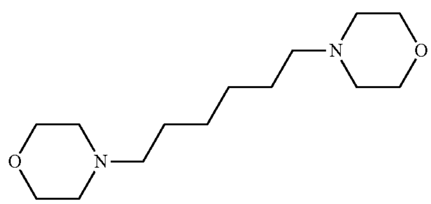 [SMILES: C(CCCN1CCOCC1)CCN1CCOCC1]
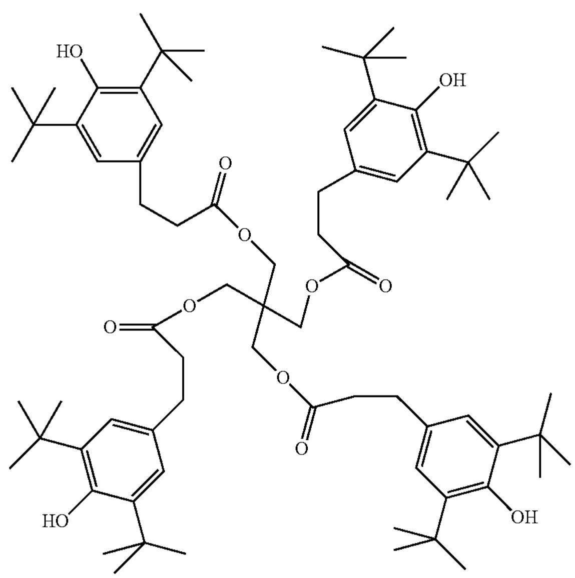 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
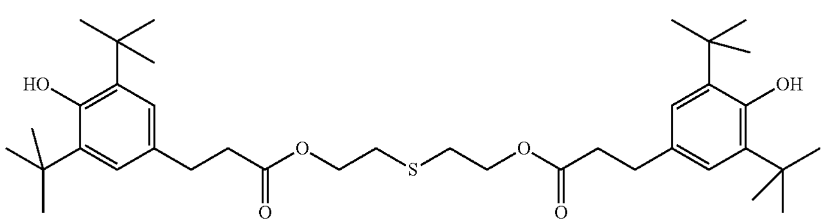 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE C-continued
| Stabilizers which can be added, for example, to the mixtures according to the invention in amounts of 0-10% by weight are shown below. |
|---|
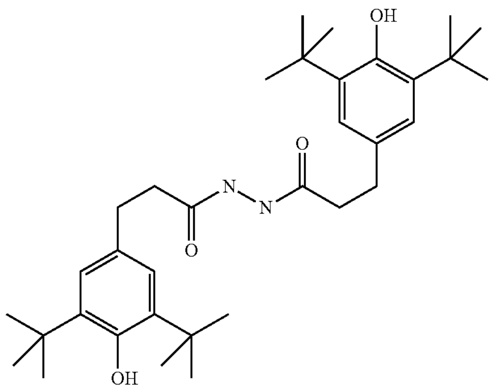 [SMILES: CC(C)(C)c1cc(CCC(=O)NNC(=O)CCc2cc(C(C)(C)C)c(O)c(C(C)(C)C)c2)cc(C(C)(C)C)c1O]
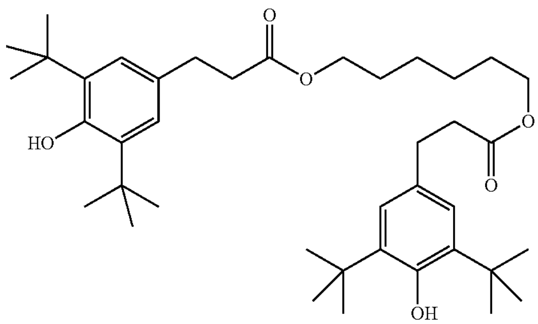 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
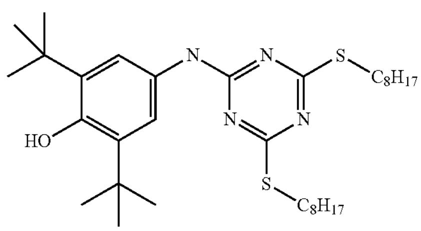
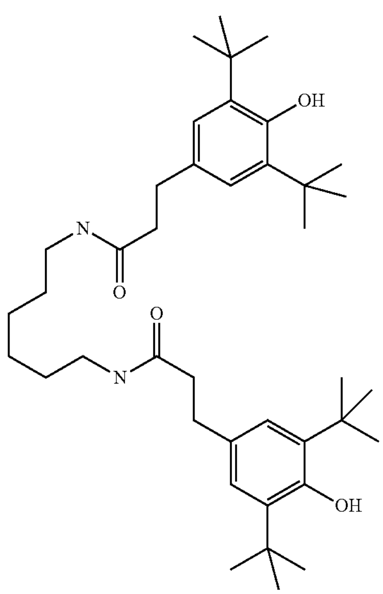 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

TABLE C-continued
| Stabilizers which can be added, for example, to the mixtures according to the invention in amounts of 0-10% by weight are shown below. |
| --- |
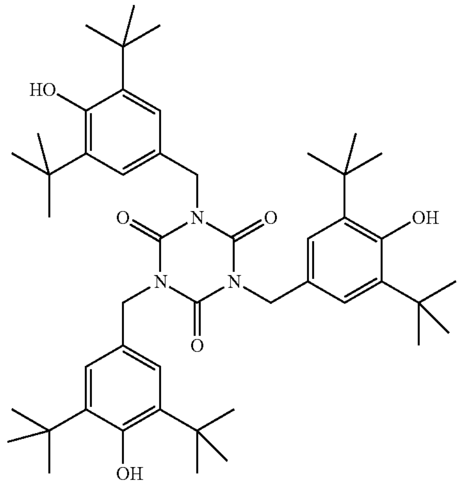 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
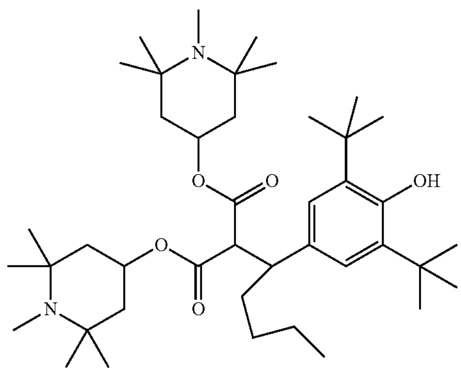 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
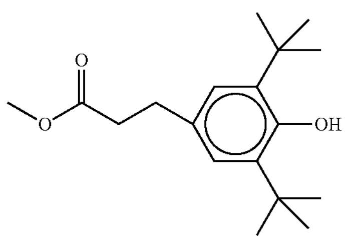
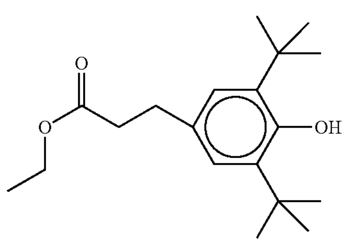
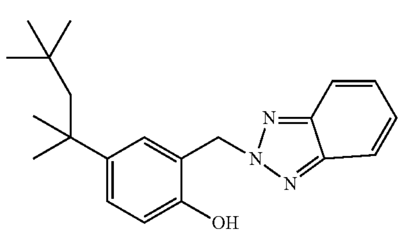 [SMILES: CC(C)(C)CC(C)(C)c1ccc(O)c(Cn2nc3ccccc3n2)c1]

TABLE C-continued
| Stabilizers which can be added, for example, to the mixtures according to the invention in amounts of 0-10% by weight are shown below. |
| --- |
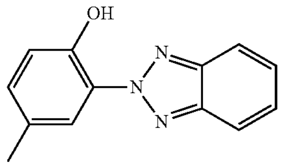 [SMILES: Cc1ccc(O)c(-n2nc3ccccc3n2)c1]
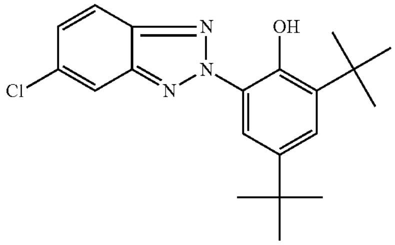 [SMILES: CC(C)(C)c1cc(-n2nc3ccc(Cl)cc3n2)c(O)c(C(C)(C)C)c1]
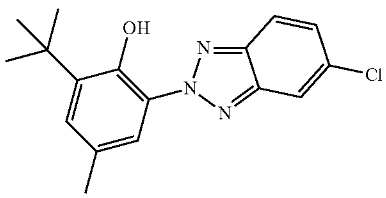 [SMILES: Cc1cc(-n2nc3ccc(Cl)cc3n2)c(O)c(C(C)(C)C)c1]
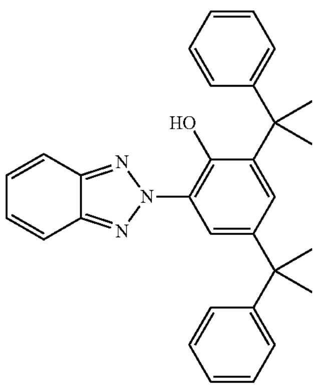 [SMILES: CC(C)(c1ccccc1)c1cc(-n2nc3ccccc3n2)c(O)c(C(C)(C)c2ccccc2)c1]
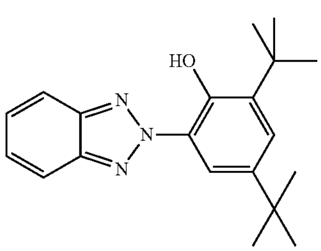 [SMILES: CC(C)(C)c1cc(-n2nc3ccccc3n2)c(O)c(C(C)(C)C)c1]
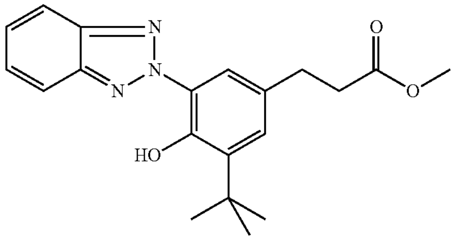 [SMILES: COC(=O)CCc1cc(-n2nc3ccccc3n2)c(O)c(C(C)(C)C)c1]

TABLE C-continued
| Stabilizers which can be added, for example, to the mixtures according to the invention in amounts of 0-10% by weight are shown below. |
| --- |
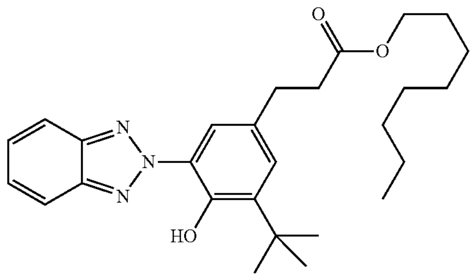 [SMILES: CCCCCCCCOC(=O)CCc1cc(-n2nc3ccccc3n2)c(O)c(C(C)(C)C)c1]
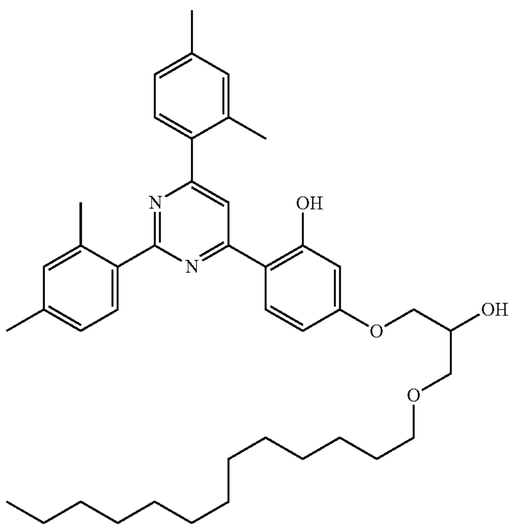 [SMILES: CCCCCCCCCCCCCOCC(O)COc1ccc(-c2cc(-c3ccc(C)cc3C)nc(-c3ccc(C)cc3C)n2)c(O)c1]
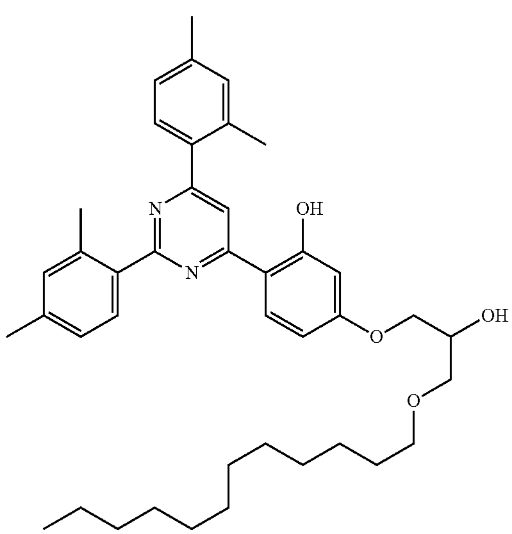 [SMILES: CCCCCCCCCCCCOCC(O)COc1ccc(-c2cc(-c3ccc(C)cc3C)nc(-c3ccc(C)cc3C)n2)c(O)c1]

TABLE C-continued
| Stabilizers which can be added, for example, to the mixtures according to the invention in amounts of 0-10% by weight are shown below. |
| --- |
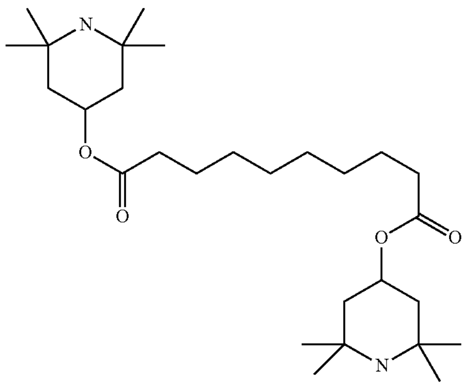
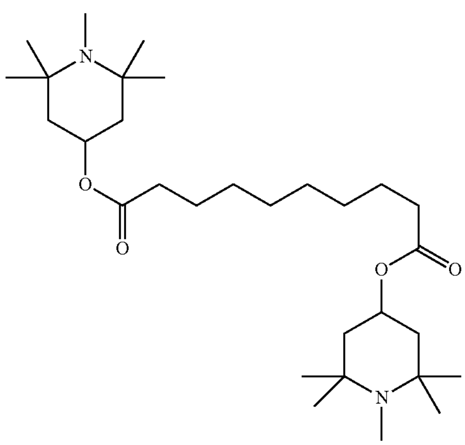
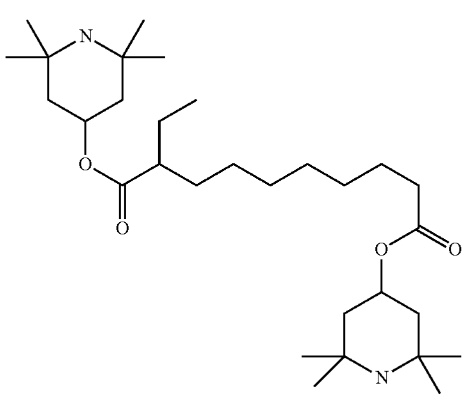

TABLE C-continued

| Stabilizers which can be added, for example, to the mixtures according to the invention in amounts of 0-10% by weight are shown below. |
| --- |

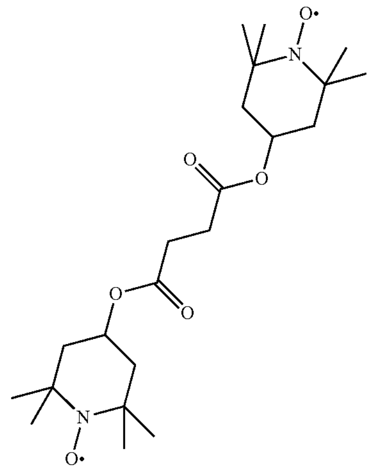

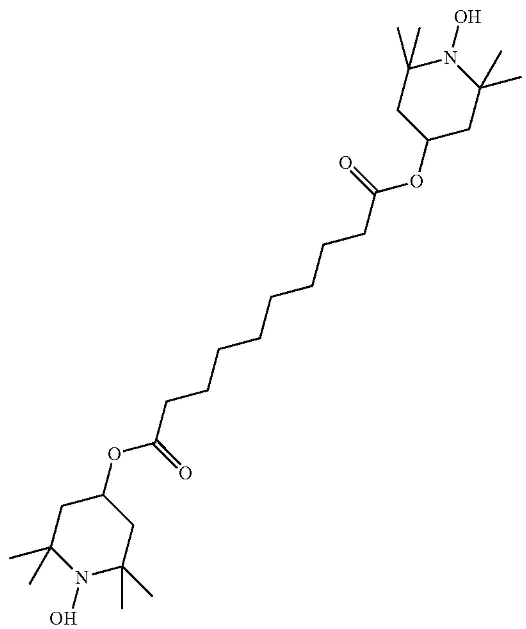

The medium according to the invention particularly preferably comprises Tinuvin® 770 (bis(2,2,6,6-tetramethyl-4-piperidyl) sebacate), preferably in amounts of 0.001-5% by weight, based on the liquid-crystalline medium.

TABLE D

| Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF). |
| --- |

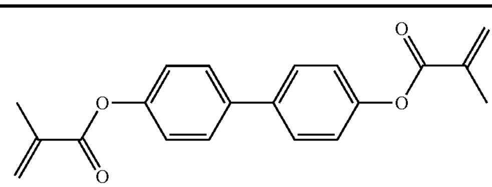

RM-1

TABLE D-continued

| |
|---|
| Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF). |

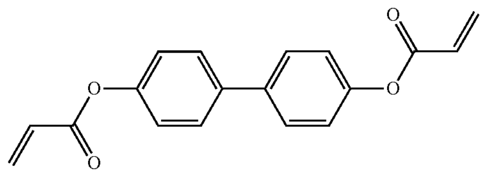 [SMILES: C=CC(=O)Oc1ccc(-c2ccc(OC(=O)C=C)cc2)cc1]

RM-2

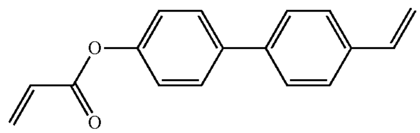 [SMILES: C=CC(=O)Oc1ccc(-c2ccc(C=C)cc2)cc1]

RM-3

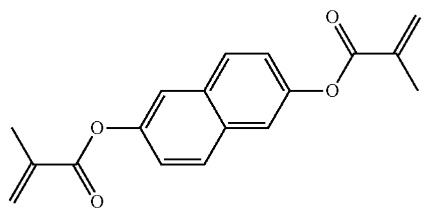 [SMILES: C=C(C)C(=O)Oc1ccc2cc(OC(=O)C(=C)C)ccc2c1]

RM-4

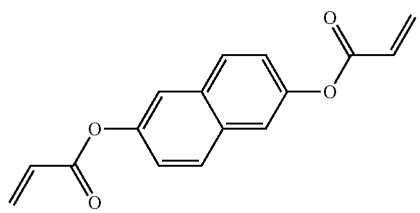 [SMILES: C=CC(=O)Oc1ccc2cc(OC(=O)C=C)ccc2c1]

RM-5

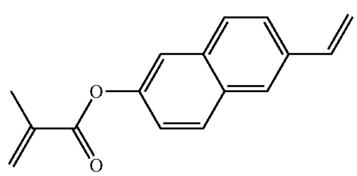 [SMILES: C=Cc1ccc2cc(OC(=O)C(=C)C)ccc2c1]

RM-6

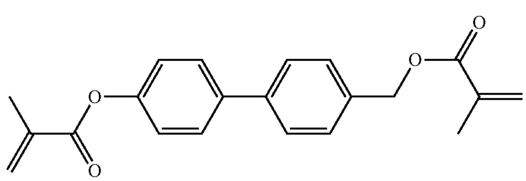 [SMILES: C=C(C)C(=O)OCc1ccc(-c2ccc(OC(=O)C(=C)C)cc2)cc1]

RM-7

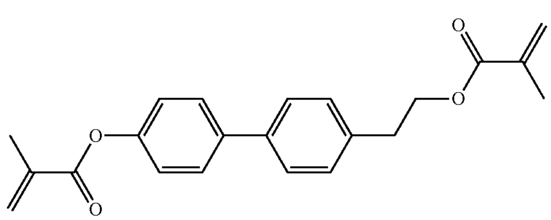 [SMILES: C=C(C)C(=O)OCCc1ccc(-c2ccc(OC(=O)C(=C)C)cc2)cc1]

RM-8

TABLE D-continued

| |
|---|
| Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF). |

RM-9

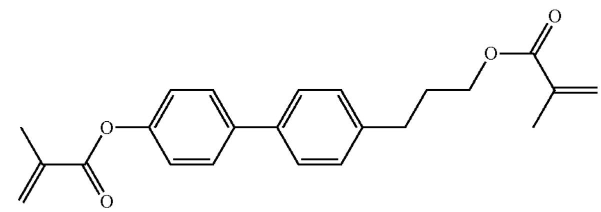 [SMILES: C=C(C)C(=O)OCCCc1ccc(-c2ccc(OC(=O)C(=C)C)cc2)cc1]

RM-10

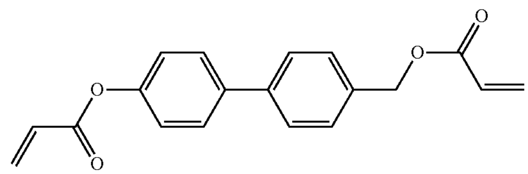 [SMILES: C=CC(=O)OCc1ccc(-c2ccc(OC(=O)C=C)cc2)cc1]

RM-11

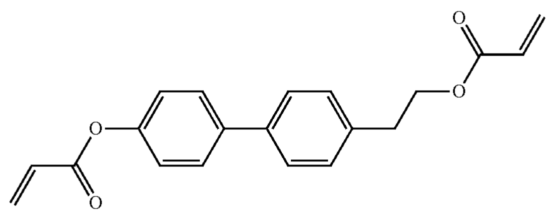 [SMILES: C=CC(=O)OCCc1ccc(-c2ccc(OC(=O)C=C)cc2)cc1]

RM-12

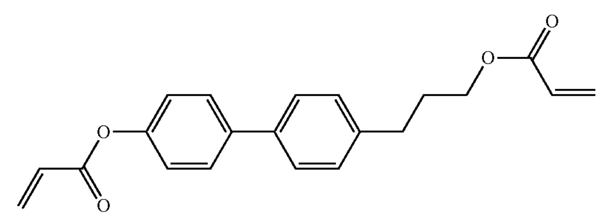 [SMILES: C=CC(=O)OCCCc1ccc(-c2ccc(OC(=O)C=C)cc2)cc1]

RM-13

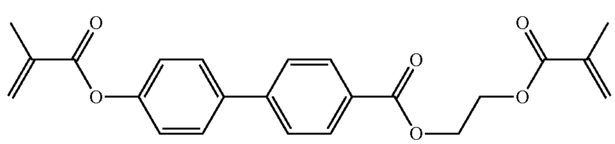 [SMILES: C=C(C)C(=O)OCCOC(=O)c1ccc(-c2ccc(OC(=O)C(=C)C)cc2)cc1]

RM-14

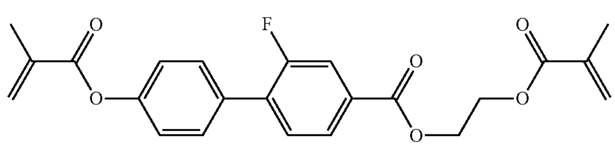

RM-15

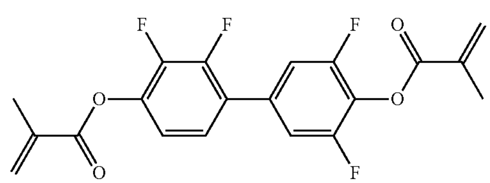 [SMILES: C=C(C)C(=O)Oc1ccc(-c2cc(F)c(OC(=O)C(=C)C)c(F)c2)c(F)c1F]

RM-16

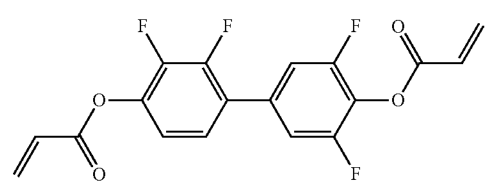 [SMILES: C=CC(=O)Oc1ccc(-c2cc(F)c(OC(=O)C=C)c(F)c2)c(F)c1F]

TABLE D-continued

Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

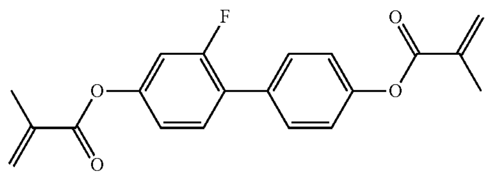 [SMILES: C=C(C)C(=O)Oc1ccc(-c2ccc(OC(=O)C(=C)C)cc2F)cc1]

RM-17

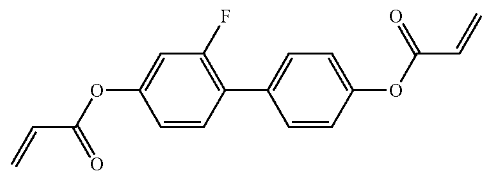

RM-18

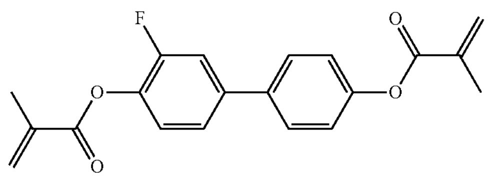

RM-19

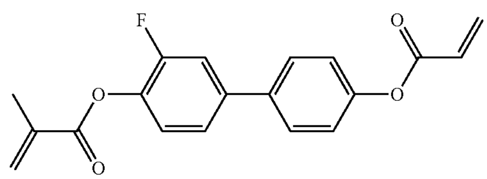 [SMILES: C=CC(=O)Oc1ccc(-c2ccc(OC(=O)C(=C)C)c(F)c2)cc1]

RM-20

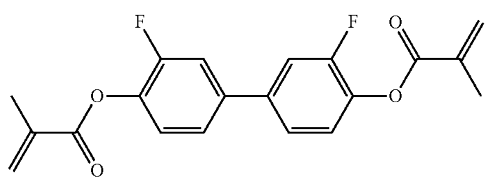 [SMILES: C=C(C)C(=O)Oc1ccc(-c2ccc(OC(=O)C(=C)C)c(F)c2)cc1F]

RM-21

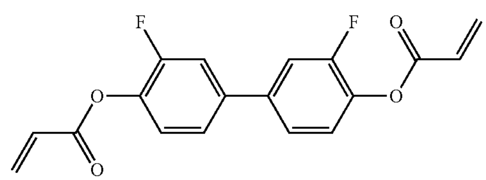 [SMILES: C=CC(=O)Oc1ccc(-c2ccc(OC(=O)C=C)c(F)c2)cc1F]

RM-22

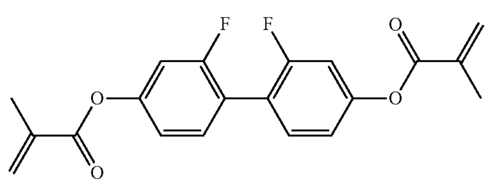

RM-23

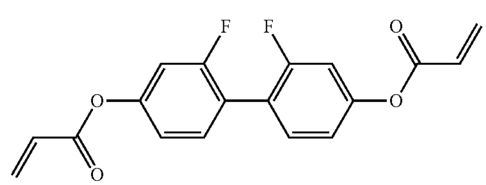

RM-24

TABLE D-continued

| |
|---|
| Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF). |

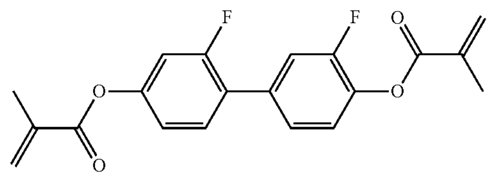

RM-25

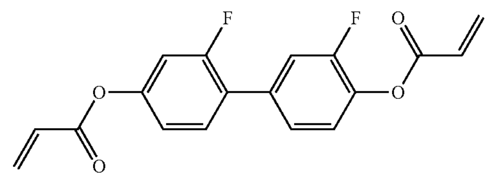 [SMILES: C=CC(=O)Oc1ccc(-c2ccc(OC(=O)C=C)c(F)c2)c(F)c1]

RM-26

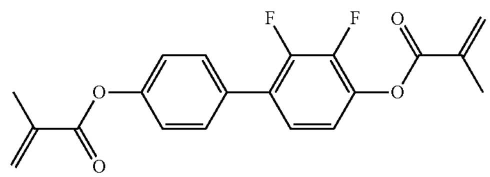 [SMILES: C=C(C)C(=O)Oc1ccc(-c2ccc(OC(=O)C(=C)C)c(F)c2F)cc1]

RM-27

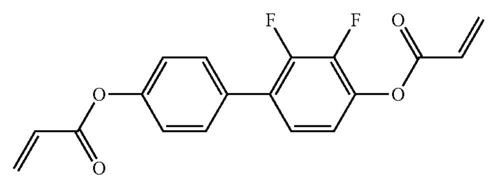 [SMILES: C=CC(=O)Oc1ccc(-c2ccc(OC(=O)C=C)c(F)c2F)cc1]

RM-28

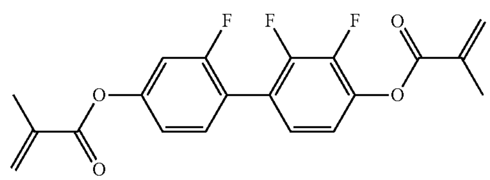

RM-29

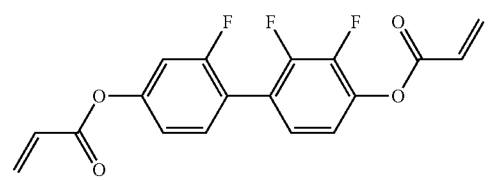 [SMILES: C=CC(=O)Oc1ccc(-c2ccc(OC(=O)C=C)c(F)c2F)c(F)c1]

RM-30

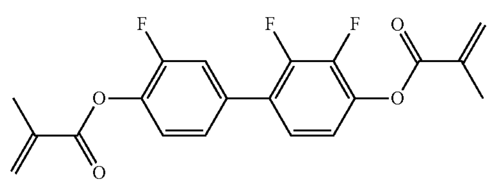 [SMILES: C=C(C)C(=O)Oc1ccc(-c2ccc(OC(=O)C(=C)C)c(F)c2F)cc1F]

RM-31

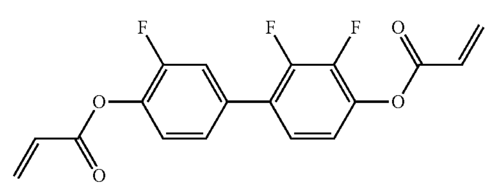

RM-32

TABLE D-continued

Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

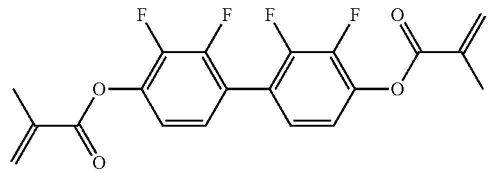
RM-33

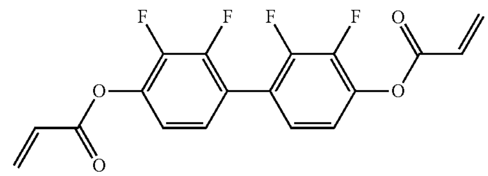 [SMILES: C=CC(=O)Oc1ccc(-c2ccc(OC(=O)C=C)c(F)c2F)c(F)c1F]
RM-34

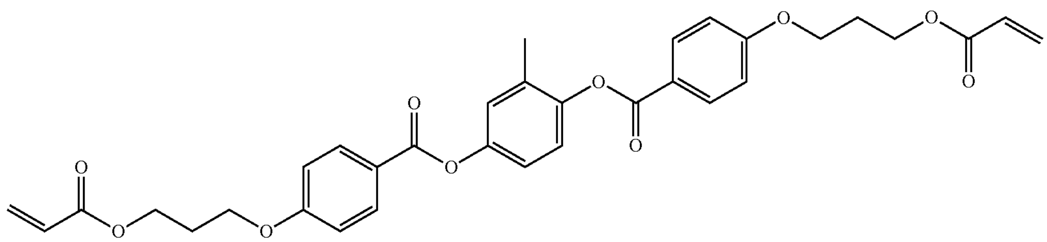 [SMILES: C=CC(=O)OCCCOc1ccc(C(=O)Oc2ccc(OC(=O)c3ccc(OCCCOC(=O)C=C)cc3)c(C)c2)cc1]
RM-35

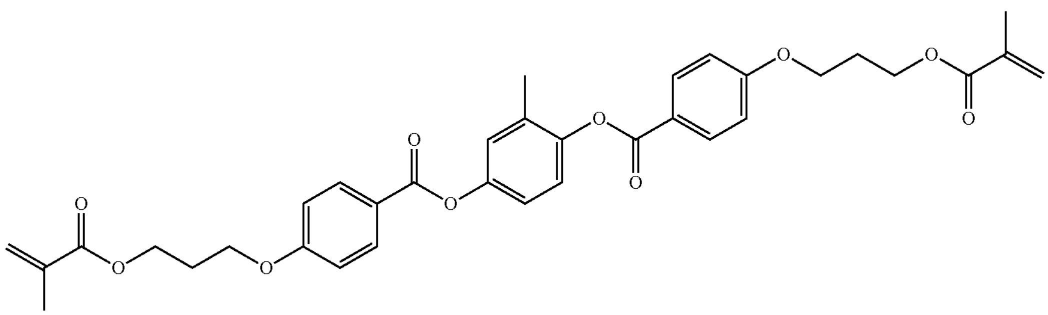 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-36

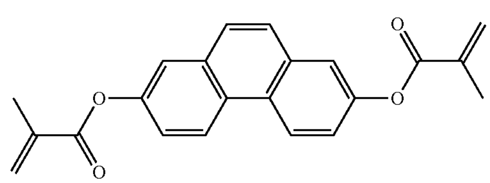 [SMILES: C=C(C)C(=O)Oc1ccc2c(ccc3cc(OC(=O)C(=C)C)ccc32)c1]
RM-37

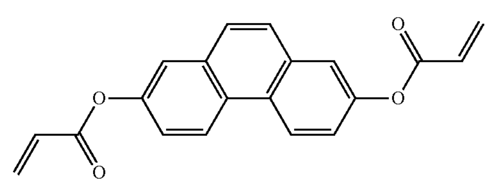 [SMILES: C=CC(=O)Oc1ccc2c(ccc3cc(OC(=O)C=C)ccc32)c1]
RM-38

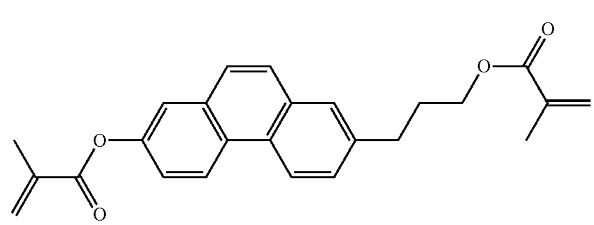 [SMILES: C=C(C)C(=O)OCCCc1ccc2c(ccc3cc(OC(=O)C(=C)C)ccc32)c1]
RM-39

TABLE D-continued

Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

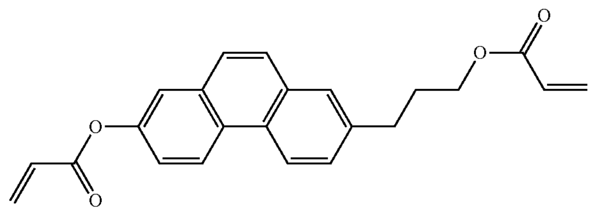 [SMILES: C=CC(=O)OCCCc1ccc2c(ccc3cc(OC(=O)C=C)ccc32)c1]

RM-40

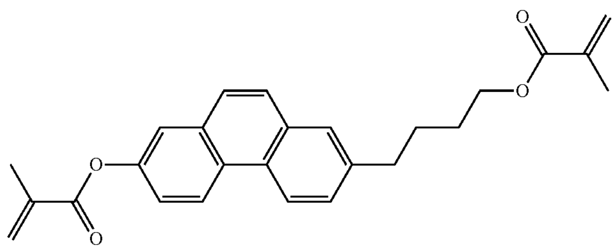 [SMILES: C=C(C)C(=O)OCCCCc1ccc2c(ccc3cc(OC(=O)C(=C)C)ccc32)c1]

RM-41

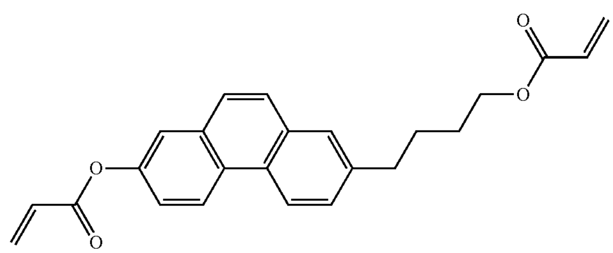 [SMILES: C=CC(=O)OCCCCc1ccc2c(ccc3cc(OC(=O)C=C)ccc32)c1]

RM-42

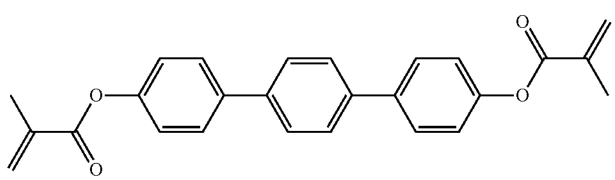 [SMILES: C=C(C)C(=O)Oc1ccc(-c2ccc(-c3ccc(OC(=O)C(=C)C)cc3)cc2)cc1]

RM-43

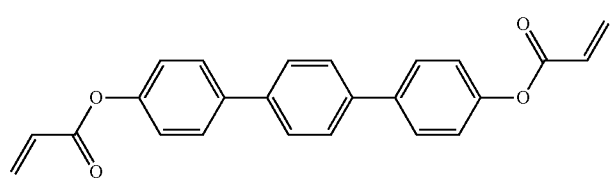 [SMILES: C=CC(=O)Oc1ccc(-c2ccc(-c3ccc(OC(=O)C=C)cc3)cc2)cc1]

RM-44

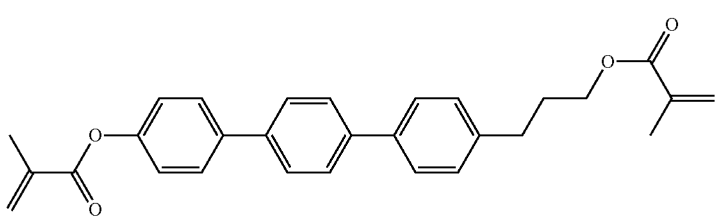 [SMILES: C=C(C)C(=O)OCCCc1ccc(-c2ccc(-c3ccc(OC(=O)C(=C)C)cc3)cc2)cc1]

RM-45

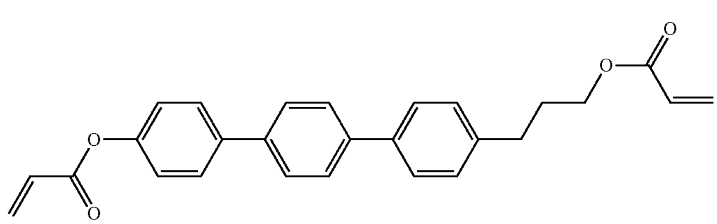 [SMILES: C=CC(=O)OCCCc1ccc(-c2ccc(-c3ccc(OC(=O)C=C)cc3)cc2)cc1]

RM-46

TABLE D-continued

| |
|---|
| Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF). |

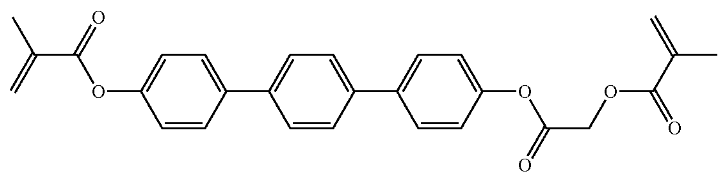 [SMILES: C=C(C)C(=O)OCC(=O)Oc1ccc(-c2ccc(-c3ccc(OC(=O)C(=C)C)cc3)cc2)cc1]

RM-47

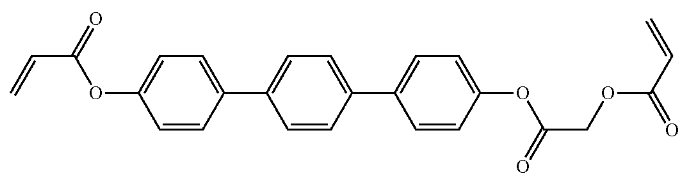 [SMILES: C=CC(=O)OCC(=O)Oc1ccc(-c2ccc(-c3ccc(OC(=O)C=C)cc3)cc2)cc1]

RM-48

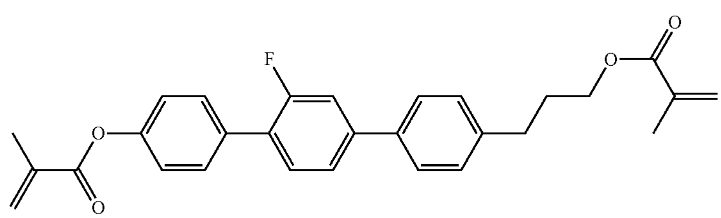 [SMILES: C=C(C)C(=O)OCCCc1ccc(-c2ccc(-c3ccc(OC(=O)C(=C)C)cc3)c(F)c2)cc1]

RM-49

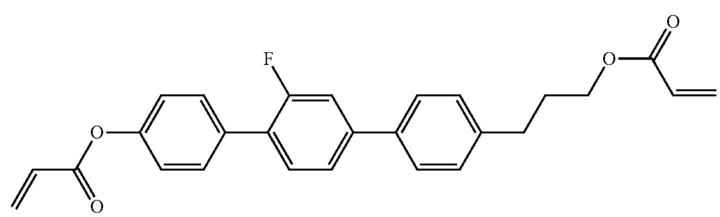 [SMILES: C=CC(=O)OCCCc1ccc(-c2ccc(-c3ccc(OC(=O)C=C)cc3)c(F)c2)cc1]

RM-50

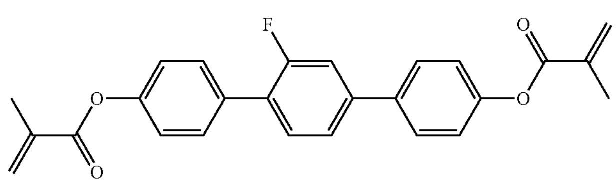

RM-51

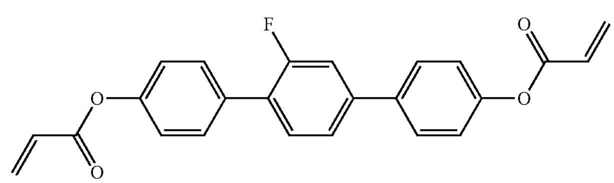

RM-52

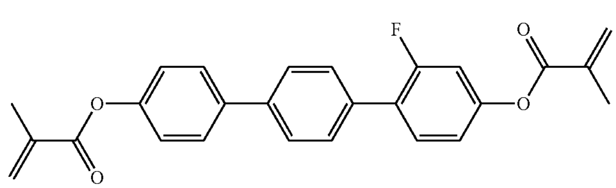 [SMILES: C=C(C)C(=O)Oc1ccc(-c2ccc(-c3ccc(OC(=O)C(=C)C)cc3F)cc2)cc1]

RM-53

TABLE D-continued

Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

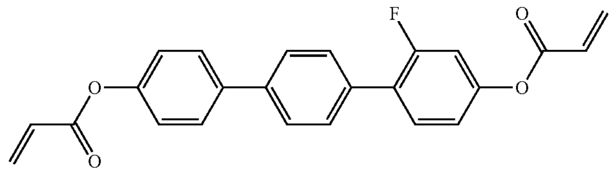 [SMILES: C=CC(=O)Oc1ccc(-c2ccc(-c3ccc(OC(=O)C=C)cc3F)cc2)cc1]

RM-54

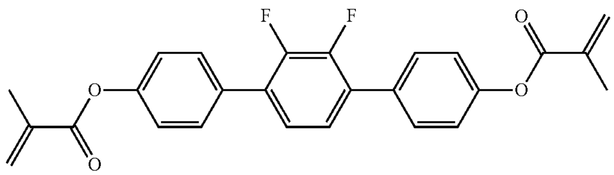 [SMILES: C=C(C)C(=O)Oc1ccc(-c2ccc(-c3ccc(OC(=O)C(=C)C)cc3)c(F)c2F)cc1]

RM-55

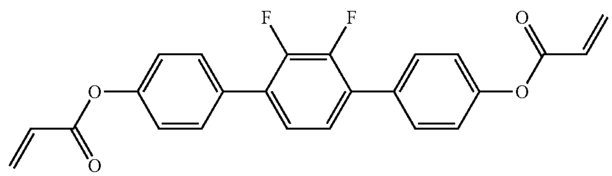

RM-56

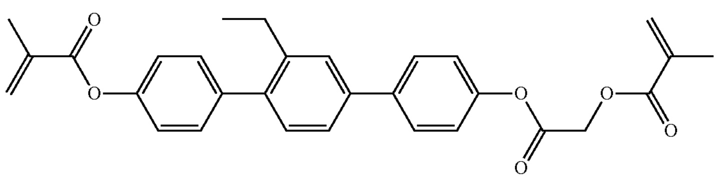 [SMILES: C=C(C)C(=O)OCC(=O)Oc1ccc(-c2ccc(-c3ccc(OC(=O)C(=C)C)cc3)c(CC)c2)cc1]

RM-57

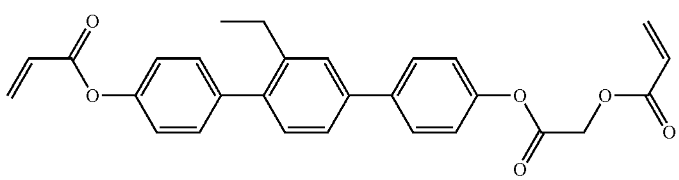 [SMILES: C=CC(=O)OCC(=O)Oc1ccc(-c2ccc(-c3ccc(OC(=O)C=C)cc3)c(CC)c2)cc1]

RM-58

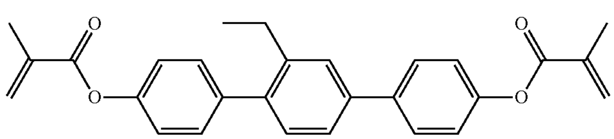 [SMILES: C=C(C)C(=O)Oc1ccc(-c2ccc(-c3ccc(OC(=O)C(=C)C)cc3)c(CC)c2)cc1]

RM-59

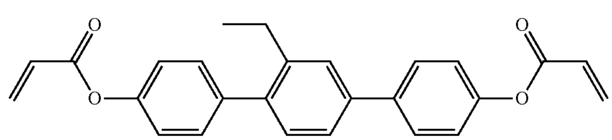 [SMILES: C=CC(=O)Oc1ccc(-c2ccc(-c3ccc(OC(=O)C=C)cc3)c(CC)c2)cc1]

RM-60

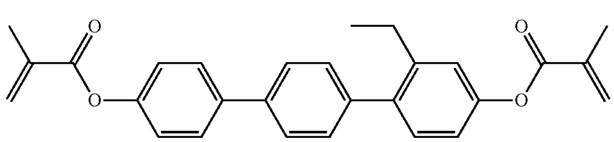 [SMILES: C=C(C)C(=O)Oc1ccc(-c2ccc(-c3ccc(OC(=O)C(=C)C)cc3CC)cc2)cc1]

RM-61

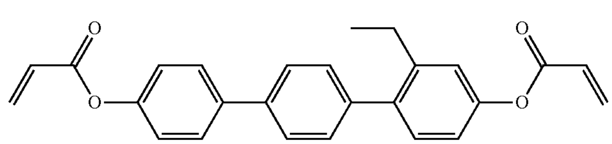

RM-62

TABLE D-continued

Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

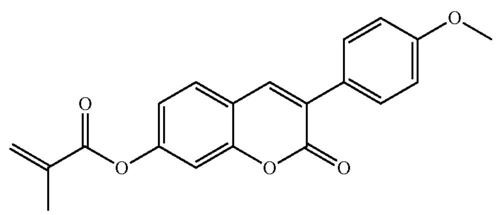 [SMILES: C=C(C)C(=O)Oc1ccc2cc(-c3ccc(OC)cc3)c(=O)oc2c1]
RM-63

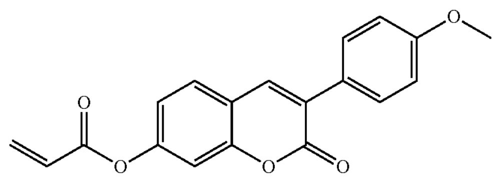 [SMILES: C=CC(=O)Oc1ccc2cc(-c3ccc(OC)cc3)c(=O)oc2c1]
RM-64

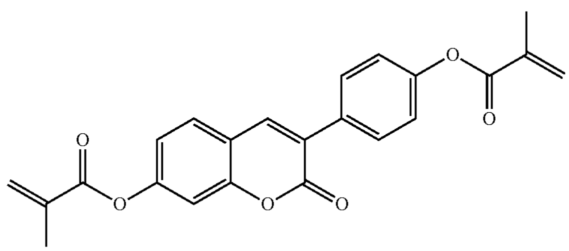 [SMILES: C=C(C)C(=O)Oc1ccc(-c2cc3ccc(OC(=O)C(=C)C)cc3oc2=O)cc1]
RM-65

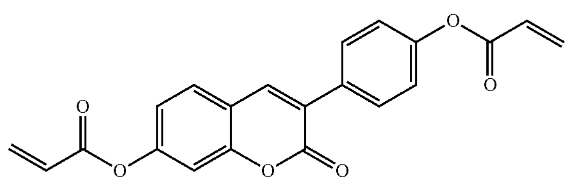 [SMILES: C=CC(=O)Oc1ccc(-c2cc3ccc(OC(=O)C=C)cc3oc2=O)cc1]
RM-66

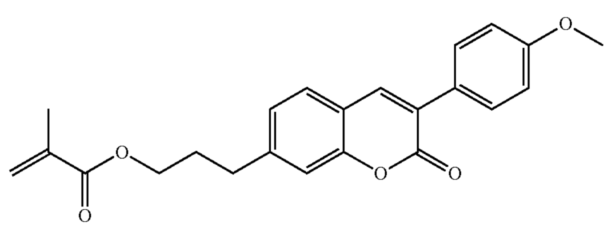 [SMILES: C=C(C)C(=O)OCCCc1ccc2cc(-c3ccc(OC)cc3)c(=O)oc2c1]
RM-67

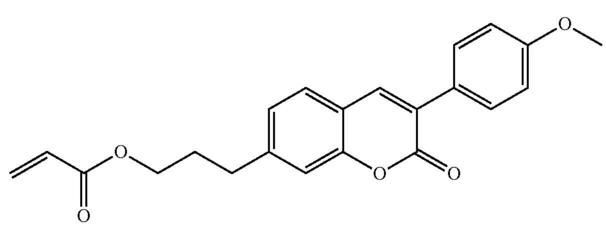 [SMILES: C=CC(=O)OCCCc1ccc2cc(-c3ccc(OC)cc3)c(=O)oc2c1]
RM-68

TABLE D-continued

| |
|---|
| Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF). |

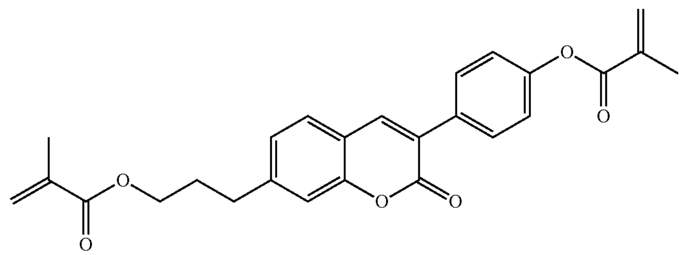 [SMILES: C=C(C)C(=O)OCCCc1ccc2cc(-c3ccc(OC(=O)C(=C)C)cc3)c(=O)oc2c1]
RM-69

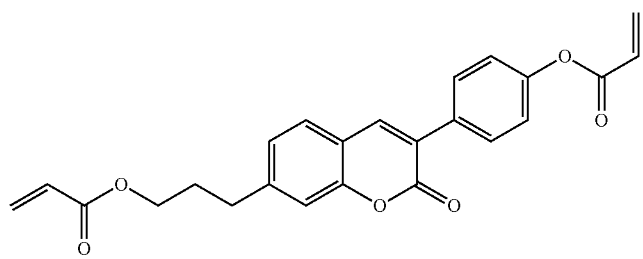 [SMILES: C=CC(=O)OCCCc1ccc2cc(-c3ccc(OC(=O)C=C)cc3)c(=O)oc2c1]
RM-70

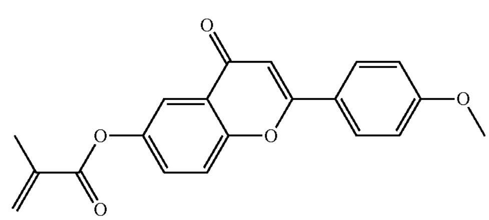 [SMILES: C=C(C)C(=O)Oc1ccc2oc(-c3ccc(OC)cc3)cc(=O)c2c1]
RM-71

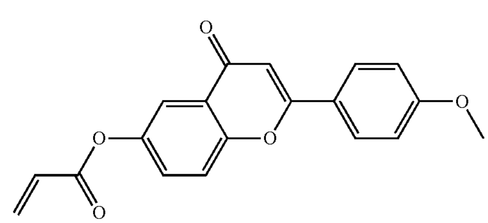 [SMILES: C=CC(=O)Oc1ccc2oc(-c3ccc(OC)cc3)cc(=O)c2c1]
RM-72

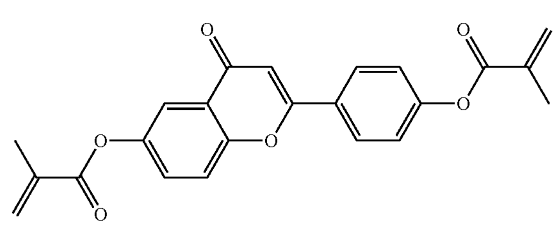 [SMILES: C=C(C)C(=O)Oc1ccc(-c2cc(=O)c3cc(OC(=O)C(=C)C)ccc3o2)cc1]
RM-73

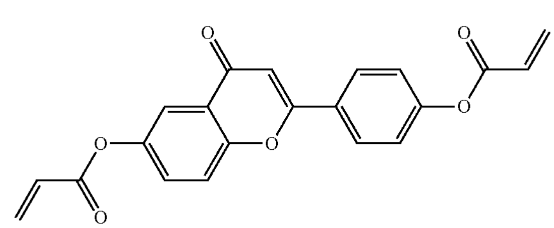 [SMILES: C=CC(=O)Oc1ccc(-c2cc(=O)c3cc(OC(=O)C=C)ccc3o2)cc1]
RM-74

TABLE D-continued

| |
|---|
| Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF). |

RM-75

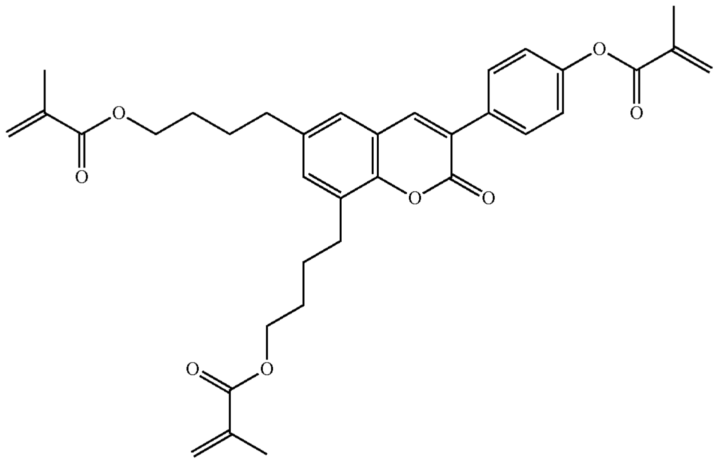 [SMILES: C=C(C)C(=O)OCCCCc1cc(CCCCOC(=O)C(=C)C)c2oc(=O)c(-c3ccc(OC(=O)C(=C)C)cc3)cc2c1]

RM-76

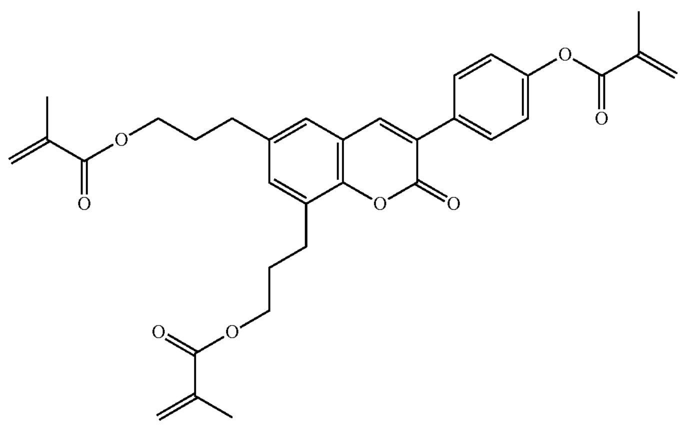 [SMILES: C=C(C)C(=O)OCCCc1cc(CCCOC(=O)C(=C)C)c2oc(=O)c(-c3ccc(OC(=O)C(=C)C)cc3)cc2c1]

RM-77

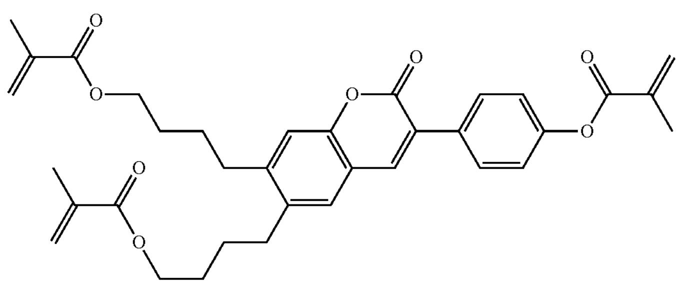 [SMILES: C=C(C)C(=O)OCCCCc1cc2cc(-c3ccc(OC(=O)C(=C)C)cc3)c(=O)oc2cc1CCCCOC(=O)C(=C)C]

RM-78

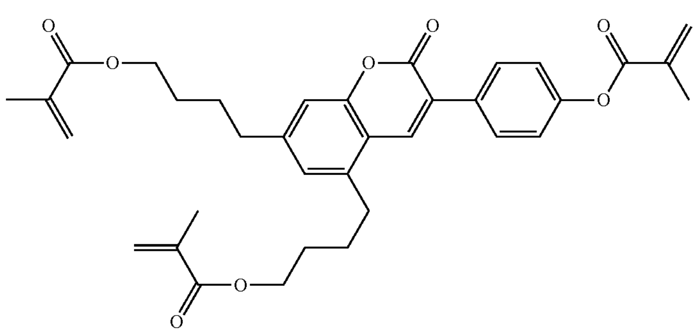 [SMILES: C=C(C)C(=O)OCCCCc1cc(CCCCOC(=O)C(=C)C)c2cc(-c3ccc(OC(=O)C(=C)C)cc3)c(=O)oc2c1]

TABLE D-continued

Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

RM-79

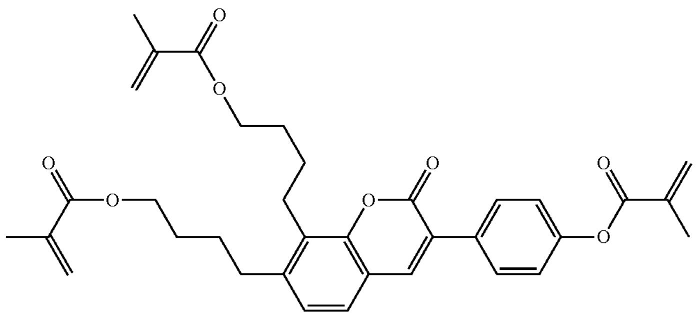 [SMILES: C=C(C)C(=O)OCCCCc1ccc2cc(-c3ccc(OC(=O)C(=C)C)cc3)c(=O)oc2c1CCCCOC(=O)C(=C)C]

RM-80

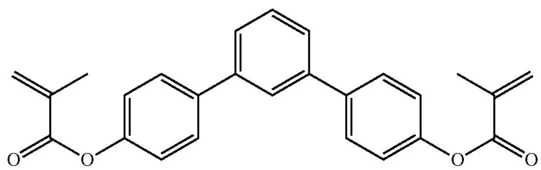 [SMILES: C=C(C)C(=O)Oc1ccc(-c2cccc(-c3ccc(OC(=O)C(=C)C)cc3)c2)cc1]

RM-81

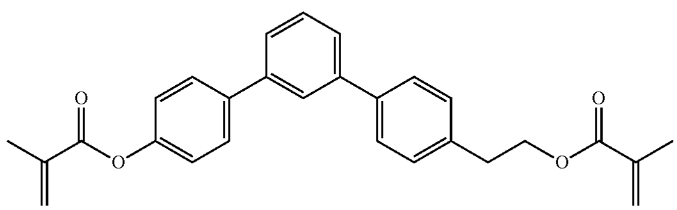 [SMILES: C=C(C)C(=O)OCCc1ccc(-c2cccc(-c3ccc(OC(=O)C(=C)C)cc3)c2)cc1]

RM-82

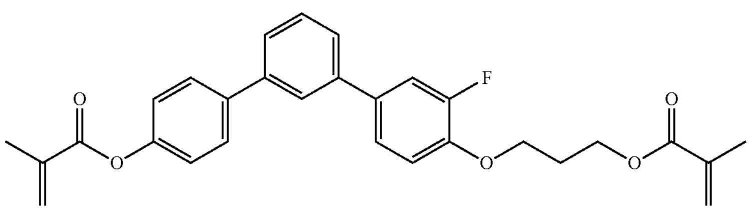 [SMILES: C=C(C)C(=O)OCCCOc1ccc(-c2cccc(-c3ccc(OC(=O)C(=C)C)cc3)c2)cc1F]

RM-83

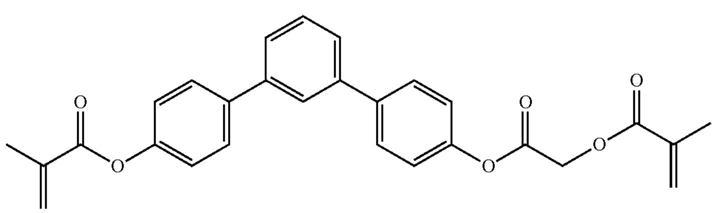 [SMILES: C=C(C)C(=O)OCC(=O)Oc1ccc(-c2cccc(-c3ccc(OC(=O)C(=C)C)cc3)c2)cc1]

RM-84

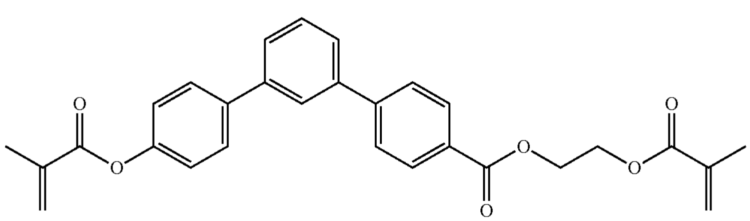 [SMILES: C=C(C)C(=O)OCCOC(=O)c1ccc(-c2cccc(-c3ccc(OC(=O)C(=C)C)cc3)c2)cc1]

TABLE D-continued

Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

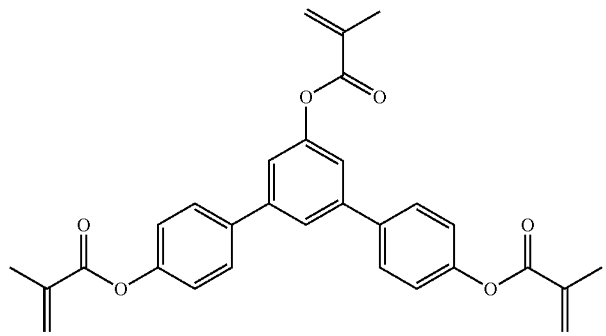 [SMILES: C=C(C)C(=O)Oc1ccc(-c2cc(OC(=O)C(=C)C)cc(-c3ccc(OC(=O)C(=C)C)cc3)c2)cc1]

RM-85

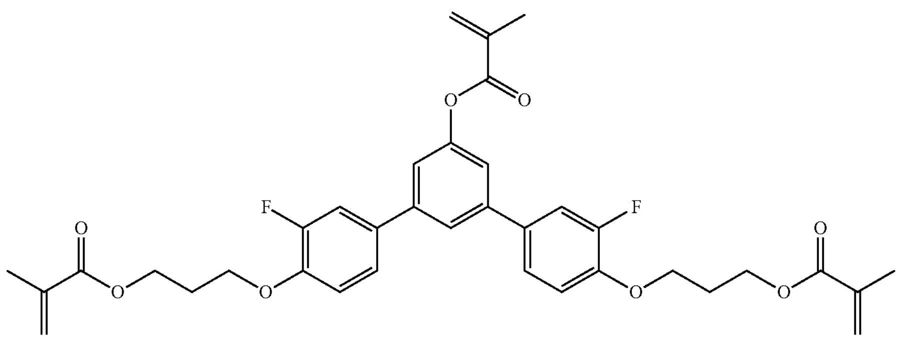 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]

RM-86

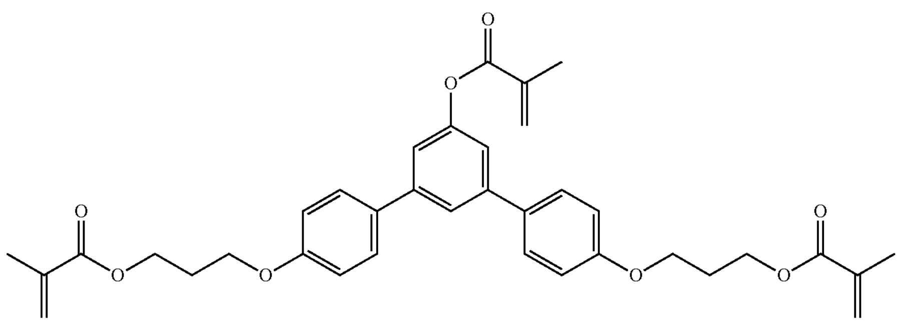 [SMILES: C=C(C)C(=O)OCCCOc1ccc(-c2cc(OC(=O)C(=C)C)cc(-c3ccc(OCCCOC(=O)C(=C)C)cc3)c2)cc1]

RM-87

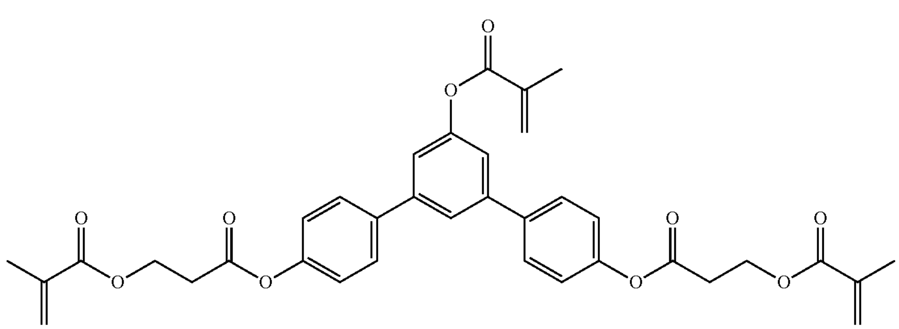 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]

RM-88

TABLE D-continued

Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

RM-89

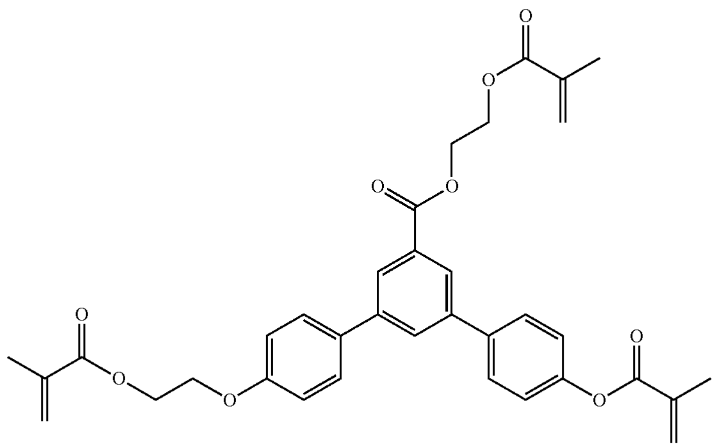 [SMILES: C=C(C)C(=O)OCCOC(=O)c1cc(-c2ccc(OCCOC(=O)C(=C)C)cc2)cc(-c2ccc(OC(=O)C(=C)C)cc2)c1]

RM-90

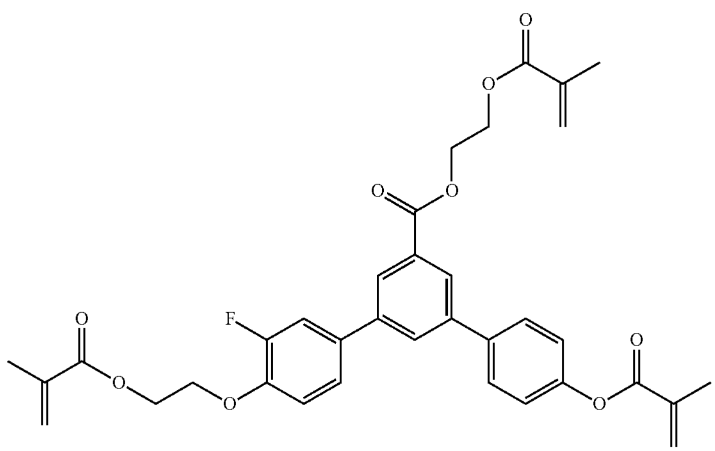 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]

RM-91

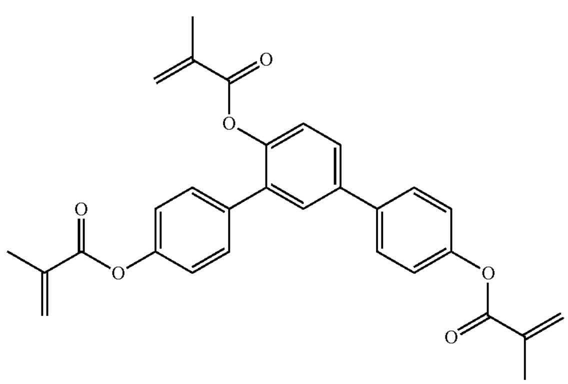 [SMILES: C=C(C)C(=O)Oc1ccc(-c2ccc(OC(=O)C(=C)C)c(-c3ccc(OC(=O)C(=C)C)cc3)c2)cc1]

TABLE D-continued

| Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF). |
|---|

RM-92

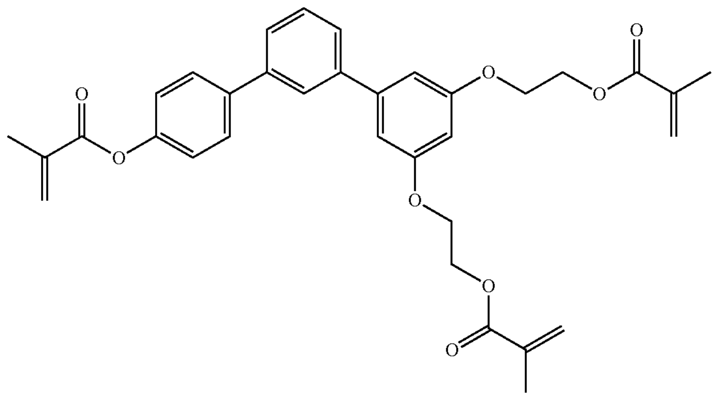 [SMILES: C=C(C)C(=O)OCCOc1cc(OCCOC(=O)C(=C)C)cc(-c2cccc(-c3ccc(OC(=O)C(=C)C)cc3)c2)c1]

RM-93

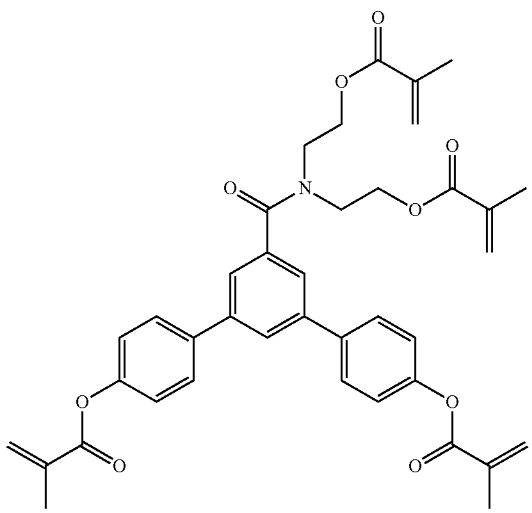 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]

RM-94

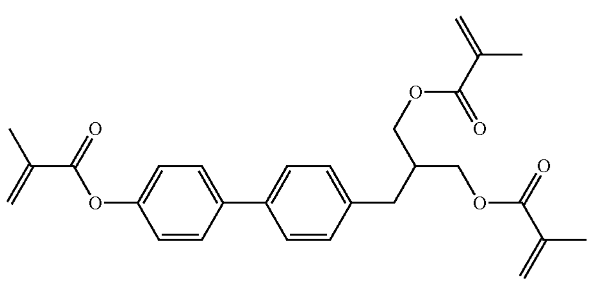 [SMILES: C=C(C)C(=O)OCC(COC(=O)C(=C)C)Cc1ccc(-c2ccc(OC(=O)C(=C)C)cc2)cc1]

RM-95

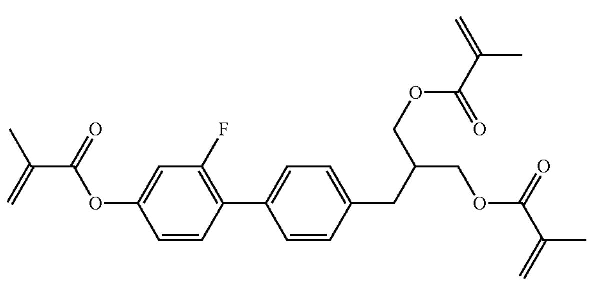 [SMILES: C=C(C)C(=O)OCC(COC(=O)C(=C)C)Cc1ccc(-c2ccc(OC(=O)C(=C)C)cc2F)cc1]

TABLE D-continued

| |
|---|
| Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF). |

RM-96

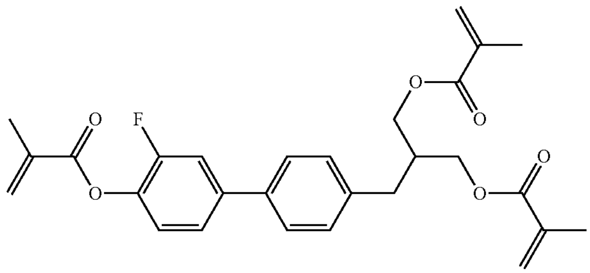 [SMILES: C=C(C)C(=O)OCC(COC(=O)C(=C)C)Cc1ccc(-c2ccc(OC(=O)C(=C)C)c(F)c2)cc1]

RM-97

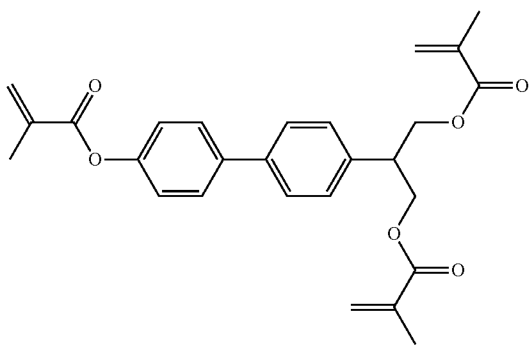 [SMILES: C=C(C)C(=O)OCC(COC(=O)C(=C)C)c1ccc(-c2ccc(OC(=O)C(=C)C)cc2)cc1]

RM-98

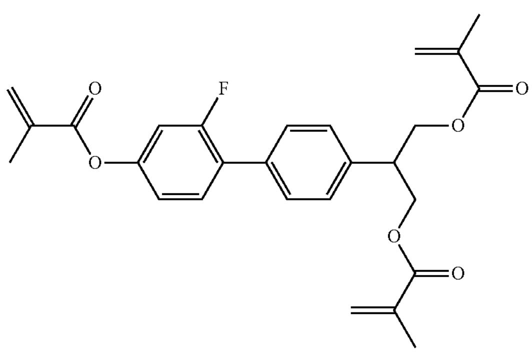 [SMILES: C=C(C)C(=O)OCC(COC(=O)C(=C)C)c1ccc(-c2ccc(OC(=O)C(=C)C)cc2F)cc1]

RM-99

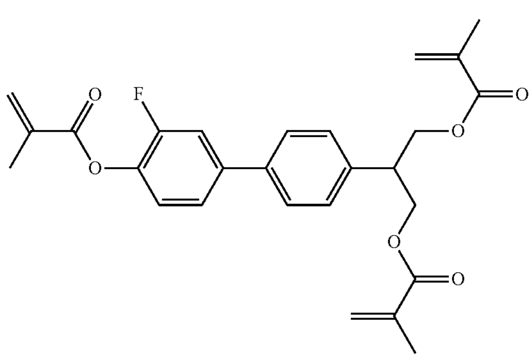 [SMILES: C=C(C)C(=O)OCC(COC(=O)C(=C)C)c1ccc(-c2ccc(OC(=O)C(=C)C)c(F)c2)cc1]

TABLE D-continued

| |
|---|
| Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF). |

RM-100

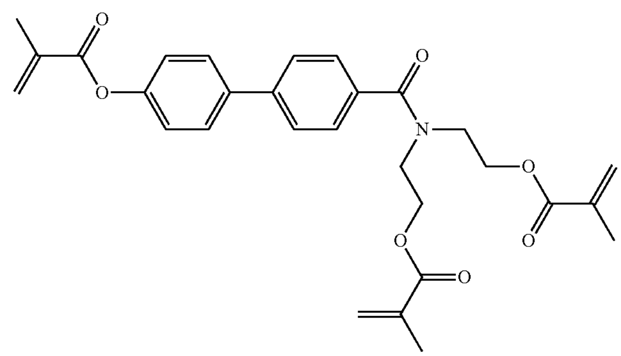 [SMILES: C=C(C)C(=O)OCCN(CCOC(=O)C(=C)C)C(=O)c1ccc(-c2ccc(OC(=O)C(=C)C)cc2)cc1]

RM-101

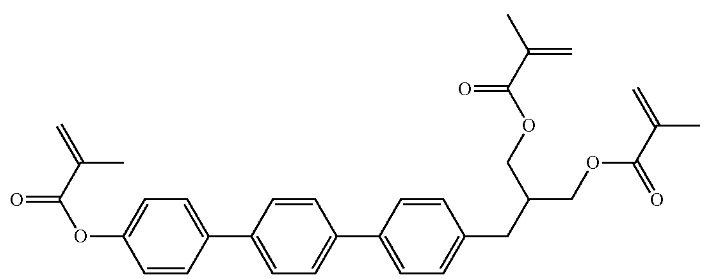 [SMILES: C=C(C)C(=O)OCC(COC(=O)C(=C)C)Cc1ccc(-c2ccc(-c3ccc(OC(=O)C(=C)C)cc3)cc2)cc1]

RM-102

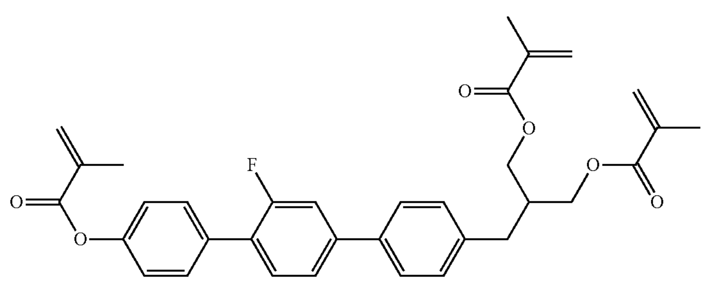 [SMILES: C=C(C)C(=O)OCC(COC(=O)C(=C)C)Cc1ccc(-c2ccc(-c3ccc(OC(=O)C(=C)C)cc3)c(F)c2)cc1]

RM-103

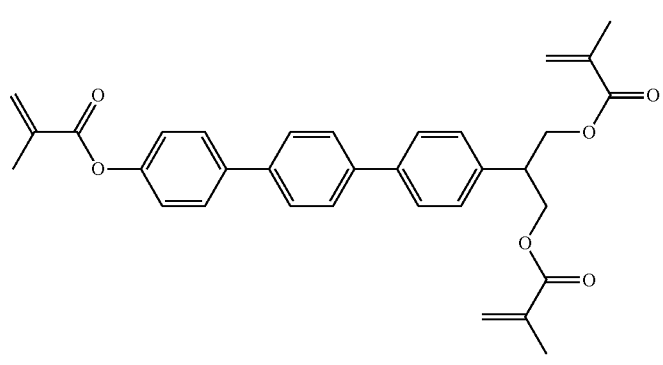

TABLE D-continued

| |
|---|
| Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF). |

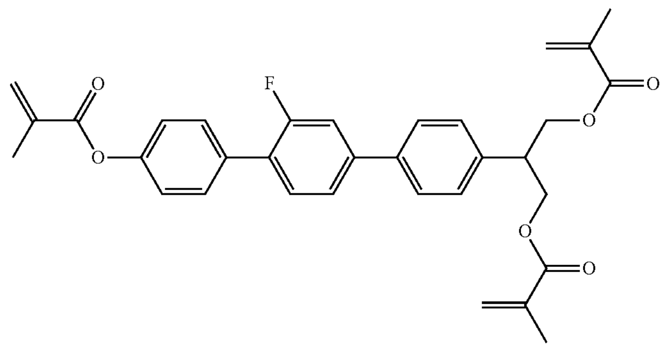 [SMILES: C=C(C)C(=O)OCC(COC(=O)C(=C)C)c1ccc(-c2ccc(-c3ccc(OC(=O)C(=C)C)cc3)c(F)c2)cc1]

RM-104

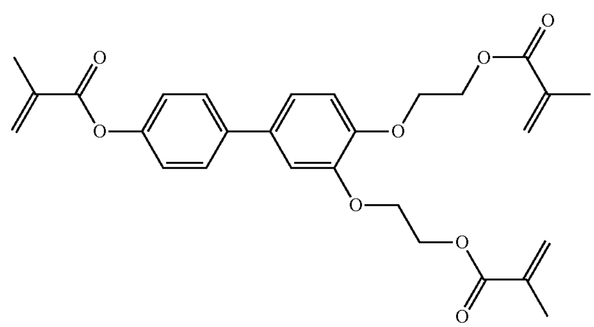 [SMILES: C=C(C)C(=O)OCCOc1ccc(-c2ccc(OC(=O)C(=C)C)cc2)cc1OCCOC(=O)C(=C)C]

RM-105

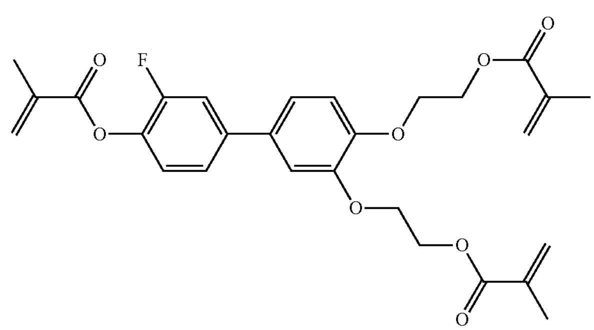 [SMILES: C=C(C)C(=O)OCCOc1ccc(-c2ccc(OC(=O)C(=C)C)c(F)c2)cc1OCCOC(=O)C(=C)C]

RM-106

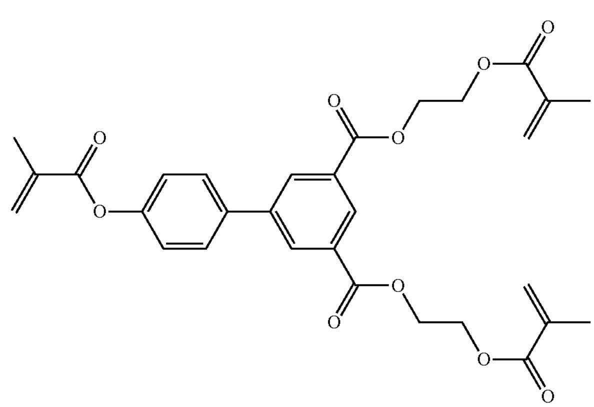 [SMILES: C=C(C)C(=O)OCCOC(=O)c1cc(C(=O)OCCOC(=O)C(=C)C)cc(-c2ccc(OC(=O)C(=C)C)cc2)c1]

RM-107

TABLE D-continued

| |
|---|
| Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF). |

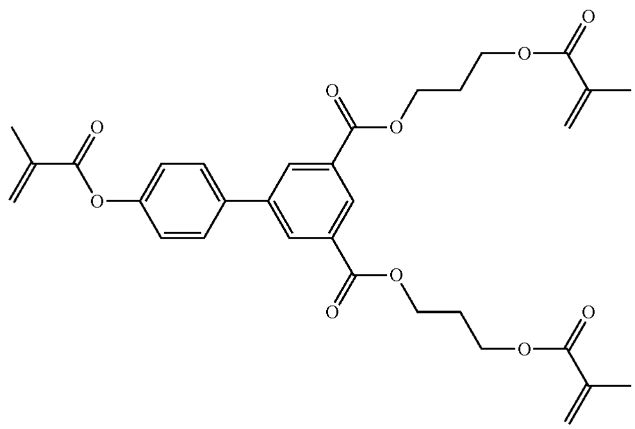 [SMILES: C=C(C)C(=O)OCCCOC(=O)c1cc(C(=O)OCCCOC(=O)C(=C)C)cc(-c2ccc(OC(=O)C(=C)C)cc2)c1]

RM-108

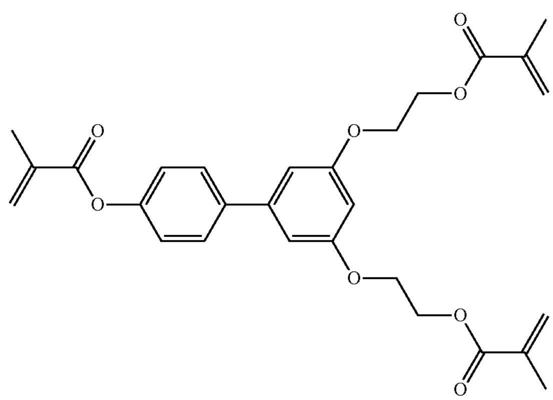 [SMILES: C=C(C)C(=O)OCCOc1cc(OCCOC(=O)C(=C)C)cc(-c2ccc(OC(=O)C(=C)C)cc2)c1]

RM-109

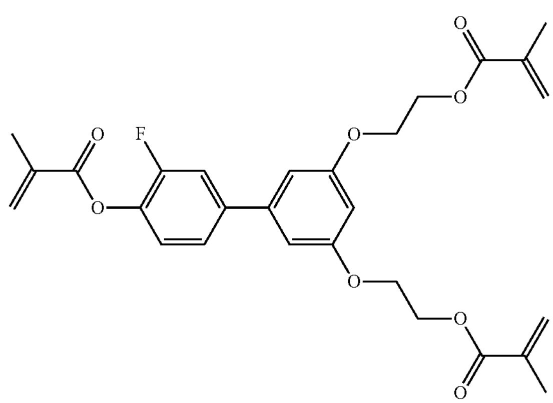

RM-110

TABLE D-continued

| |
|---|
| Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF). |

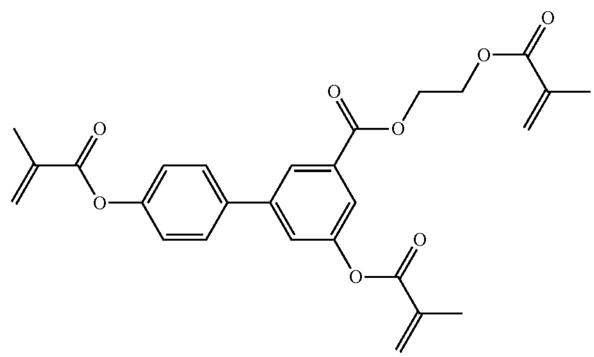 [SMILES: C=C(C)C(=O)OCCOC(=O)c1cc(OC(=O)C(=C)C)cc(-c2ccc(OC(=O)C(=C)C)cc2)c1]

RM-111

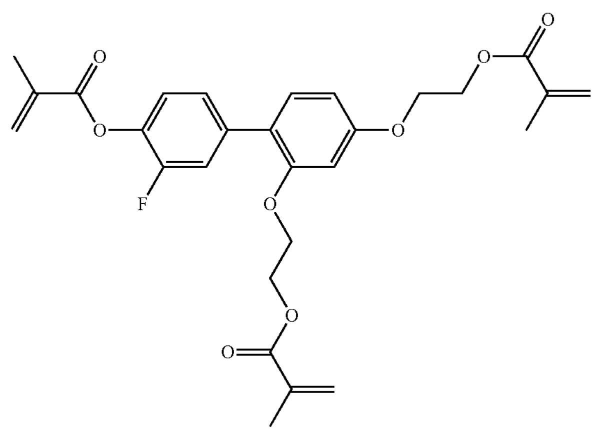

RM-112

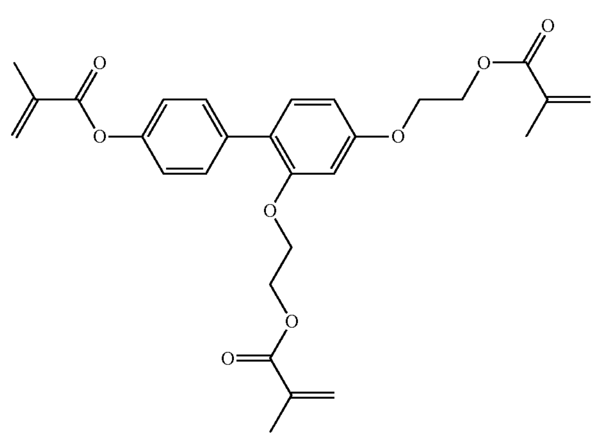 [SMILES: C=C(C)C(=O)OCCOc1ccc(-c2ccc(OC(=O)C(=C)C)cc2)c(OCCOC(=O)C(=C)C)c1]

RM-113

TABLE D-continued

| |
|---|
| Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF). |

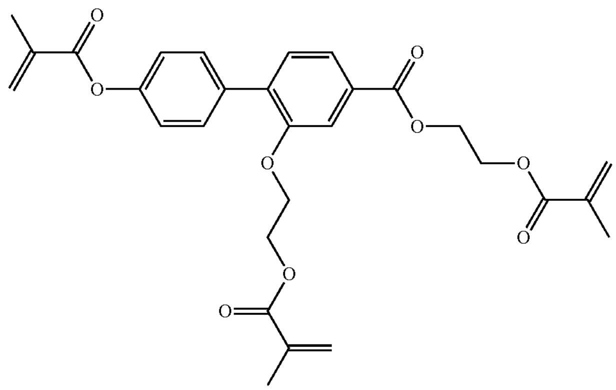 [SMILES: C=C(C)C(=O)OCCOC(=O)c1ccc(-c2ccc(OC(=O)C(=C)C)cc2)c(OCCOC(=O)C(=C)C)c1]

RM-114

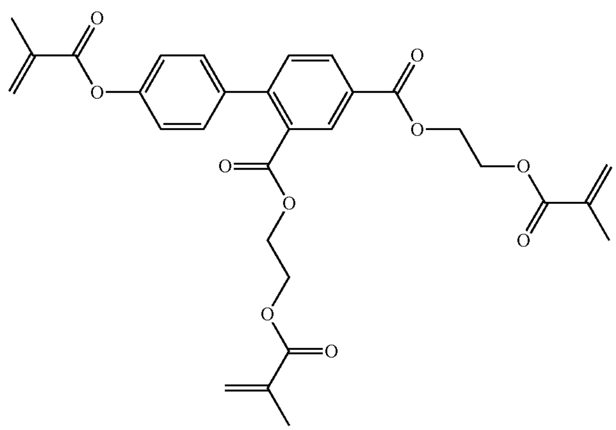 [SMILES: C=C(C)C(=O)OCCOC(=O)c1ccc(-c2ccc(OC(=O)C(=C)C)cc2)c(C(=O)OCCOC(=O)C(=C)C)c1]

RM-115

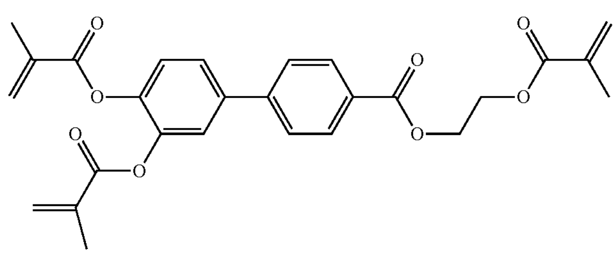 [SMILES: C=C(C)C(=O)OCCOC(=O)c1ccc(-c2ccc(OC(=O)C(=C)C)c(OC(=O)C(=C)C)c2)cc1]

RM-116

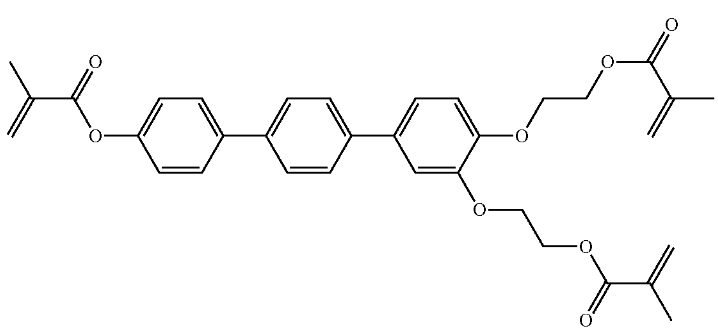 [SMILES: C=C(C)C(=O)OCCOc1ccc(-c2ccc(-c3ccc(OC(=O)C(=C)C)cc3)cc2)cc1OCCOC(=O)C(=C)C]

RM-117

TABLE D-continued

Table D shows example compounds which can preferably be used as reactive mesogenic compounds in the LC media in accordance with the present invention. If the mixtures according to the invention comprise one or more reactive compounds, they are preferably employed in amounts of 0.01-5% by weight. It may also be necessary to add an initiator or a mixture of two or more initiators for the polymerization. The initiator or initiator mixture is preferably added in amounts of 0.001-2% by weight, based on the mixture. A suitable initiator is, for example, Irgacure (BASF) or Irganox (BASF).

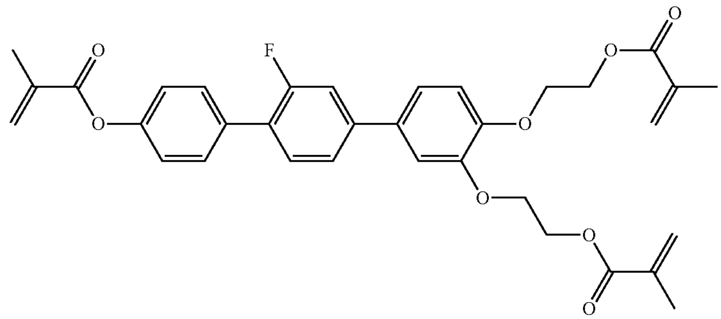 [SMILES: C=C(C)C(=O)OCCOc1ccc(-c2ccc(-c3ccc(OC(=O)C(=C)C)cc3)c(F)c2)cc1OCCOC(=O)C(=C)C]

RM-118

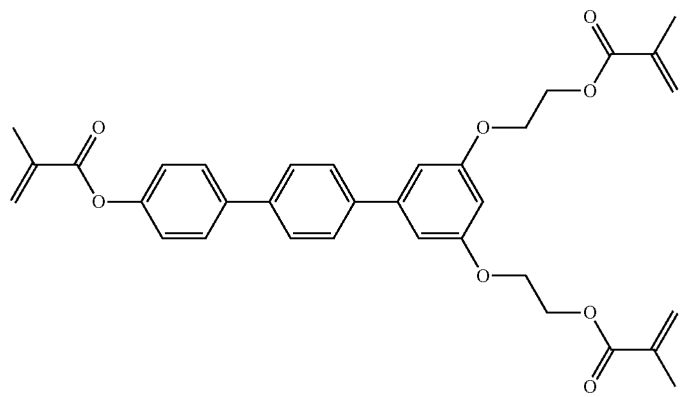 [SMILES: C=C(C)C(=O)OCCOc1cc(OCCOC(=O)C(=C)C)cc(-c2ccc(-c3ccc(OC(=O)C(=C)C)cc3)cc2)c1]

RM-119

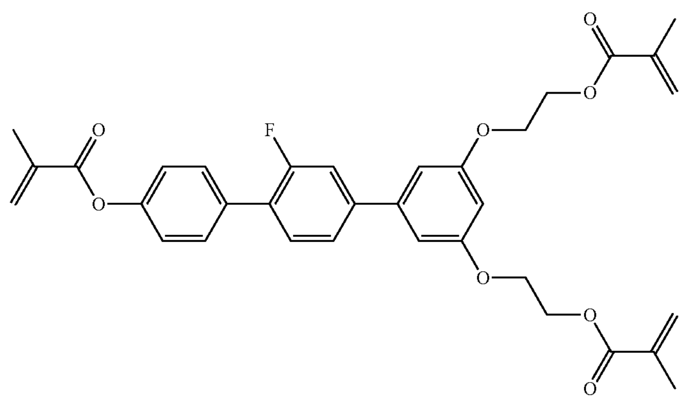 [SMILES: C=C(C)C(=O)OCCOc1cc(OCCOC(=O)C(=C)C)cc(-c2ccc(-c3ccc(OC(=O)C(=C)C)cc3)c(F)c2)c1]

RM-120

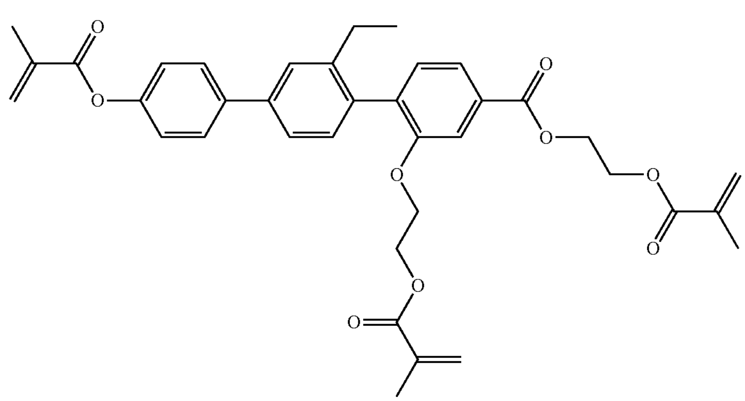 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]

RM-121

In a preferred embodiment, the mixtures according to the invention comprise one or more polymerizable compounds, preferably selected from the polymerizable compounds of the formulae RM-1 to RM-121. Media of this type are suitable, in particular, for PS-FFS and PS-IPS applications. Of the reactive mesogens shown in Table D, compounds RM-1, RM-2, RM-3, RM-4, RM-5, RM-9, RM-17, RM-42, RM-48, RM-68, RM-87, RM-91, RM-98, RM-99 and RM-101 are particularly preferred.

The reactive mesogens or the polymerizable compounds of the formula M and of the formulae RM-1 to RM-121 are furthermore suitable as stabilizers. In this case, the polymerizable compounds are not polymerized, but instead are added to the liquid-crystalline medium in concentrations >1%.

WORKING EXAMPLES

The following examples are intended to explain the invention without limiting it. In the examples, m.p. denotes the melting point and C denotes the clearing point of a liquid-crystalline substance in degrees Celsius; boiling temperatures are denoted by b.p. Furthermore:

C denotes crystalline solid state, S denotes smectic phase (the index denotes the phase type), N denotes nematic state, Ch denotes cholesteric phase, I denotes isotropic phase, Tg denotes glass-transition temperature. The number between two symbols indicates the conversion temperature in degrees Celsius.

The host mixture used for determination of the optical anisotropy Δn of the compounds of the formula I is the commercial mixture ZLI-4792 (Merck KGaA). The dielectric anisotropy Δε is determined using commercial mixture ZLI-2857. The physical data of the compound to be investigated are obtained from the change in the dielectric constants of the host mixture after addition of the compound to be investigated and extrapolation to 100% of the compound employed. In general, 10% of the compound to be investigated are dissolved in the host mixture, depending on the solubility.

Unless indicated otherwise, parts or percent data denote parts by weight or percent by weight.

Above and below, the symbols and abbreviations have the following meanings:

$V_o$ threshold voltage, capacitive [V] at 20° C.
Δn the optical anisotropy measured at 20° C. and 589 nm
Δε the dielectric anisotropy at 20° C. and 1 kHz
cl.p. clearing point [° C.]
$K_1$ elastic constant, "splay" deformation at 20° C. [pN]
$K_3$ elastic constant, "bend" deformation at 20° C. [pN]
$\gamma_1$ rotational viscosity measured at 20° C. [mPa·s], determined by the rotation method in a magnetic field
LTS low-temperature stability (nematic phase), determined in test cells.

The display used for measurement of the threshold voltage has two plane-parallel outer plates at a separation of 20 μm and electrode layers with alignment layers comprising SE-1211 (Nissan Chemicals) on top on the insides of the outer plates, which effect a homeotropic alignment of the liquid crystals.

All concentrations in this application, unless explicitly indicated otherwise, relate to the corresponding mixture or mixture component. All physical properties are determined in accordance with "Merck Liquid Crystals, Physical Properties of Liquid Crystals", status November 1997, Merck KGaA, Germany, and apply to a temperature of 20° C., unless explicitly indicated otherwise.

Example M1

| | | | |
|---|---|---|---|
| CY-3-O2 | 12.00% | Clearing point [° C.]: | 74.0 |
| CY-3-O4 | 10.00% | Δn [589 nm, 20° C.]: | 0.1064 |
| CCY-3-O2 | 6.00% | Δε [1 kHz, 20° C.]: | −3.2 |
| CCY-4-O2 | 6.50% | $\varepsilon_{\parallel}$ [1 kHz, 20° C.]: | 3.8 |
| CCH-34 | 9.00% | $K_1$ [pN, 20° C.]: | 13.7 |
| CCH-35 | 5.00% | $K_3$ [pN, 20° C.]: | 13.6 |
| CCP-3-1 | 14.50% | $\gamma_1$ [mPa · s, 20° C.]: | 119 |
| CCP-3-3 | 11.00% | $V_0$ [20° C., V]: | 2.19 |
| PYP-2-3 | 9.00% | | |
| PYP-2-4 | 8.00% | | |
| Y-4O-O4 | 9.00% | | |

Example P1

For the preparation of a PS-VA mixture, 99.7% of the mixture according to Example M1 is mixed with 0.3% of the polymerizable compound of the formula

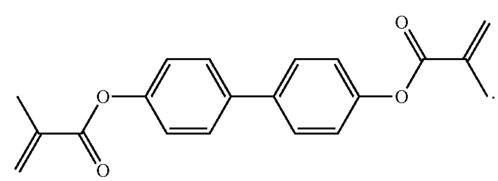

Example P2

For the preparation of a PS-VA mixture, 99.75% of the mixture according to Example M1 is mixed with 0.25% of the polymerizable compound of the formula

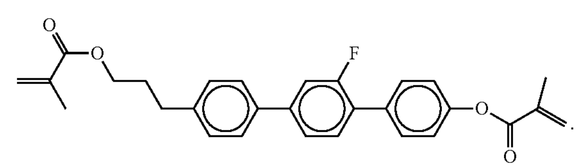

Example P3

For the preparation of a PS-VA mixture, 99.8% of the mixture according to Example M1 is mixed with 0.2% of the polymerizable compound of the formula

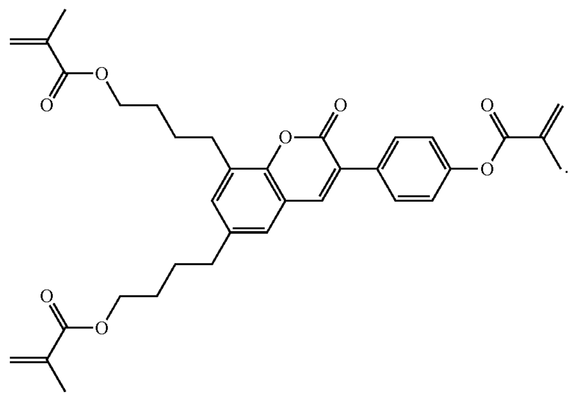 [SMILES: C=C(C)C(=O)OCCCCc1cc(CCCCOC(=O)C(=C)C)c2oc(=O)c(-c3ccc(OC(=O)C(=C)C)cc3)cc2c1]

Example P4

For the preparation of a PS-VA mixture, 99.75% of the mixture according to Example M1 is mixed with 0.25% of the polymerizable compound of the formula

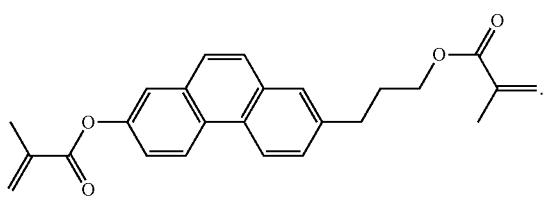 [SMILES: C=C(C)C(=O)OCCCc1ccc2c(ccc3cc(OC(=O)C(=C)C)ccc32)c1]

Example P5

For the preparation of a PS-VA mixture, 99.7% of the mixture according to Example M1 is mixed with 0.3% of the polymerizable compound of the formula

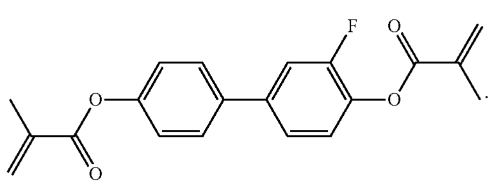

Example P6

For the preparation of a PS-VA mixture, 99.75% of the mixture according to Example M1 is mixed with 0.25% of the polymerizable compound of the formula

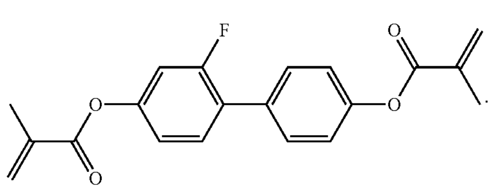 [SMILES: C=C(C)C(=O)Oc1ccc(-c2ccc(OC(=O)C(=C)C)cc2F)cc1]

Example P7

For the preparation of a PS-VA mixture, 99.8% of the mixture according to Example M1 is mixed with 0.2% of the polymerizable compound of the formula

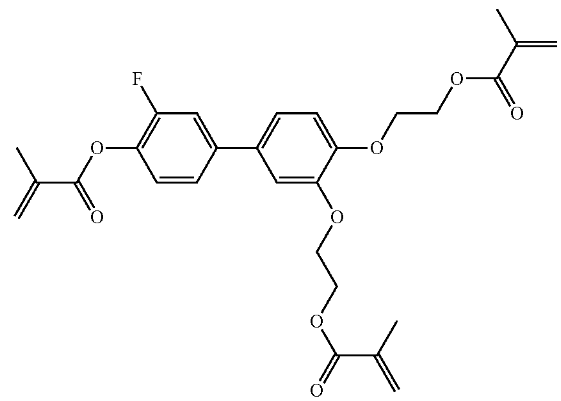

Example P8

For the preparation of a PS-VA mixture, 99.8% of the mixture according to Example M1 is mixed with 0.2% of the polymerizable compound of the formula

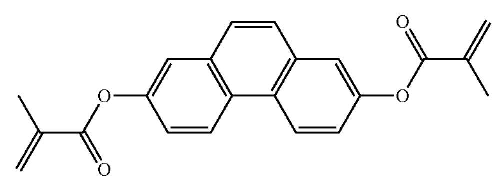

Example P9

For the preparation of a PS-VA mixture, 99.7% of the mixture according to Example M1 is mixed with 0.3% of the polymerizable compound of the formula

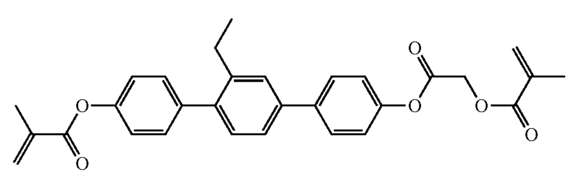

Example M2

| | | | |
|---|---|---|---|
| CY-3-O2 | 12.00% | Clearing point [° C.]: | 73.5 |
| CY-3-O4 | 10.00% | Δn [589 nm, 20° C.]: | 0.1065 |
| CCY-3-O2 | 6.00% | Δε [1 kHz, 20° C.]: | −3.3 |
| CCY-4-O2 | 5.50% | $\varepsilon_{\parallel}$ [1 kHz, 20° C.]: | 3.8 |
| CCH-34 | 8.50% | $K_1$ [pN, 20° C.]: | 13.9 |
| CCH-35 | 5.00% | $K_3$ [pN, 20° C.]: | 13.9 |
| CCP-3-1 | 15.00% | $\gamma_1$ [mPa · s, 20° C.]: | 119 |
| CCP-3-3 | 11.50% | $V_0$ [20° C., V]: | 2.18 |

-continued

| | |
|---|---|
| PYP-2-3 | 5.50% |
| PYP-2-4 | 5.00% |
| PP-1-3 | 2.00% |
| PGIY-2-O4 | 5.00% |
| Y-4O-O4 | 9.00% |

Example P10

For the preparation of a PS-VA mixture, 99.7% of the mixture according to Example M2 is mixed with 0.3% of the polymerizable compound of the formula

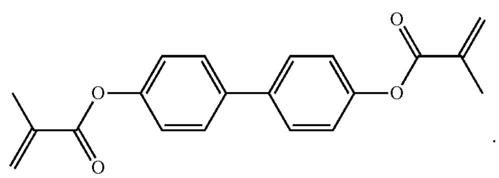 [SMILES: C=C(C)C(=O)Oc1ccc(-c2ccc(OC(=O)C(=C)C)cc2)cc1]

Example P11

For the preparation of a PS-VA mixture, 99.7% of the mixture according to Example M2 is mixed with 0.3% of the polymerizable compound of the formula

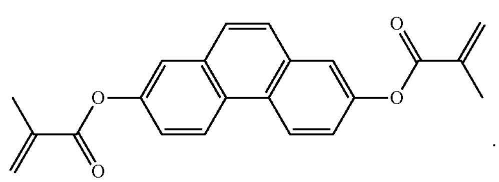 [SMILES: C=C(C)C(=O)Oc1ccc2c(ccc3cc(OC(=O)C(=C)C)ccc32)c1]

Example P12

For the preparation of a PS-VA mixture, 99.7% of the mixture according to Example M2 is mixed with 0.3% of the polymerizable compound of the formula

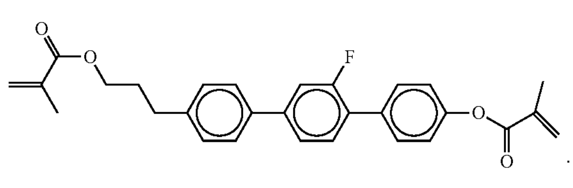

Example P13

For the preparation of a PS-VA mixture, 99.8% of the mixture according to Example M2 is mixed with 0.2% of the polymerizable compound of the formula

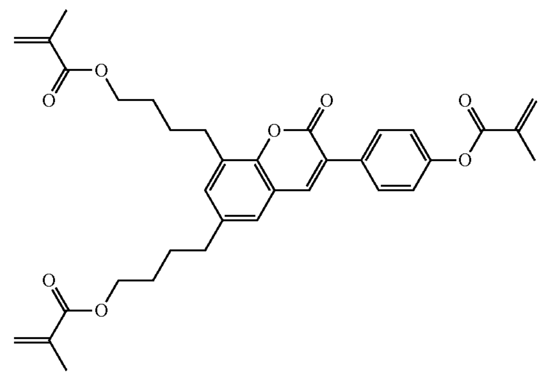

Example P14

For the preparation of a PS-VA mixture, 99.75% of the mixture according to Example M2 is mixed with 0.25% of the polymerizable compound of the formula

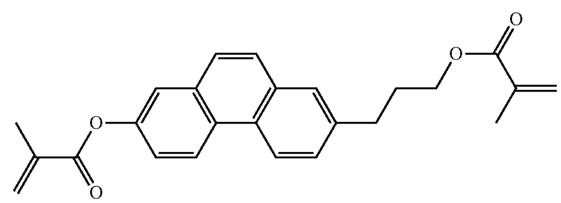

Example P15

For the preparation of a PS-VA mixture, 99.7% of the mixture according to Example M2 is mixed with 0.3% of the polymerizable compound of the formula

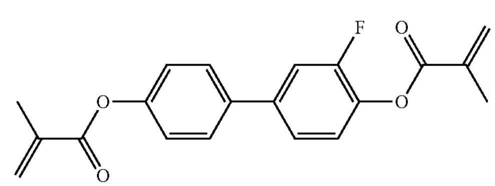

Example P16

For the preparation of a PS-VA mixture, 99.75% of the mixture according to Example M2 is mixed with 0.25% of the polymerizable compound of the formula

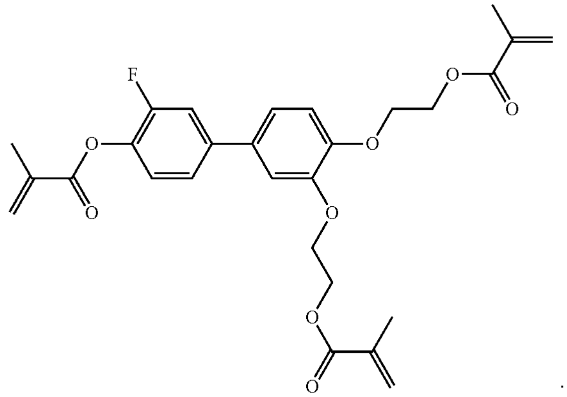 [SMILES: C=C(C)C(=O)OCCOc1ccc(-c2ccc(OC(=O)C(=C)C)c(F)c2)cc1OCCOC(=O)C(=C)C]

Example M3

| | | | |
|---|---|---|---|
| CY-3-O2 | 11.00% | Clearing point [° C.]: | 75.0 |
| CY-3-O4 | 10.00% | Δn [589 nm, 20° C.]: | 0.1077 |
| CCY-3-O2 | 6.00% | Δε [1 kHz, 20° C.]: | −3.3 |
| CCY-4-O2 | 6.00% | $\varepsilon_{\parallel}$ [1 kHz, 20° C.]: | 3.8 |
| CCH-34 | 8.50% | $K_1$ [pN, 20° C.]: | 14.3 |
| CCH-35 | 5.00% | $K_3$ [pN, 20° C.]: | 14.1 |
| CCP-3-1 | 15.00% | $\gamma_1$ [mPa · s, 20° C.]: | 122 |
| CCP-3-3 | 11.50% | $V_0$ [20° C., V]: | 2.20 |
| PYP-2-3 | 6.00% | | |
| PYP-2-4 | 5.00% | | |
| PP-1-2V1 | 2.00% | | |
| PGIY-2-O4 | 5.00% | | |
| Y-4O-O4 | 9.00% | | |

Example P17

For the preparation of a PS-VA mixture, 99.7% of the mixture according to Example M3 is mixed with 0.3% of the polymerizable compound of the formula

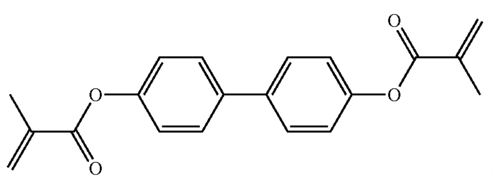

Example P18

For the preparation of a PS-VA mixture, 99.8% of the mixture according to Example M3 is mixed with 0.2% of the polymerizable compound of the formula

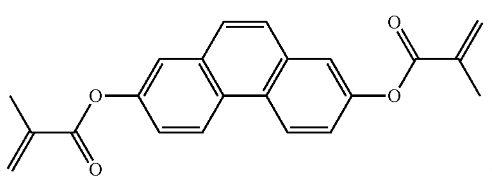

Example P19

For the preparation of a PS-VA mixture, 99.8% of the mixture according to Example M3 is mixed with 0.2% of the polymerizable compound of the formula

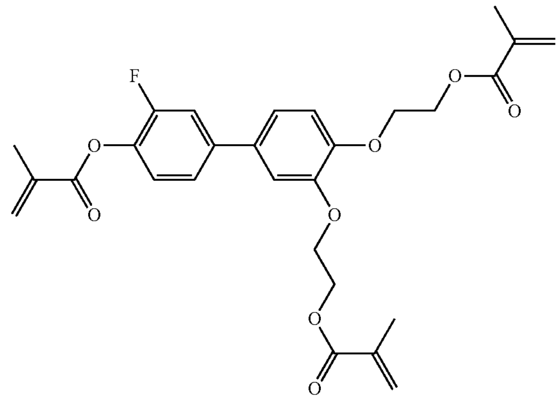

Example P20

For the preparation of a PS-VA mixture, 99.7% of the mixture according to Example M3 is mixed with 0.3% of the polymerizable compound of the formula

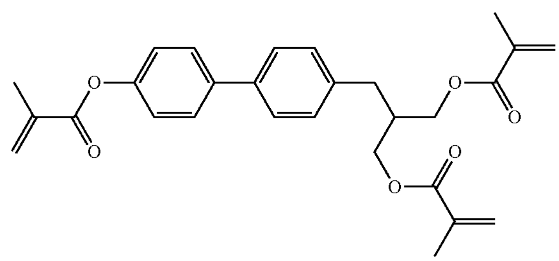

Example P21

For the preparation of a PS-VA mixture, 99.7% of the mixture according to Example M3 is mixed with 0.3% of the polymerizable compound of the formula

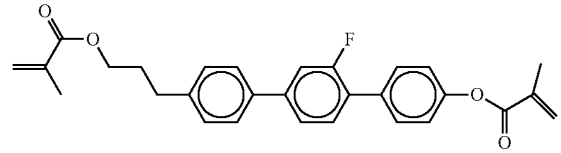

Example M4

| | | | |
|---|---|---|---|
| PY-3-O2 | 10.50% | Clearing point [° C.]: | 75.0 |
| CY-3-O2 | 7.00% | Δn [589 nm, 20° C.]: | 0.1081 |
| CCY-3-O1 | 3.50% | Δε [1 kHz, 20° C.]: | −3.4 |
| CCY-3-O2 | 11.00% | $\varepsilon_{\parallel}$ [1 kHz, 20° C.]: | 3.9 |
| CPY-3-O2 | 7.00% | $K_1$ [pN, 20° C.]: | 16.5 |

-continued

| | | | |
|---|---|---|---|
| CCH-34 | 9.00% | $K_3$ [pN, 20° C.]: | 16.5 |
| CCH-35 | 5.00% | $\gamma_1$ [mPa · s, 20° C.]: | 113 |
| CC-3-V1 | 7.50% | $V_0$ [20° C., V]: | 2.35 |
| CCP-3-1 | 5.00% | | |
| CCP-3-3 | 13.00% | | |
| PP-1-3 | 8.00% | | |
| PGIY-2-O4 | 5.00% | | |
| Y-4O-O4 | 8.50% | | |

Example M5

| | | | |
|---|---|---|---|
| CC-3-V1 | 9.00% | Clearing point [° C.]: | 74.5 |
| CCH-34 | 10.00% | Δn [589 nm, 20° C.]: | 0.0983 |
| CCH-35 | 5.00% | Δε [1 kHz, 20° C.]: | −3.6 |
| CCP-3-1 | 15.50% | $\varepsilon_{\parallel}$ [1 kHz, 20° C.]: | 3.8 |
| CCP-3-3 | 5.00% | $K_1$ [pN, 20° C.]: | 14.9 |
| CCY-3-O2 | 8.00% | $K_3$ [pN, 20° C.]: | 16.7 |
| CCY-3-O1 | 3.50% | $\gamma_1$ [mPa · s, 20° C.]: | 112 |
| CPY-3-O2 | 10.00% | $V_0$ [20° C., V]: | 2.28 |
| CY-3-O2 | 15.50% | | |
| PY-3-O2 | 11.50% | | |
| Y-4O-O4 | 7.00% | | |

Example P22

For the preparation of a PS-VA mixture, 99.7% of the mixture according to Example M5 is mixed with 0.3% of the polymerizable compound of the formula

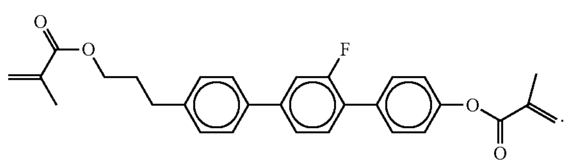

Example P23

For the preparation of a PS-VA mixture, 99.7% of the mixture according to Example M5 is mixed with 0.3% of the polymerizable compound of the formula

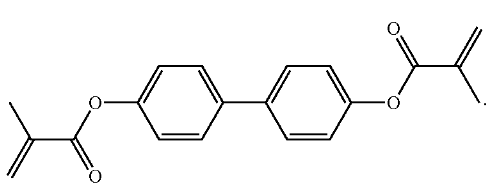

Example P24

For the preparation of a PS-VA mixture, 99.75% of the mixture according to Example M5 is mixed with 0.25% of the polymerizable compound of the formula

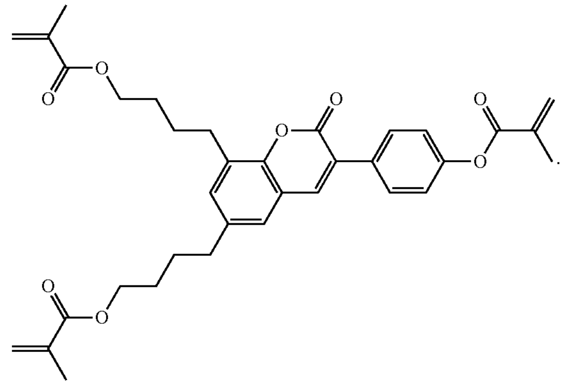 [SMILES: C=C(C)C(=O)OCCCCc1cc(CCCCOC(=O)C(=C)C)c2oc(=O)c(-c3ccc(OC(=O)C(=C)C)cc3)cc2c1]

Example P25

For the preparation of a PS-VA mixture, 99.75% of the mixture according to Example M5 is mixed with 0.25% of the polymerizable compound of the formula

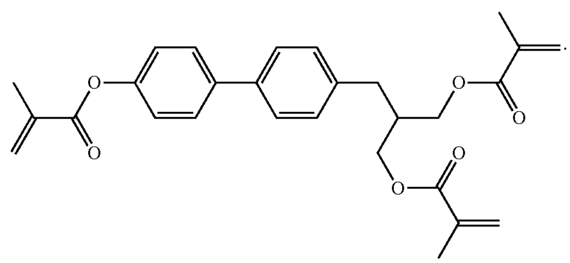 [SMILES: C=C(C)C(=O)OCC(COC(=O)C(=C)C)Cc1ccc(-c2ccc(OC(=O)C(=C)C)cc2)cc1]

Example P26

For the preparation of a PS-VA mixture, 99.7% of the mixture according to Example M5 is mixed with 0.3% of the polymerizable compound of the formula

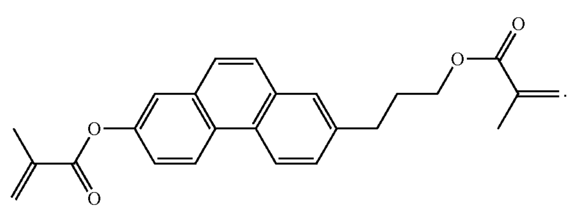 [SMILES: C=C(C)C(=O)OCCCc1ccc2c(ccc3cc(OC(=O)C(=C)C)ccc32)c1]

Example P27

For the preparation of a PS-VA mixture, 99.75% of the mixture according to Example M5 is mixed with 0.25% of the polymerizable compound of the formula

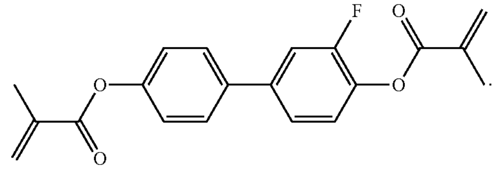 [SMILES: C=C(C)C(=O)Oc1ccc(-c2ccc(OC(=O)C(=C)C)c(F)c2)cc1]

Example M6

| | | | |
|---|---|---|---|
| BCH-32 | 2.50% | Clearing point [° C.]: | 75.0 |
| CC-3-V1 | 9.00% | Δn [589 nm, 20° C.]: | 0.0978 |
| CCH-3O1 | 6.00% | Δε [1 kHz, 20° C.]: | −3.5 |
| CCH-34 | 10.00% | $\varepsilon_{\parallel}$ [1 kHz, 20° C.]: | 3.8 |
| CCH-35 | 5.00% | $K_1$ [pN, 20° C.]: | 14.6 |
| CCP-3-1 | 13.50% | $K_3$ [pN, 20° C.]: | 16.1 |
| CCY-3-O1 | 3.50% | $\gamma_1$ [mPa · s, 20° C.]: | 107 |
| CCY-3-O2 | 11.00% | $V_0$ [20° C., V]: | 2.28 |
| CPY-3-O2 | 11.00% | | |
| CY-3-O2 | 10.00% | | |
| PY-3-O2 | 11.50% | | |
| Y-4O-O4 | 7.00% | | |

Example M7

| | | | |
|---|---|---|---|
| PY-3-O2 | 2.00% | Clearing point [° C.]: | 76.0 |
| CY-3-O2 | 4.50% | Δn [589 nm, 20° C.]: | 0.1061 |
| CCY-3-O1 | 4.50% | Δε [1 kHz, 20° C.]: | −3.4 |
| CCY-3-O2 | 11.00% | $\varepsilon_{\parallel}$ [1 kHz, 20° C.]: | 3.8 |
| CPY-3-O2 | 4.50% | $K_1$ [pN, 20° C.]: | 16.5 |
| CCH-34 | 10.00% | $K_3$ [pN, 20° C.]: | 16.5 |
| CCH-35 | 5.00% | $\gamma_1$ [mPa · s, 20° C.]: | 108 |
| CC-3-V1 | 7.50% | $V_0$ [20° C., V]: | 2.34 |
| PP-1-2V1 | 7.50% | | |
| CCP-3-1 | 14.00% | | |
| CCP-3-3 | 8.50% | | |
| PGIY-2-O4 | 5.00% | | |
| Y-4O-O4 | 12.00% | | |
| B-2O-O5 | 4.00% | | |

Example P28

For the preparation of a PS-VA mixture, 99.7% of the mixture according to Example M7 is mixed with 0.3% of the polymerizable compound of the formula

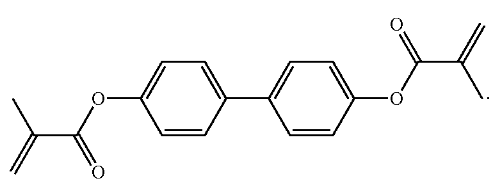

Example P29

For the preparation of a PS-VA mixture, 99.7% of the mixture according to Example M7 is mixed with 0.3% of the polymerizable compound of the formula

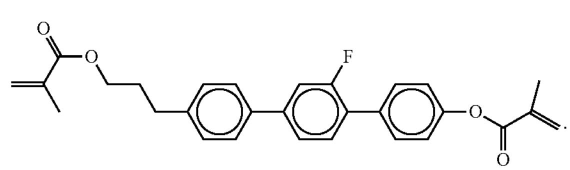

Example P30

For the preparation of a PS-VA mixture, 99.75% of the mixture according to Example M7 is mixed with 0.25% of the polymerizable compound of the formula

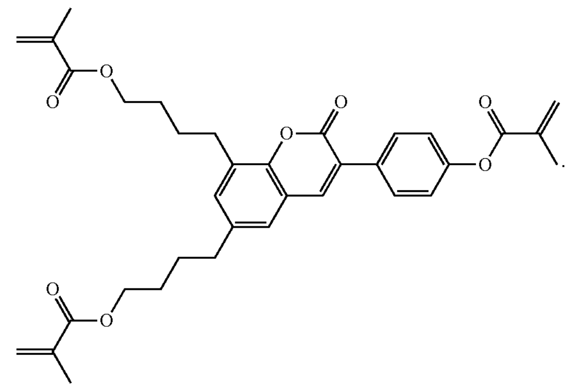 [SMILES: C=C(C)C(=O)OCCCCc1cc(CCCCOC(=O)C(=C)C)c2oc(=O)c(-c3ccc(OC(=O)C(=C)C)cc3)cc2c1]

Example P31

For the preparation of a PS-VA mixture, 99.8% of the mixture according to Example M7 is mixed with 0.2% of the polymerizable compound of the formula

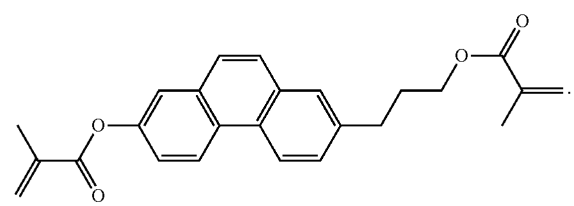 [SMILES: C=C(C)C(=O)OCCCc1ccc2c(ccc3cc(OC(=O)C(=C)C)ccc32)c1]

Example P32

For the preparation of a PS-VA mixture, 99.75% of the mixture according to Example M7 is mixed with 0.25% of the polymerizable compound of the formula

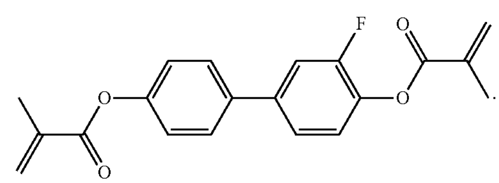 [SMILES: C=C(C)C(=O)Oc1ccc(-c2ccc(OC(=O)C(=C)C)c(F)c2)cc1]

Example P33

For the preparation of a PS-VA mixture, 99.75% of the mixture according to Example M7 is mixed with 0.25% of the polymerizable compound of the formula

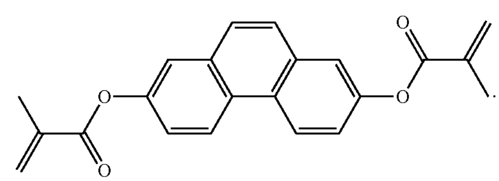 [SMILES: C=C(C)C(=O)Oc1ccc2c(ccc3cc(OC(=O)C(=C)C)ccc32)c1]

Example P34

For the preparation of a PS-VA mixture, 99.75% of the mixture according to Example M7 is mixed with 0.25% of the polymerizable compound of the formula

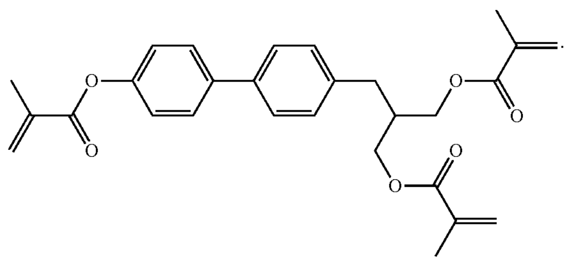 [SMILES: C=C(C)C(=O)OCC(COC(=O)C(=C)C)Cc1ccc(-c2ccc(OC(=O)C(=C)C)cc2)cc1]

Example M8

| | | | |
|---|---|---|---|
| CY-3-O2 | 11.00% | Clearing point [° C.]: | 74.0 |
| CY-3-O4 | 4.00% | Δn [589 nm, 20° C.]: | 0.1084 |
| CCY-3-O2 | 6.00% | Δε [1 kHz, 20° C.]: | −3.3 |
| CCY-4-O2 | 6.00% | $\varepsilon_{\parallel}$ [1 kHz, 20° C.]: | 3.9 |
| CCH-34 | 10.00% | $K_1$ [pN, 20° C.]: | 14.8 |
| CCH-35 | 5.00% | $K_3$ [pN, 20° C.]: | 14.4 |
| CCP-3-1 | 16.00% | $\gamma_1$ [mPa · s, 20° C.]: | 115 |
| CCP-3-3 | 12.00% | $V_0$ [20° C., V]: | 2.20 |
| PYP-2-3 | 7.00% | | |
| PP-1-3 | 5.00% | | |
| PGIY-2-O4 | 5.00% | | |
| Y-4O-O4 | 9.00% | | |
| B-2O-O5 | 4.00% | | |

Example M9

| | | | |
|---|---|---|---|
| CC-3-V1 | 4.00% | Clearing point [° C.]: | 74.0 |
| CY-3-O2 | 11.00% | Δn [589 nm, 20° C.]: | 0.1102 |
| CCY-3-O2 | 10.00% | Δε [1 kHz, 20° C.]: | −2.9 |
| CCH-34 | 10.00% | $\varepsilon_{\parallel}$ [1 kHz, 20° C.]: | 3.7 |
| CCH-35 | 4.00% | $K_1$ [pN, 20° C.]: | 15.3 |
| CCP-3-1 | 16.00% | $K_3$ [pN, 20° C.]: | 15.1 |
| CCP-3-3 | 13.00% | $\gamma_1$ [mPa · s, 20° C.]: | 105 |
| PYP-2-3 | 7.00% | $V_0$ [20° C., V]: | 2.42 |
| PP-1-3 | 5.00% | | |
| PP-1-4 | 2.00% | | |
| PGIY-2-O4 | 5.00% | | |
| Y-4O-O4 | 9.00% | | |
| B-2O-O5 | 4.00% | | |

Example P35

For the preparation of a PS-VA mixture, 99.75% of the mixture according to Example M9 is mixed with 0.25% of the polymerizable compound of the formula

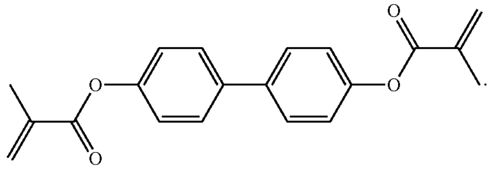

Example P36

For the preparation of a PS-VA mixture, 99.7% of the mixture according to Example M9 is mixed with 0.3% of the polymerizable compound of the formula

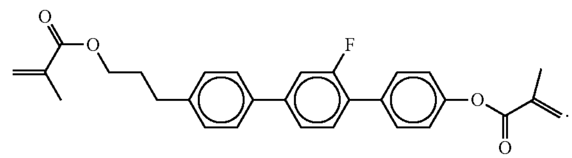

Example P37

For the preparation of a PS-VA mixture, 99.75% of the mixture according to Example M9 is mixed with 0.25% of the polymerizable compound of the formula

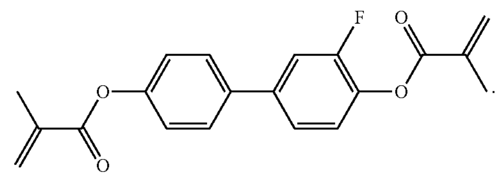 [SMILES: C=C(C)C(=O)Oc1ccc(-c2ccc(OC(=O)C(=C)C)c(F)c2)cc1]

Example P38

For the preparation of a PS-VA mixture, 99.75% of the mixture according to Example M9 is mixed with 0.25% of the polymerizable compound of the formula

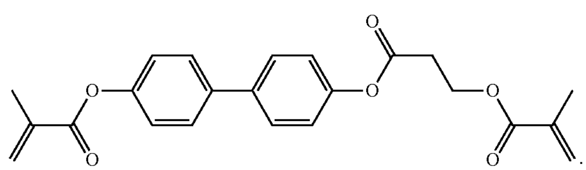 [SMILES: C=C(C)C(=O)OCCC(=O)Oc1ccc(-c2ccc(OC(=O)C(=C)C)cc2)cc1]

Example P39

For the preparation of a PS-VA mixture, 99.7% of the mixture according to Example M9 is mixed with 0.299% of the polymerizable compound of the formula

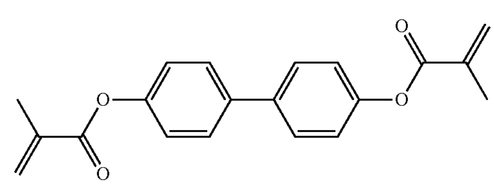 [SMILES: C=C(C)C(=O)Oc1ccc(-c2ccc(OC(=O)C(=C)C)cc2)cc1]

and 0.001% of Irganox-1076 (BASF).

Example P40

For the preparation of a PS-VA mixture, 99.7% of the mixture according to Example M9 is mixed with 0.299% of the polymerizable compound of the formula

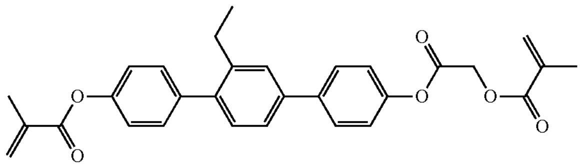 [SMILES: C=C(C)C(=O)OCC(=O)Oc1ccc(-c2ccc(-c3ccc(OC(=O)C(=C)C)cc3)c(CC)c2)cc1]

and 0.001% of Irganox-1076 (BASF).

The mixtures according to Examples P39 and P40 are preferably suitable for PS-VA applications, in particular 2D and 3D TV applications.

The above-mentioned mixture examples for PS-VA applications are of course also suitable for PS-IPS and PS-FFS applications.

In order to improve the reliability, the mixtures according to Examples M1 to M9 and P1 to P40 may additionally be stabilized with one or two stabilizers selected from the group of compounds a) to h) mentioned below, where the stabilizer is in each case added in amounts of 0.01-0.04%, based on the mixture.

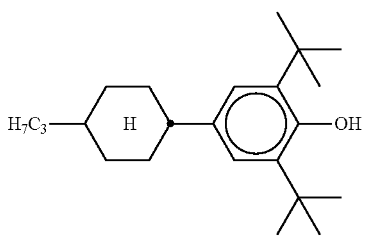

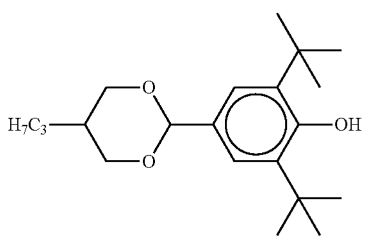

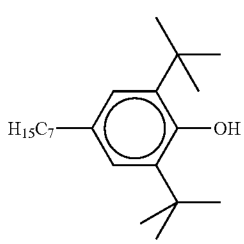

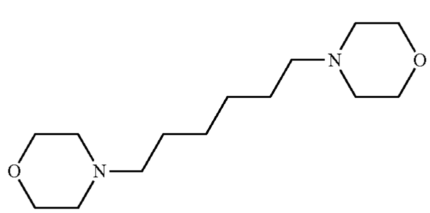

-continued

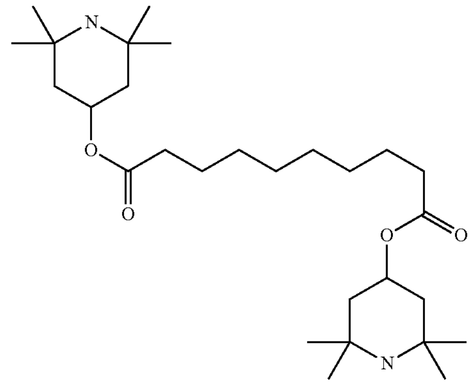

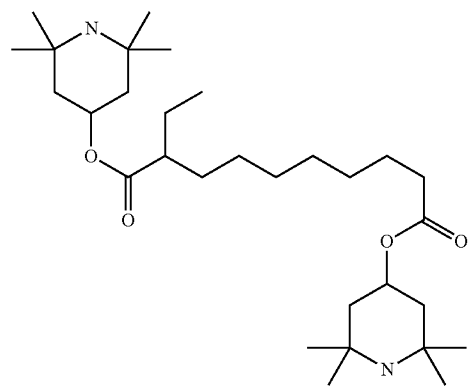

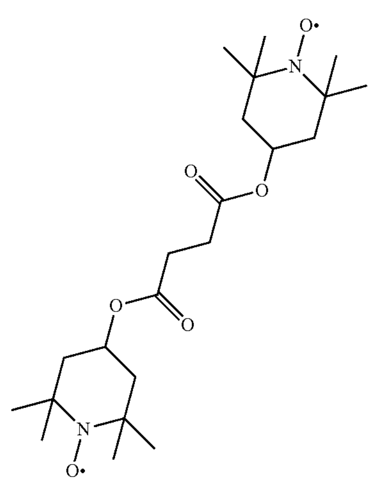

-continued

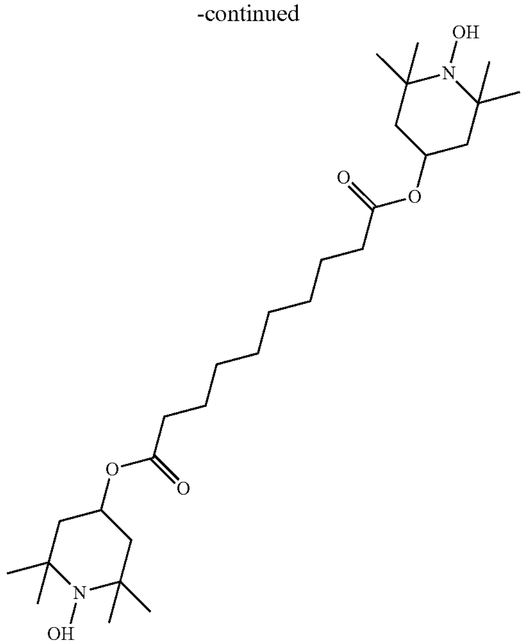

Example M10

For the preparation of a stabilized VA mixture, 99.999% of the mixture according to Example M1 is mixed with 0.001% of the compound of the formula

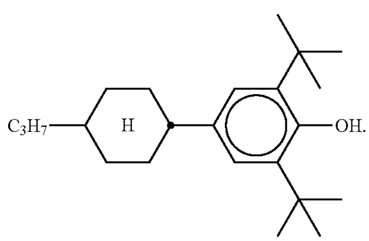

Example M11

For the preparation of a stabilized VA mixture, 99.99% of the mixture according to Example M1 is mixed with 0.01% of the compound of the formula

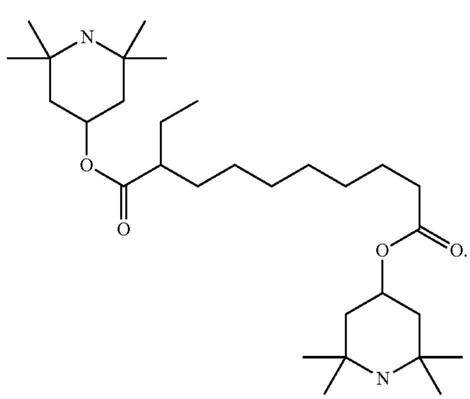

Example M12

For the preparation of a stabilized VA mixture, 99.999% of the mixture according to Example M7 is mixed with 0.001% of the compound of the formula

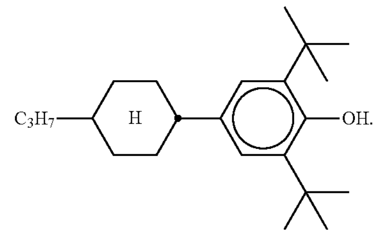

The entire disclosures of all applications, patents and publications, cited herein and of corresponding European Application No. DE 102016004834.4, filed Apr. 11, 2016 are incorporated by reference herein.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-crystalline medium comprising:

one or more compounds of formula I1, one or more compounds of formula I2, and one or more compounds of formula EY

I1

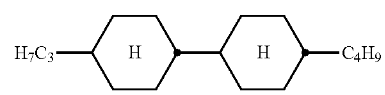

I2

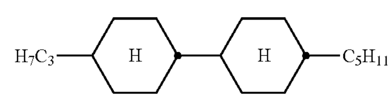

EY

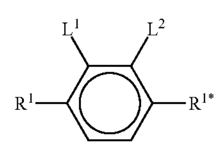

in which the individual radicals each, independently of one another, and identically or differently on each occurrence, have one of the following meanings:

$R^1$ and $R^{1*}$ denote H, an alkyl having 1 to 15 C atoms or alkenyl radical having 2 to 15 C atoms which is unsubstituted, monosubstituted by CN or $CF_3$ or at least monosubstituted by halogen, where, in addition, one or more $CH_2$ groups in these radicals may each be replaced by —O—, —S—,

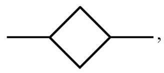,
—C≡C—, —$CF_2$O—, —O$CF_2$—, —OC—O— or —O—CO— in such a way that O atoms are not linked directly to one another, or a cycloalkyl ring having 3 to 6 C atoms,
$L^1$ and $L^2$ denote F, Cl, $CF_3$ or $CHF_2$;
one or more compounds selected from formulae T-1 to T-21,
T-1
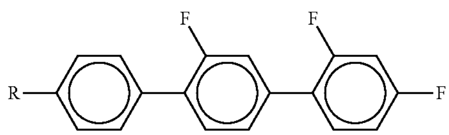
T-2
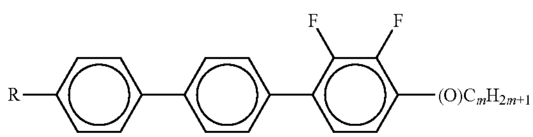
T-3
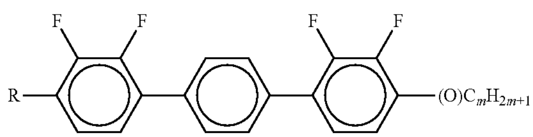
T-4
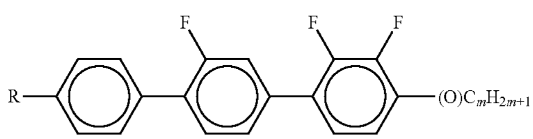
T-5
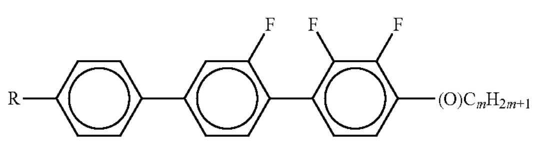
T-6
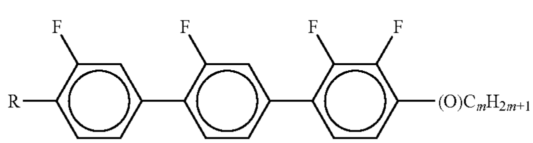
T-7
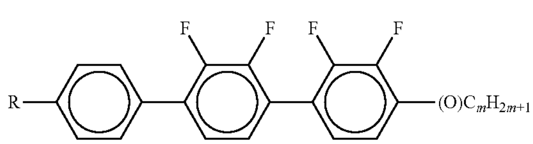
T-8
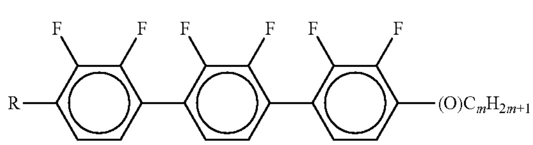
-continued
T-9
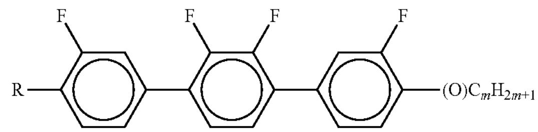
T-10
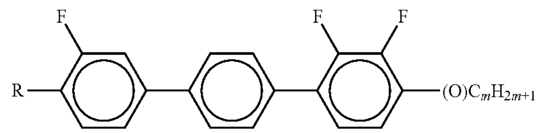
T-11
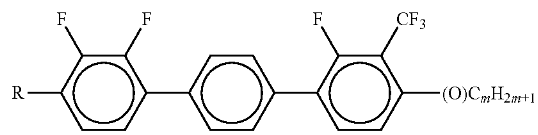
T-12
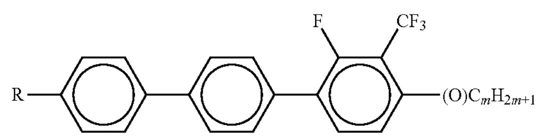
T-13
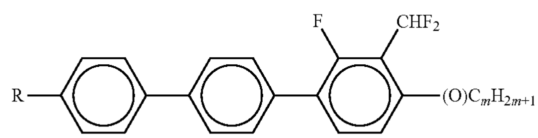
T-14
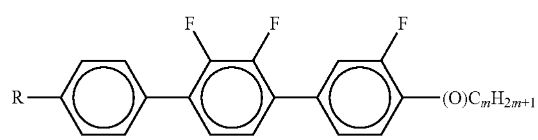
T-15
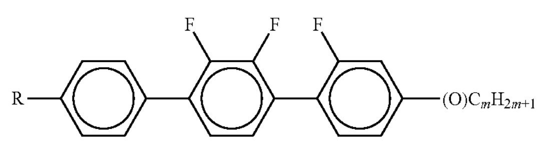
T-16
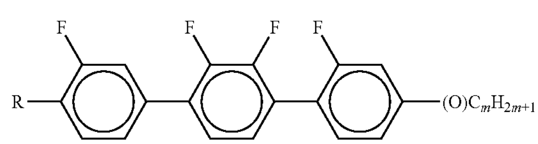
T-17
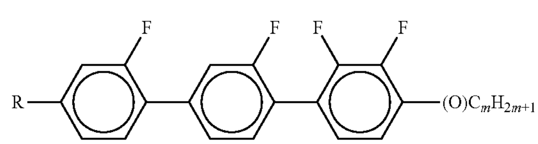
T-18
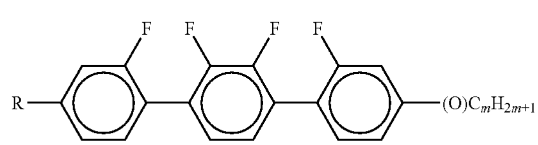

-continued

T-19

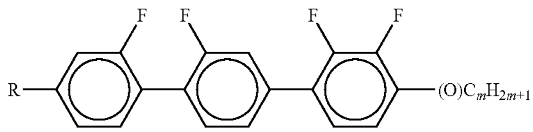

T-20

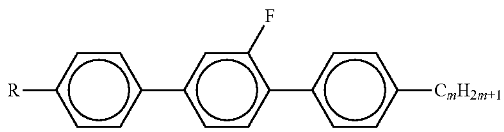

T-21

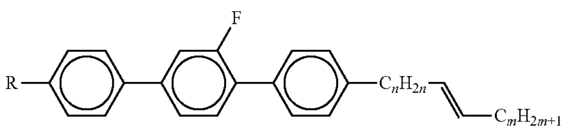

in which

R denotes a straight-chain alkyl or alkoxy radical having 1-7 C atoms or a straight-chain alkenyl radical having 2-7 C atoms, m denotes 0, 1, 2, 3, 4, 5 or 6, n denotes 0, 1, 2, 3 or 4, and (O) denotes an oxygen atom or a single bond, and one or more compounds selected from formula BS-2,

BS-2

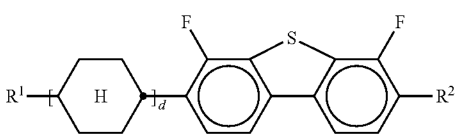

in which $R^1$ and $R^2$ each, independently of one another, denote H, an alkyl having 1 to 15 C atoms or alkenyl radical having 2 to 15 C atoms which is unsubstituted, monosubstituted by CN or $CF_3$ or at least monosubstituted by halogen, where, in addition, one or more $CH_2$ groups in these radicals may each be replaced by —O—, —S—,

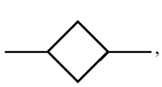

—C≡C—, $CF_2O$, —$OCF_2$, —OC—O— or —O—CO— in such a way that O atoms are not linked directly to one another, and d denotes 1 or 2, with the proviso that the liquid-crystalline medium does not comprise a compound of the formula I3,

I3

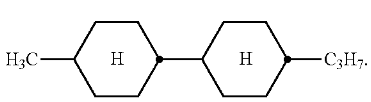

2. A liquid-crystalline medium according to claim 1, wherein said one or more compounds of formula EY are selected from the group of compounds of the following formulae:

EY-1

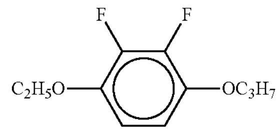

EY-2

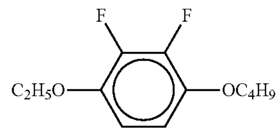

EY-3

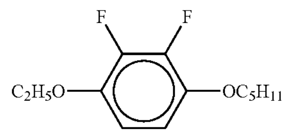

EY-4

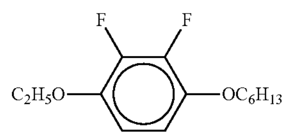

EY-5

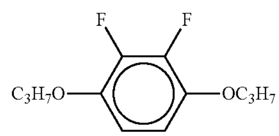

EY-6

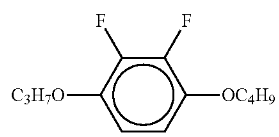

EY-7

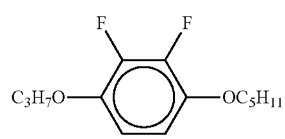

EY-8

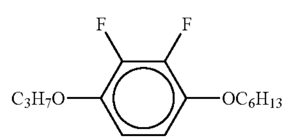

EY-9

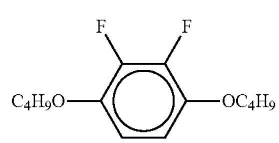

EY-10

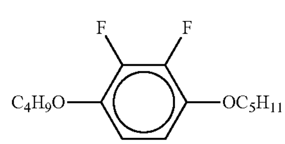

-continued

EY-11

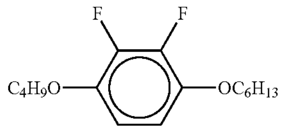

EY-12

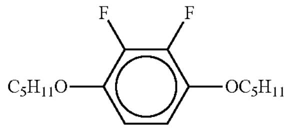

EY-13

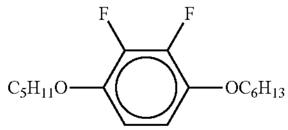

EY-14

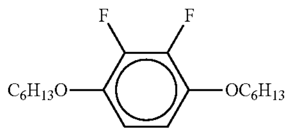

EY-15

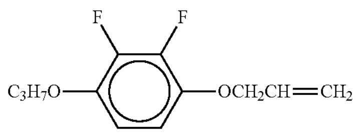

EY-16

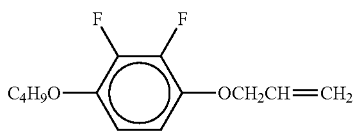

EY-17

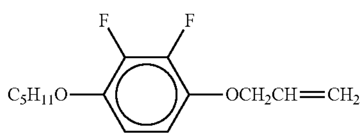

EY-18

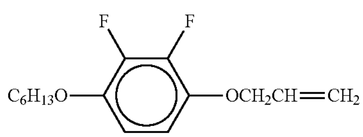

EY-19

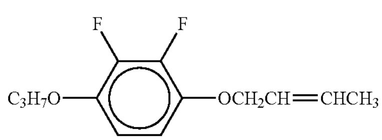

EY-20

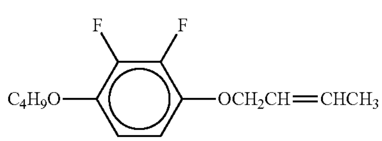

EY-21

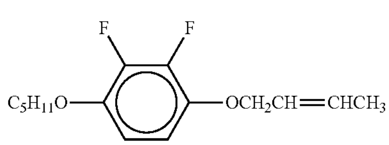

-continued

EY-22

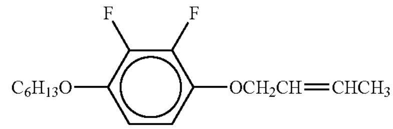

EY-23

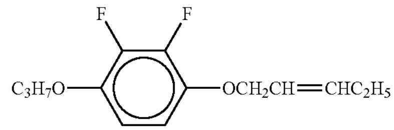

EY-24

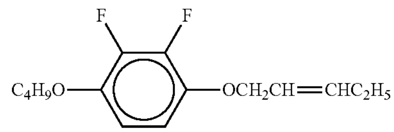

EY-25

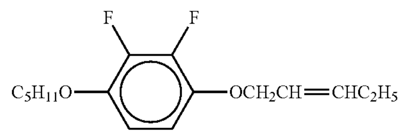

EY-26

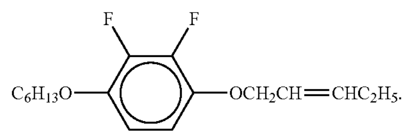

3. A liquid-crystalline medium according to claim 1, further comprising one or more compounds selected from the group of compounds of formulae IIA, IIB and IIC,

IIA

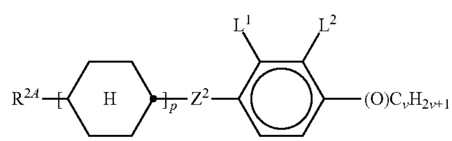

IIB

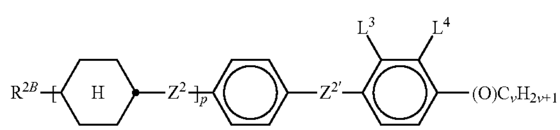

IIC

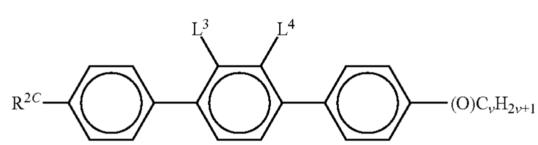

in which $R^{2A}$, $R^{2B}$ and $R^2$ each, independently of one another, denote H, an alkyl having 1 to 15 C atoms or alkenyl radical having 2 to 15 C atoms which is unsubstituted, monosubstituted by CN or $CF_3$ or at least monosubstituted by halogen, where, in addition, one or more $CH_2$ groups in these radicals may each be replaced by —O—, —S—,

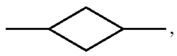

—C≡C—, $—CF_2O—$, $—OCF_2—$, —OC—O— or —O—CO— in such a way that O atoms are not linked directly to one another, $L^{1-4}$ each, independently of one another, denote F or Cl, $Z^2$ and $Z^{2'}$ each, independently of one another, denote a single bond, $—CH_2CH_2—$, —CH═CH—, $—CF_2O—$, $—OCF_2—$, $—CH_2O—$, $—OCH_2—$, —COO—, —OCO—, $—C_2F_4—$, —CF═CF—, or $—CH{=}CHCH_2O—$, p denotes 1 or 2, q denotes 0 or 1, and v denotes an integer from 1 to 6.

4. A liquid-crystalline medium according to claim 1, wherein said medium additionally comprises one or more compounds of formula III,

III

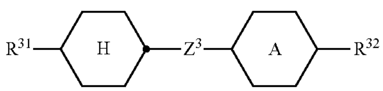

in which $R^{31}$ and $R^{32}$ each, independently of one another, denote a straight-chain alkyl having 1 to 12C atoms, alkoxyalkyl having 2 to 15 C atoms, or alkoxy radical having 1 to 12 C atoms,

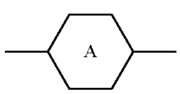

denotes

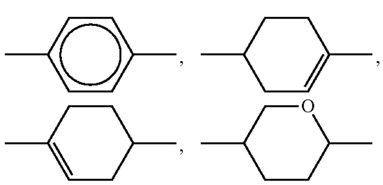

and $Z^3$ denotes a single bond, $—CH_2CH_2—$, —CH═CH—, $—CF_2O—$, $—OCF_2—$, $—CH_2O—$, $—OCH_2—$, —COO—, —OCO—, $—C_2F_4—$, $—C_4H_9—$, or —CF═CF—.

5. A liquid-crystalline medium according to claim 1, wherein said medium additionally comprises one or more compounds of formulae O-1 to O-17,

O-1

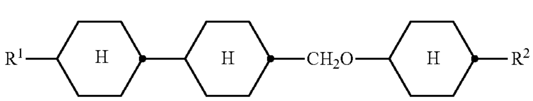

-continued

O-2

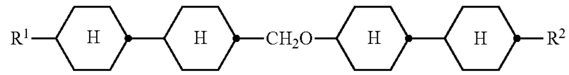

O-3

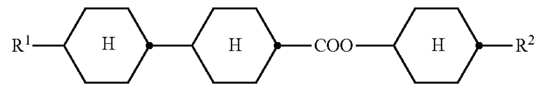

O-4

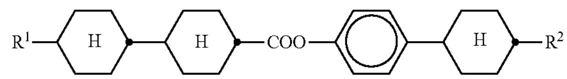

O-5

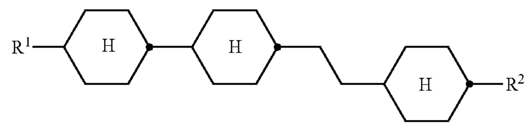

O-6

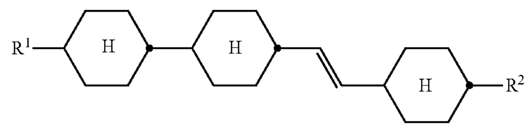

O-7

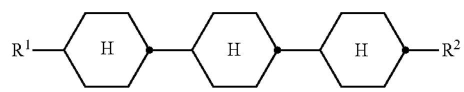

O-8

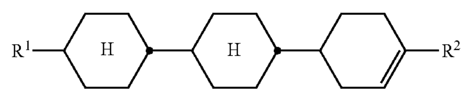

O-9

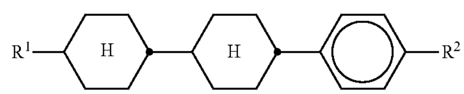

O-10

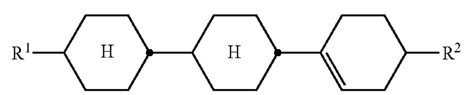

O-11

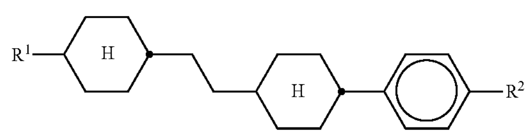

O-12

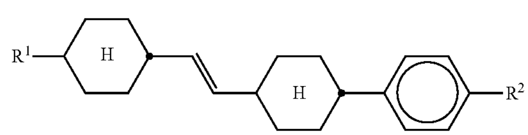

O-13

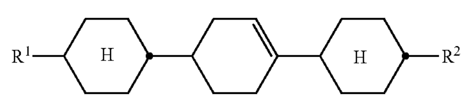

O-14

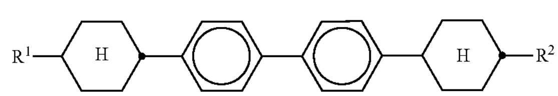

-continued

O-15

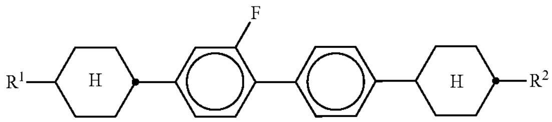

O-16

O-17

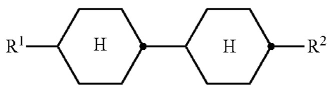

in which $R^1$ and $R^2$ each, independently of one another, denote H, an alkyl having 1 to 15 C atoms, or alkenyl radical having 2 to 15 C atoms which is unsubstituted, monosubstituted by CN or $CF_3$ or at least monosubstituted by halogen, where, in addition, one or more $CH_2$ groups in these radicals may each be replaced by —O—, —S—,

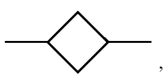

,

—C≡C—, —$CF_2$O—, —O$CF_2$—, —OC—O— or —O—CO— in such a way that O atoms are not linked directly to one another, and the compounds of the formula O-17 are not identical with the compounds of the formulae I1 and I2.

6. A liquid-crystalline medium according to claim 1, wherein said medium additionally comprises one or more indane compounds of formula In,

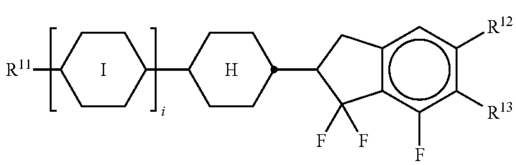

in which

R11, R12, R13 denote a straight-chain alkyl having 1 to 6 C atoms, alkoxy having 1 to 6 C atoms, alkoxyalkyl having 2 to 6 C atoms, or alkenyl radical having 2-6 C atoms, R12 and R13 additionally also denote halogen,

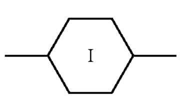

denotes

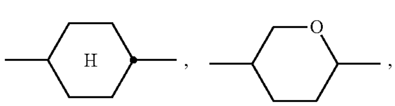

-continued

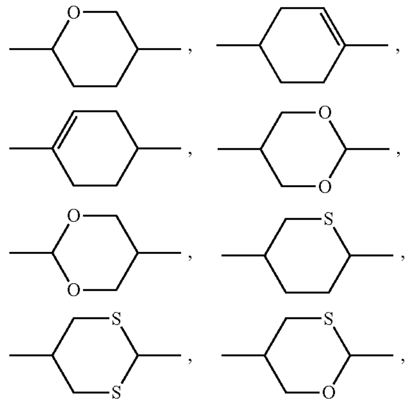

i denotes 0, 1 or 2.

7. A liquid-crystalline medium according to claim 1, wherein said medium additionally comprises one or more biphenyls selected from formulae B-1a, B-2a, B-2b, and B-2c:

B-1a

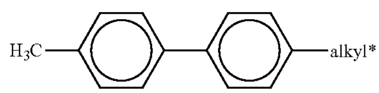

B-2a

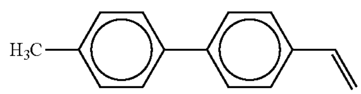

B-2b

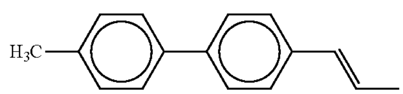

B-2c

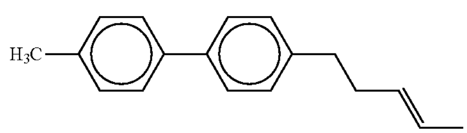

in which alkyl* denotes an alkyl radical having 1-6 C atoms.

8. A liquid-crystalline medium according to claim 1, wherein said medium additionally comprises one or more compounds selected from the group of the following compounds:

O-17e

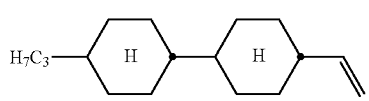

O-17f

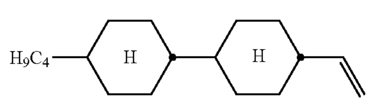

O-17g

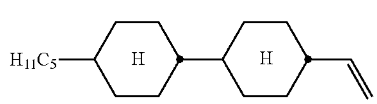

-continued

O-17h

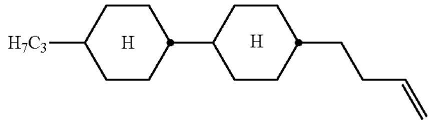

O-17i

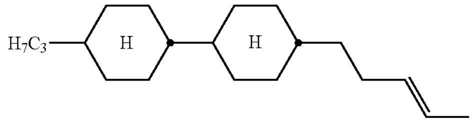

O-17j

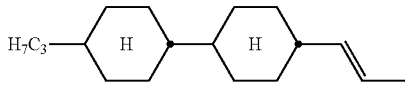

BA-1

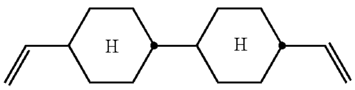

BA-2

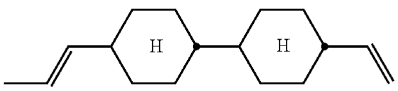

BA-3

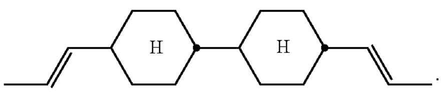

9. A liquid-crystalline medium according to claim 1, wherein said medium additionally comprises one or more compounds selected from the group of the following compounds:

O-9a

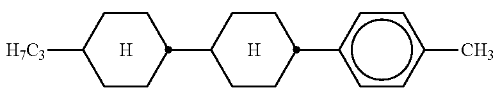

O-9b

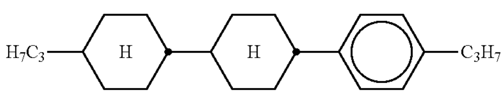

O-17a

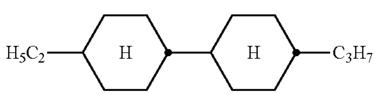

O-17b

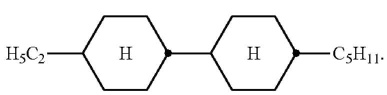

10. A liquid-crystalline medium according to claim 1, wherein the proportion of compounds of the formulae I1 and I2 in the mixture as a whole is 5-30% by weight.

11. A liquid-crystalline medium according to claim 1, wherein the proportion of compounds of the formulae I1 and I2 in the mixture is ≥3% by weight.

12. A liquid-crystalline medium according to claim 1, wherein the proportion of compounds of the formula EY in the mixture as a whole is 3-20% by weight.

13. A liquid-crystalline medium according to claim 1, wherein the proportion of compounds of the formula EY in the mixture is ≥2% by weight.

14. A liquid-crystalline medium according to claim 1, wherein the proportion of compounds of the formulae I1, I2 and EY in the mixture as a whole is 10-35% by weight.

15. A liquid-crystalline medium according to claim 1, wherein said medium further comprises at least one polymerizable compound.

16. A liquid-crystalline medium according to claim 1, wherein said medium further comprises one or more additives selected from the group consisting of free-radical scavengers, and antioxidants.

17. A process for the preparation of a liquid-crystalline medium according to claim 1, said process comprising:

mixing a compound of formula I1 and a compound of formula I2 with at least one compound of the formula EY and with at least one further liquid-crystalline compound, and optionally adding one or more additives and optionally at least one polymerizable compound.

18. An electro-optical display having active-matrix addressing, wherein said display contains, as dielectric, a liquid-crystalline medium according to claim 1.

19. An electro-optical display according to claim 18, wherein said display is a VA, PSA, PS-VA, PM-VA, SS-VA, PALC, IPS, PS-IPS, FFS or PS-FFS display.

20. A liquid-crystalline medium according to claim 1, wherein said medium further comprises at least one reactive mesogen.

21. A process for the preparation of a liquid-crystalline medium according to claim 1, said process comprising:

mixing a compound of formula I1 and a compound of formula I2 with at least one compound of the formula EY and with at least one further liquid-crystalline compound, and optionally adding one or more additives and optionally at least one reactive mesogen.

22. A liquid-crystalline medium according to claim 1, wherein said medium contains said one of more compounds of formula CY-n-Om

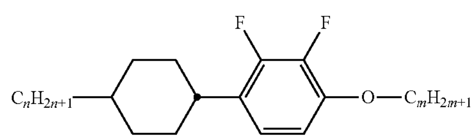

CY-n-Om wherein n and m, ae each, independently of one another, 1, 2, 3, 4, 5 or 6, in an amount of 15-50%, based on the medium as a whole.

23. A liquid-crystalline medium according to claim 1, wherein maid medium contains one or more stabilizers selected from the following compounds:

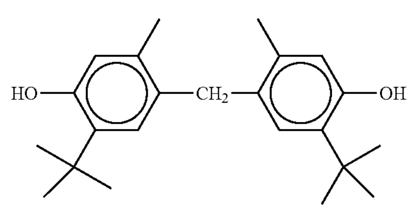

-continued
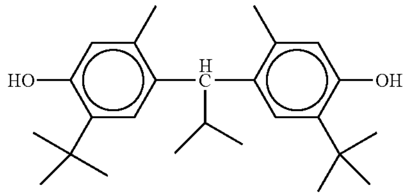
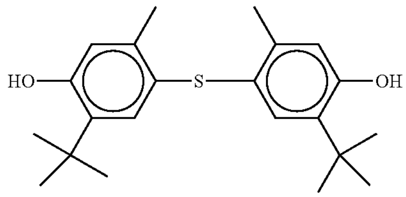
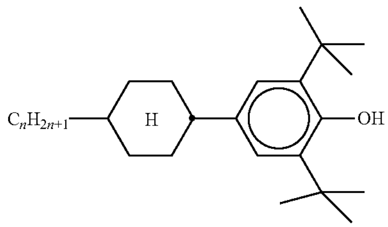
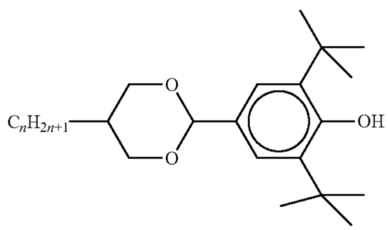
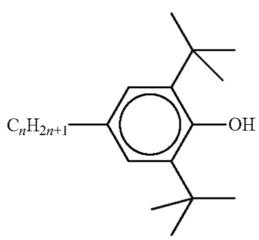
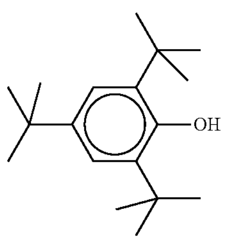
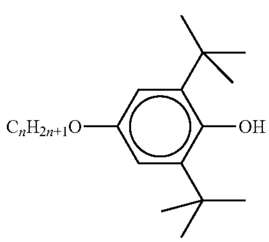
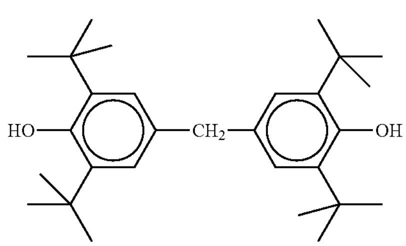
-continued
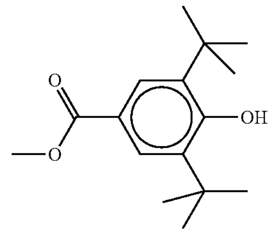
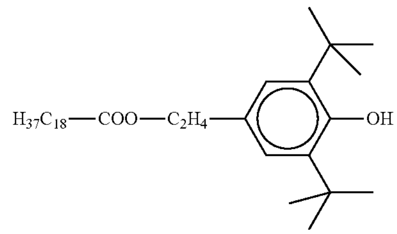
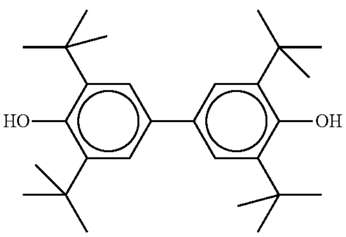
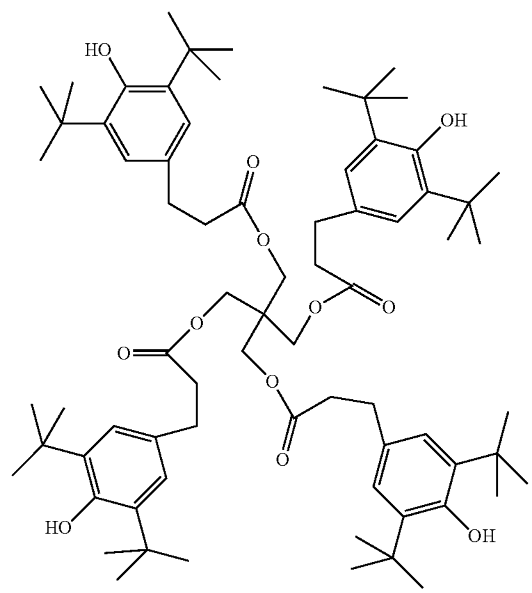
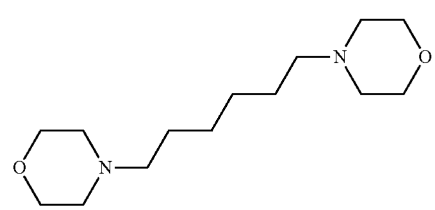
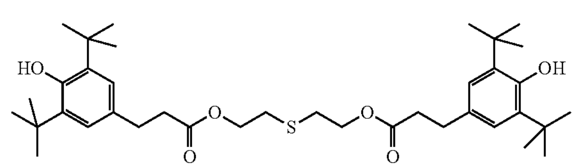

-continued
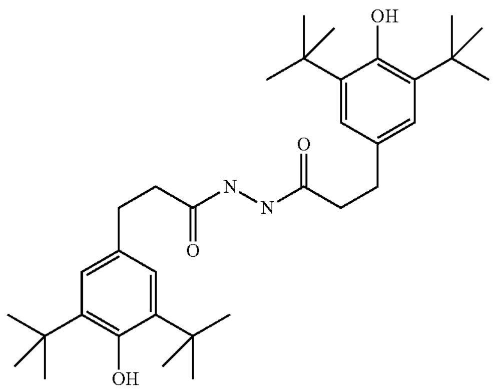
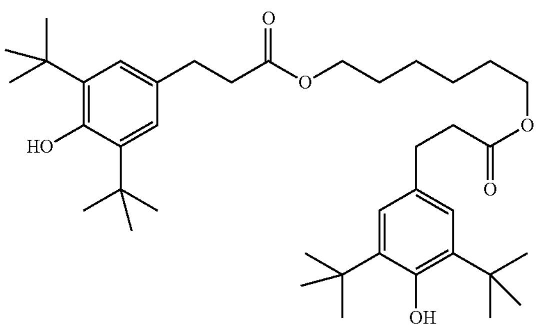
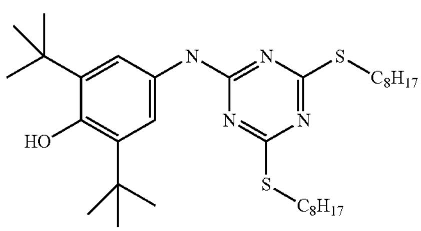
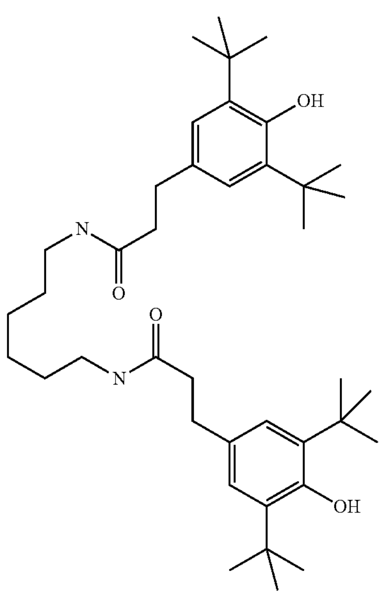
-continued
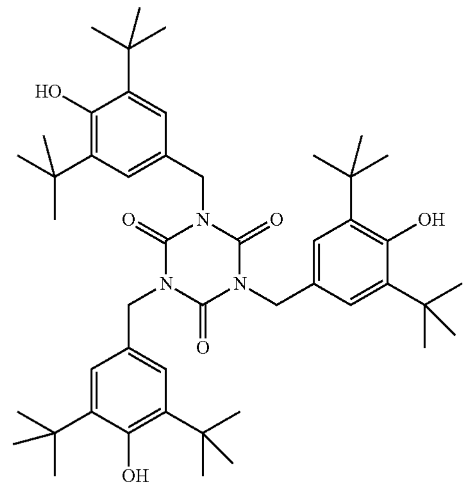
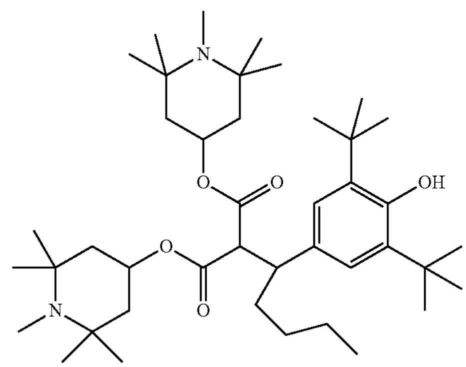
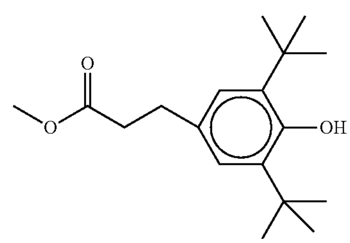
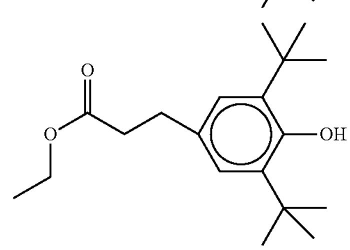
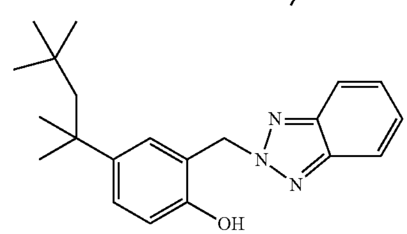
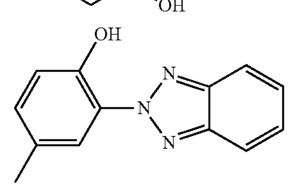

-continued
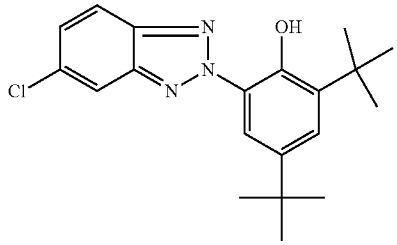
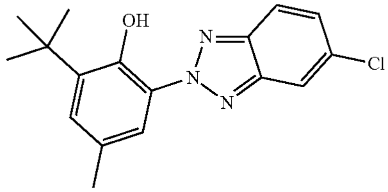
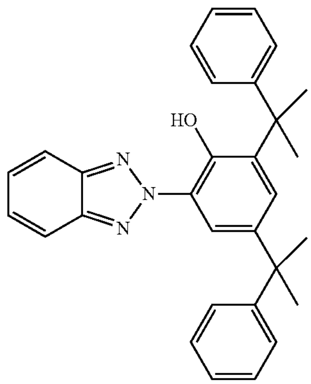
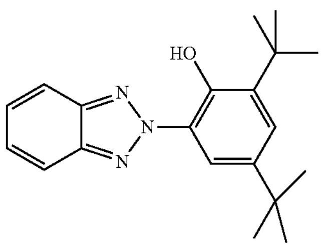
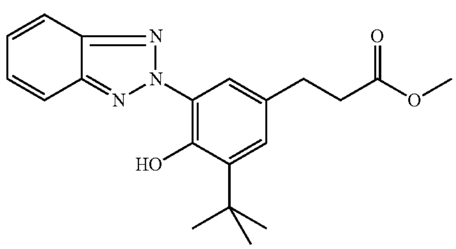
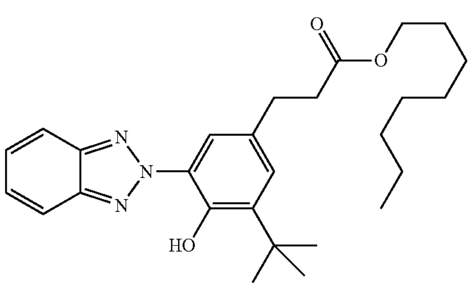
-continued
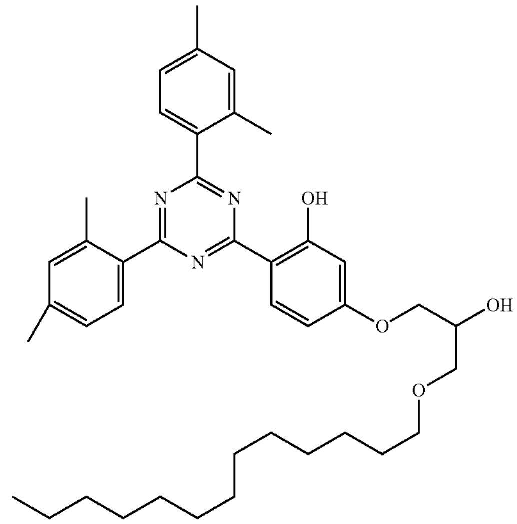
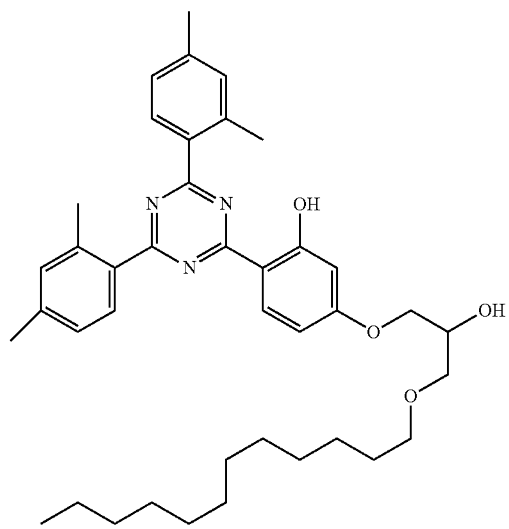
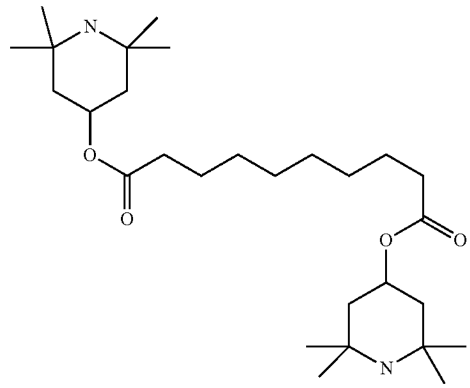

-continued

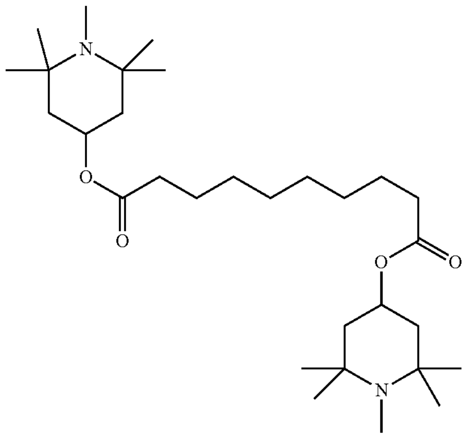

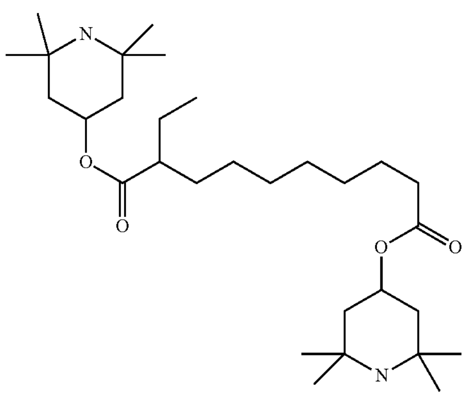

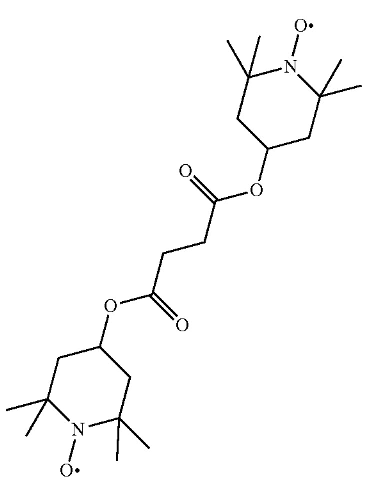

-continued

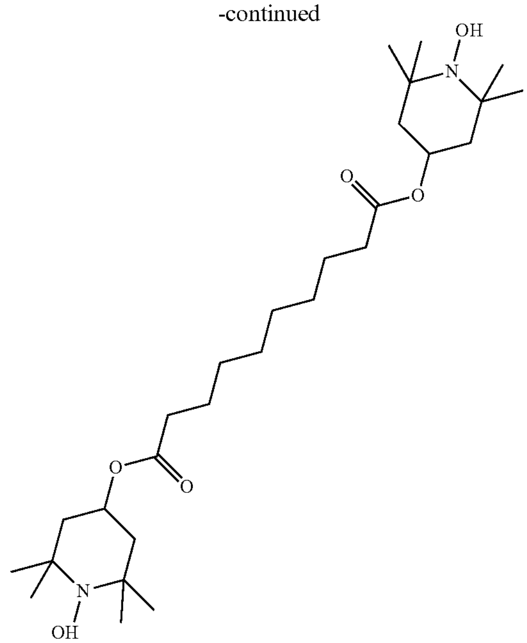

wherein n in each case is 1, 2, 3, 4, 5, 6, or 7.

24. A liquid-crystalline medium according to claim 1, wherein said medium contains one or more compounds selected from compounds of formulae T-4.

25. A liquid-crystalline medium according to claim 22, wherein the amount of said one or more stabilizers in the medium is 0.01-10% by weight.

26. A liquid-crystalline medium according to claim 1, wherein said medium contains bis(2,2,6,6-tetramethyl-4-piperidyl)sebacate in an amount of 0.001-5% by weight.

27. A liquid-crystalline medium according to claim 1, wherein said one or mom compounds selected from formulae T-1 to T-21 are compounds selected from formulae T-1, T-2, T-4, and T-5.

28. A liquid-crystalline medium according to claim 1, wherein said one or mom compounds selected from formulae T-1 to T-21 am compounds selected from formulae T-1, T-2, T-20 and T-21.

29. A liquid-crystalline medium according to claim 1, wherein maid one or mom compounds selected from formulae T-1 to T-19 include a compound of formula PGIY-n-Om:

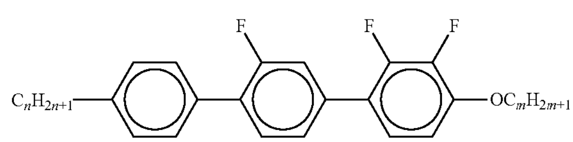

PGIY-n-Om wherein n and m an each independently 1, 2, 3, 4, 5 or 6.

30. A liquid-crystalline medium according to claim 1, wherein said medium further contains one or more compounds selected from formula BS-1

BS-1

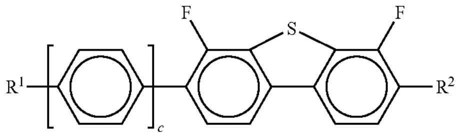

in which $R^1$ and $R^2$ each, independently of one another, denote H, an alkyl having 1 to 15 C atoms, or alkenyl radical having 2 to 15 C atoms which is unsubstituted, monosubstituted by CN or $CF_3$ or at least monosubstituted by halogen, where, in addition, one or mom CH2 groups in these radicals may each be replaced by —O—, —S—,

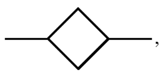

—C≡C—, —CF2O—, —OCF2-, —OC—O— or —O—CO— in such a way that O atoms an not linked directly to one another, and c denotes 0, 1 or 2.

* * * * *